(12) United States Patent
Ochiai et al.

(10) Patent No.: US 9,124,751 B2
(45) Date of Patent: Sep. 1, 2015

(54) PERIPHERAL DEVICE AND IMAGE READING DEVICE

(71) Applicant: CANON DENSHI KABUSHIKI KAISHA, Chichibu-shi, Saitama-ken (JP)

(72) Inventors: Taketo Ochiai, Tokyo (JP); Hirokazu Higuchi, Fujisawa (JP); Chihiro Hiranuma, Hanno (JP); Kiyoshi Ito, Fujimi (JP)

(73) Assignee: CANON DENSHI KABUSHIKI KAISHA, Chichibu-Shi (JP)

( * ) Notice: Subject to any disclaimer, the term of this patent is extended or adjusted under 35 U.S.C. 154(b) by 10 days.

(21) Appl. No.: 14/228,824

(22) Filed: Mar. 28, 2014

(65) Prior Publication Data

US 2014/0211259 A1 Jul. 31, 2014

Related U.S. Application Data

(63) Continuation of application No. 12/989,409, filed as application No. PCT/JP2009/061554 on Jun. 18, 2009, now Pat. No. 8,717,599.

(30) Foreign Application Priority Data

| Jun. 27, 2008 | (JP) | 2008-169262 |
| Jun. 27, 2008 | (JP) | 2008-169263 |
| Oct. 6, 2008 | (JP) | 2008-259957 |
| Jun. 16, 2009 | (JP) | 2009-143655 |

(51) Int. Cl.
*G06F 3/12* (2006.01)
*G06K 15/00* (2006.01)
(Continued)

(52) U.S. Cl.
CPC ....... *H04N 1/00962* (2013.01); *G03G 15/5075* (2013.01); *H04N 1/00236* (2013.01); *H04N 1/00938* (2013.01); *H04N 2201/007* (2013.01); *H04N 2201/0041* (2013.01); *H04N 2201/0049* (2013.01); *H04N 2201/0075* (2013.01)

(58) Field of Classification Search
USPC .................................................. 710/15, 8, 26
See application file for complete search history.

(56) References Cited

U.S. PATENT DOCUMENTS

| 7,142,317 B2 | 11/2006 | Naito et al. |
| 7,196,811 B2 | 3/2007 | Naito et al. |
| 7,242,499 B2 * | 7/2007 | Kanda et al. ................. 358/1.16 |

(Continued)

FOREIGN PATENT DOCUMENTS

| CN | 1542630 A | 11/2004 |
| EP | 1491982 A1 | 12/2004 |

(Continued)

*Primary Examiner* — Satwant Singh
(74) *Attorney, Agent, or Firm* — Fitzpatrick, Cella, Harper & Scinto

(57) ABSTRACT

The present invention is applicable to a peripheral device which performs processing based on information from an information processing device. The peripheral device of present invention is characterized by a storage unit, which stores in it a program of controlling of designated processing, and stores in it data for controlling the peripheral device, and by a communication unit which sends the program stored in the storage unit to the information processing device, and by a control unit which controls operation of the peripheral device based on an instruction information written into the storage unit upon execution of the program on the information processing device.

15 Claims, 33 Drawing Sheets

(51) Int. Cl.
*H04N 1/00* (2006.01)
*G03G 15/00* (2006.01)

(56) References Cited

U.S. PATENT DOCUMENTS

| | | | |
|---|---|---|---|
| 7,779,168 B2* | 8/2010 | Yamamura et al. | 710/8 |
| 7,787,158 B2 | 8/2010 | Matsuda | |
| 7,898,680 B2 | 3/2011 | Misawa et al. | |
| 8,390,849 B2 | 3/2013 | Imaizumi et al. | |
| 8,914,558 B2* | 12/2014 | Ito et al. | 710/36 |
| 2003/0225971 A1 | 12/2003 | Oishi et al. | |
| 2004/0001504 A1 | 1/2004 | Rostron et al. | |
| 2004/0230708 A1 | 11/2004 | Juan | |
| 2004/0246762 A1 | 12/2004 | Inada | |
| 2005/0132352 A1 | 6/2005 | Shen | |
| 2006/0044601 A1 | 3/2006 | Misawa et al. | |
| 2006/0170984 A1 | 8/2006 | Matsuda | |
| 2006/0200629 A1 | 9/2006 | Oishi et al. | |
| 2007/0198996 A1 | 8/2007 | Chiu et al. | |
| 2008/0079991 A1* | 4/2008 | Horikoshi et al. | 358/1.15 |
| 2008/0123114 A1 | 5/2008 | Hirosugi et al. | |
| 2008/0141284 A1 | 6/2008 | Tomizu | |
| 2008/0239378 A1* | 10/2008 | Uno | 358/1.15 |
| 2008/0244107 A1* | 10/2008 | Uno | 710/15 |
| 2011/0160875 A1 | 6/2011 | Taguchi et al. | |
| 2012/0243018 A1 | 9/2012 | Shirota et al. | |
| 2013/0050734 A1 | 2/2013 | Ito et al. | |

FOREIGN PATENT DOCUMENTS

| | | |
|---|---|---|
| JP | 7-271946 A | 10/1995 |
| JP | 2001-256170 A | 9/2001 |
| JP | 2004-54896 A | 2/2004 |
| JP | 2004-302658 A | 10/2004 |
| JP | 2004-334449 A | 11/2004 |
| JP | 2004-342068 A | 12/2004 |
| JP | 2005-321907 A | 11/2005 |
| WO | 03/012577 A2 | 2/2003 |
| WO | 2007/137415 A1 | 12/2007 |
| WO | 2008/067432 A1 | 6/2008 |

* cited by examiner

F I G. 23
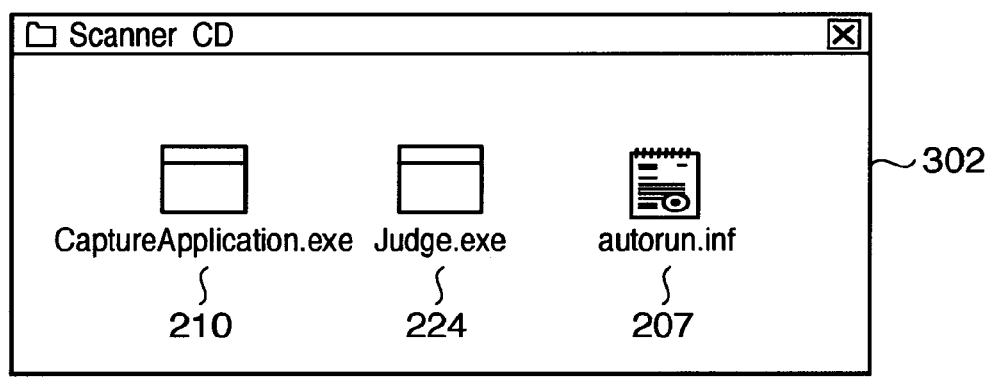

F I G. 34
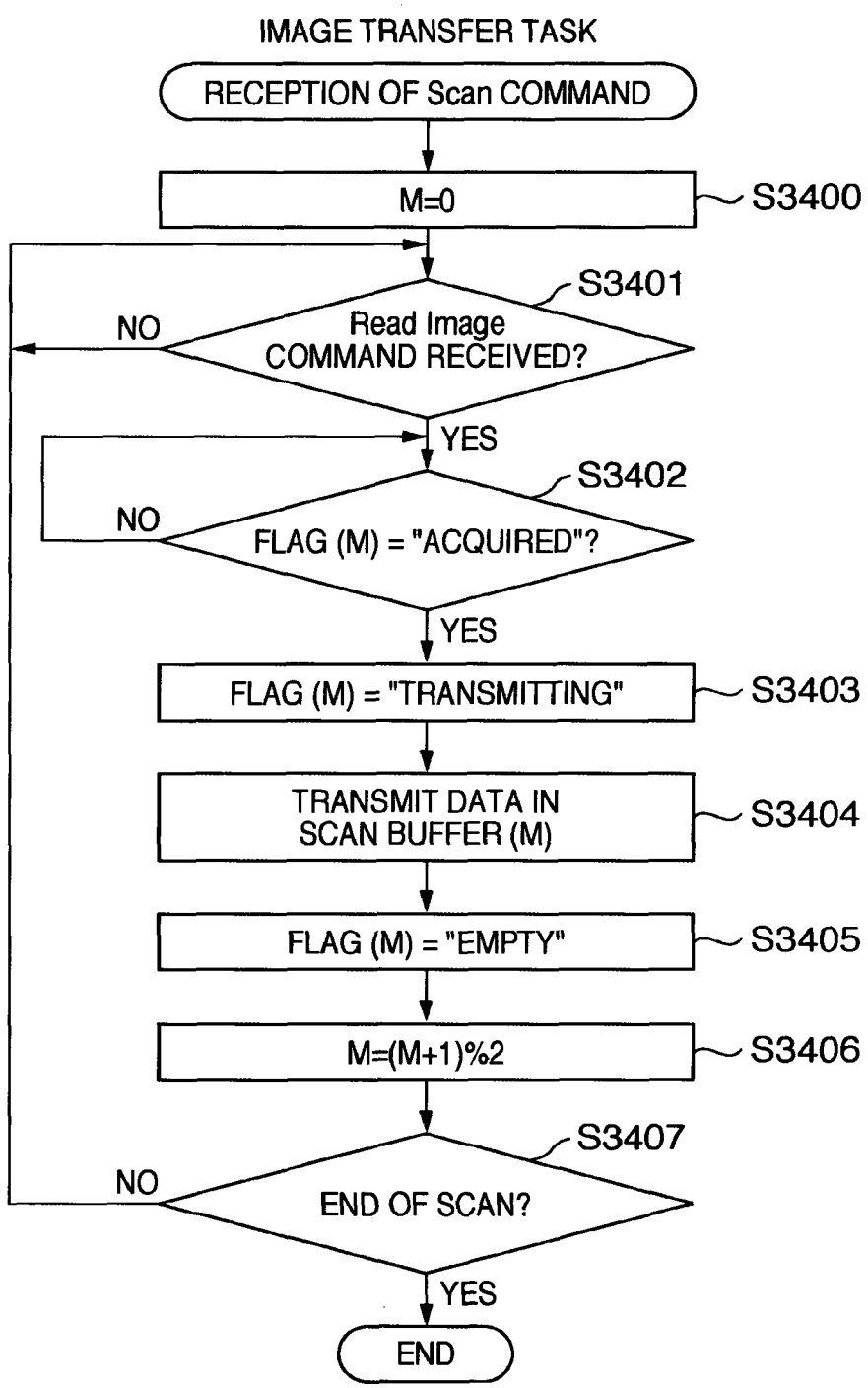

PERIPHERAL DEVICE AND IMAGE READING DEVICE

This application is a continuation of U.S. application Ser. No. 12/989,409 which is a National Stage of PCT/JP2009/061554 filed Jun. 18, 2009, the contents of each of which are incorporated herein by reference.

TECHNICAL FIELD

The present invention relates to a peripheral device such as an image scanner, printer, or multi-function peripheral.

BACKGROUND ART

Peripheral devices such as image scanners, printers, and multi-function peripherals are widely used. Examples of known interfaces for connecting these peripheral devices are a serial interface, parallel interface, USB, IEEE1394, and LAN.

To make a peripheral device usable on a computer, it is necessary to install a device driver and/or application software for the peripheral device (Japanese Patent Laid-Open No. 2004-334449).

However, some computers are imposed restriction of installation of the device driver or application software. This restriction is often imposed for security protection. For example, an operating system (OS) such as Microsoft Windows® permits only a user having administrator's privileges to install a device driver. In this situation general users cannot install the device driver or application software and cannot therefore use the peripheral device. Such a situation is expected to take place frequently when a user wants to borrow somebody else's computer away from the user's home or office.

Conventionally, even a user given administrator's privileges needs to install a device driver before connecting an image reading device. That is, it is so far impossible to use a peripheral device without installing a device driver in a computer.

The device driver is generally distributed by a CD-ROM. A user cannot install the device driver without having the device driver CD-ROM. For example, loss of the CD-ROM makes device driver installation impossible. The device driver is usually available via the Internet. To do this, however, an environment allowing connection to the Internet is needed. It is also necessary to correctly find, read and input the URL of the web site that distributes the device driver or the type and name of the peripheral device, resulting in cumbersomeness.

DISCLOSURE OF INVENTION

The present invention enables the use of a peripheral device without installation of a device driver or software in a computer. According to several aspects, the present invention allows the image reading device to read a relatively large image without installing its device driver in the computer. And according to other several aspects, the present invention enables selection of the operation mode a peripheral device depending on whether a device driver is already installed in the computer.

The present invention is applicable to a peripheral device which performs processing based on information from an information processing device. The peripheral device of present invention is characterized by a storage unit, which stores in it a program of controlling of designated processing, and stores in it data for controlling the peripheral device, and by a communication unit which sends the program stored in the storage unit to the information processing device, and by a control unit which controls operation of the peripheral device based on an instruction information written into the storage unit upon execution of the program on the information processing device, thereby making the peripheral device usable from the information processing device without installation of the software in the information processing device.

Further features of the present invention will become apparent from the following description of exemplary embodiments with reference to the attached drawings.

BRIEF DESCRIPTION OF DRAWINGS

FIG. 23 is a view showing a state in which file management software (Explorer) has opened a CD drive (scanner) assigned a drive letter;

FIG. 34 is a flowchart illustrating an example of an image transfer task;

BEST MODE FOR CARRYING OUT THE INVENTION

Figure 1:
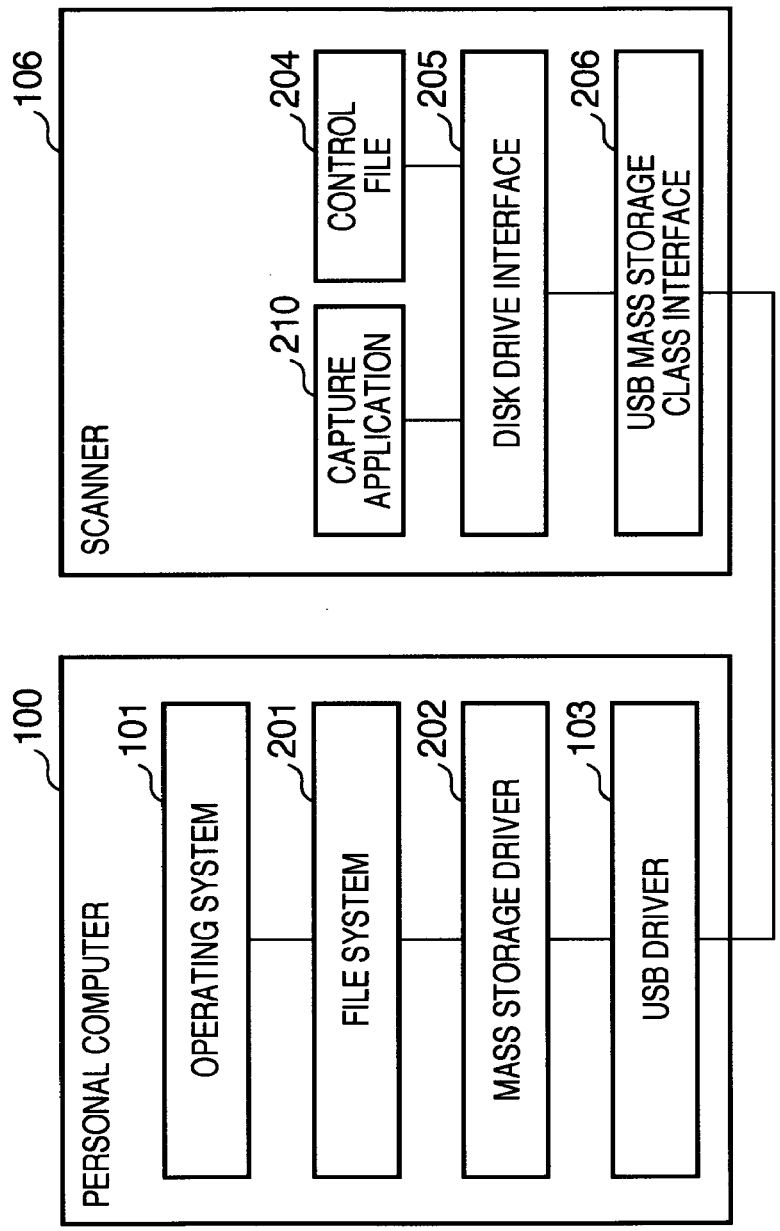
FIG. 1 is a software block diagram of a computer exemplified as a personal computer and a scanner serving as an image reading device according to the first embodiment of the present invention.

An embodiment of the present invention will be described below. Individual embodiments to be explained below will serve to allow understanding of various concepts including the superordinate concept, intermediate concept, and subordinate concept of the present invention. The scope of the invention is determined by the claims and is not limited to the individual embodiments to be described below.

[Aspect 1]

A peripheral device which performs designated processing based on information coming from an information processing device, the peripheral device comprising:

a storage unit which stores in it a program of controlling of the designated processing, and stores in it data for controlling the peripheral device;

a communication unit which sends the program stored in the storage unit, to the information processing device; and a control unit which controls operation of the peripheral device based on an instruction information written into the storage unit upon execution of the program on the information processing device.

According to aspect 1, the peripheral device can be made usable from the information processing device without installing of the software for controlling the peripheral device onto it. This allows even a user having no controlling program to use the peripheral device. Additionally, since the necessary software is stored in the peripheral device, any unusable state caused by loss of a CD-ROM can be prevented.

[Aspect 2]

A peripheral device according to aspect 1, wherein the storage unit includes a RAM which stores the program.

According to aspect 2, control program becomes available from a RAM, which is easily accessible, of the peripheral device.

[Aspect 3]

The peripheral device according to aspect 2, wherein:

the storage unit includes a ROM or nonvolatile memory which stores the program;

the RAM stores the instruction information;

the control unit performs control, upon connection of the peripheral device to the information processing device, of storing the program to the RAM; and the communication unit performs transmission of the program from the RAM to the information processing device.

According to aspect 3, the program stored in a ROM or nonvolatile memory is easily prevented from erasing in error. And it becomes easy to accept the instruction information, written into the storage unit upon execution of the program, from the information processing device via the RAM. Hence, in the present invention of aspect 3 a control command or the like, which is conventionally transmitted by certain device driver, is written into the RAM of the peripheral device. The control unit of the peripheral device reads out the control command. This allows the computer to indirectly control the peripheral device.

[Aspect 4]

The peripheral device according to aspect 2, wherein the control unit controls the communication unit to send information for causing the information processing device to recognize the peripheral device as USB disk drive.

According to aspect 4, the information processing device recognizes the RAM as a readable/writable USB disk device and need not recognize it for example as an image reading device or a printing device. Hence, the OS never requires the information processing device to install a device driver.

[Aspect 5]

The peripheral device according to aspect 1, wherein the peripheral device has first operation mode in which the peripheral device operates as a external storage device, and has second operation mode in which the peripheral device operates as a processing device that performs the designated processing, and the control unit has an selection unit which selects between the first operation mode and the second operation mode.

According to aspect 5, operation mode in which the information processing device recognizes the peripheral device as a external storage device, and other operation mode in which the information processing device recognizes the peripheral device as a image reading device or printer are both become available.

[Aspect 6]

The peripheral device according to aspect 5, wherein the selection unit switches between the first operation mode and the second operation mode by manual switch, operated by user's hand, placed on the peripheral device.

According to aspect 6, user can use the peripheral device with determination of operation mode by simple hand operation.

[Aspect 7]

According to aspect 1, wherein the program is loaded by the information processing device from the storage unit to the information processing device via the communication unit, upon connection of the peripheral device to the information processing device.

According to aspect 7, control program is loaded to the information processing device, so user operation for loading the program can be omitted.

[Aspect 8]

A peripheral device which performs designated processing upon information from an information processing device, the peripheral device comprising:

a storage unit which stores in it a program for controlling of the designated processing;

an communication unit which sends the program to the information processing device;

a control unit which controls a first operation mode in which the peripheral device is controlled by the program loaded in the information processing device, and controls a second operation mode in which the peripheral device is controlled by a device driver installed in the information processing device, being different from the loaded program.

According to aspect 8, the peripheral device can be made usable from the information processing device without installation of the program onto it. Additionally, since the necessary program is stored in the peripheral device, any unusable state caused by loss of a CD-ROM can be prevented. And since the peripheral device has first operation mode in which the peripheral device operates as a external storage device which is controlled by the program stored in it, and has second operation mode in which the peripheral device operates as a processing device that performs the designated processing upon controlling of conventional device driver, better operation mode can be selectable based on availability of device driver.

[Aspect 9]

A peripheral device according to aspect 8, wherein:

the storage unit stores in it a determination program to determine whether a device driver to control said image processing unit from the information processing device is already installed in the information processing device;

the communication unit sends the determination program to the information processing device when the peripheral device is connected to the information processing device; and the control unit controls, based on a determination result of the determination program runs on the information processing device, selection of the first operation mode and the second operation mode.

According to aspect 9, since the peripheral device has the determination program, the information processing device can determine in accordance with the determination program whether the device driver is already installed. This enables the peripheral device to control its operation mode in accordance with the determination result.

[Aspect 10]

The peripheral device according to aspect 9, wherein the control unit selects the first operation mode of the peripheral device in a default state, and if the determination program has determined that the device driver is installed, the control unit selects the second operation mode of the peripheral device.

According to aspect 10, the peripheral device functions as the external storage device in the default state. If the device driver is already installed, the peripheral device can switch from the external storage device to the image processing device. Note that if the device driver is already installed, the peripheral device may function as both the external storage device and the image reading device. This can be implemented by, for example, causing the external storage device and the image reading device to function as USB interfaces capable of switching.

[Aspect 11]

According to aspect 9, wherein the determination program is loaded into the information processing device, upon connection of the peripheral device to the information processing device, via the communication unit by the information processing device.

Storing of the program as a file of automatic loading allows to load the program automatically and user operation for loading can be omitted.

[Aspect 12]

The peripheral device according to aspect 9, wherein the program is the device driver, and the determination program causes the information processing device to function as a comparison unit which, when the device driver is already installed in the information processing device, compares a version of the device driver installed in the information processing device with a version of the device driver stored in the storage unit, and an installation unit which installs, in the information processing device, the device driver stored in the storage unit only when the version of the device driver stored in the storage unit is newer than the version of the device driver installed in the information processing device.

According to aspect 12, a newer device driver is usable. Additionally, the newer device driver is prevented from being overwritten by an older one.

[Aspect 13]

The peripheral device according to aspect 12, wherein the determination program causes the information processing device to function as uninstallation unit which uninstalls, from the information processing device, upon receiving an instruction for disconnecting the peripheral device, the device driver read out from the storage unit and installed to the information processing device.

That is, if use of the image reading device or printer has finished, the installed device driver can be deleted from the computer. For this reason, no unnecessary files remain on the computer. In addition, without image reading or printing, the resources of the computer are not wasted.

[Aspect 14]

An image reading device which includes an image reading unit and performs image reading processing upon information from an information processing device, the image reading device comprising:

a storage unit which stores in it a program for controlling image reading device to be executed by the information processing device;

a communication unit which sends the program to the information processing device; and a control unit which performs control of outputting information for causing the information processing device to recognize the image reading device as an external storage device of the information processing device, wherein the control unit performs control of outputting repeatedly partial image data from the storage unit, upon acceptance of commands issued repeatedly by execution of the program on the information processing device.

According to the present invention of aspect 14, since the information processing device recognizes the image reading device as its external storage device, it is unnecessary to install the device driver of the image reading device in the information processing device. Additionally, when a command for image reading is accepted, partial image data block is stored in the control file and is output upon readout operation from the control file. This allows reading of relatively large images.

[Aspect 15]

The image reading device according to aspect 14, wherein the image reading device according to claim 14, wherein when the program read out from said storage unit is executed by the information processing device, the program causes the information processing device to perform as processing unit for reading out the partial image data block every time new partial image data block is stored in said storage unit, and for joining a plurality of readout partial image data blocks to complete the image data.

That is, reading out partial image data blocks from the buffer via the control file, and joining of a plurality of partial image data blocks are necessary to complete image data. In this case, the program read out from the control file and activated on the information processing device has these functions.

[Aspect 16]

The image reading device according to aspect 15, wherein the image reading device suspends response to a read request, of reading said storage unit, from the information processing device, after the information processing device, on which the program is executed, has written a command into said storage unit until the image reading device completes writing of partial image data block into said storage unit.

If the image reading device responds to a file readout request from the information processing device before the end of partial image data block write, it may be unable to correctly transfer the partial image data block. To prevent this, the readout request is neglected.

[Aspect 17]

The image reading device according to aspect 15, wherein when readout speed of partial image data block by the information processing device, in which the program runs, is slower than image reading speed of the image reading device, the control unit controls of suspending and resuming of the image reading operation. According to the present invention of aspect 17, for example even the information processing device of low price, in which readout speed is slow, can perform image reading using the image reading device of this embodiment.

[Aspect 18]

A method of controlling an image reading device which includes an image reading unit, a storage unit which stores in it a program to be executed by an information processing device to use the image reading device, and a communication unit which sends the program to the information processing device, the method comprising the steps of:

performing control of outputting information for causing the information processing device to recognize the image reading device as an external storage device of the information processing device, and performing control of outputting repeatedly partial image data blocks from the storage unit, upon acceptance of commands issued repeatedly by execution of the program on the information processing device.

According to the present invention of aspect 18, since the information processing device recognizes the image reading device as its external storage device, it is unnecessary to install the device driver of the image reading device in the information processing device. Additionally, when a command for image reading is accepted, partial image data block is stored in the control file and is output upon readout operation of the information processing device from the control file. This allows reading of relatively large images.

First Embodiment

FIG. 1 is a software block diagram of a computer exemplified as a personal computer and a scanner serving as an image reading device according to the first embodiment of the present invention.

An operating system 101, file system 201, USB mass storage driver 202, and USB interface driver 103 are installed in a computer 100 that is an example of an information processing device. The operating system 101 is a so-called OS which is the fundamental software of the computer 100. The file system 201 is software to store files in a storage device such as a hard disk drive. The USB mass storage driver 202 is software to control mass storages such as a hard disk drive, CD-ROM, DVD-ROM, CD-R, DVD-R, USB memory, and the like. The USB interface driver 103 is software to control a USB device connected to a USB interface. These software programs may constitute part of the OS.

On the other hand, a scanner device 106 that is an example of a peripheral device includes control software which causes the computer 100 to perform controlling of the scanner device 106. The peripheral device of this embodiment, for example, includes a capture application 210, control file 204, USB disk drive interface 205, and USB mass storage class interface 206. The capture application 210 of this embodiment is software including driver program to be executed on the computer 100 to control image reading. The control file 204 is a file accessed to write thereon, for example, a control command from the computer 100 which is executing the capture application 210. The USB disk drive interface 205 is software to use a memory (e.g., RAM, flash memory or EEPROM) in the scanner device 106 as a disk drive. The USB mass storage class interface 206 is software to use a memory as a USB mass storage via the USB disk drive interface 205.

Note that a scanner device in the marketplace includes a USB scanner class interface in place of these software programs. So, personal computer usually must include capture application software or a dedicated scanner driver. On the other hand, the present embodiment, the USB scanner class interface is not always necessary. And the personal computer does not always require the capture application software or the dedicated scanner driver.

Figure 2:
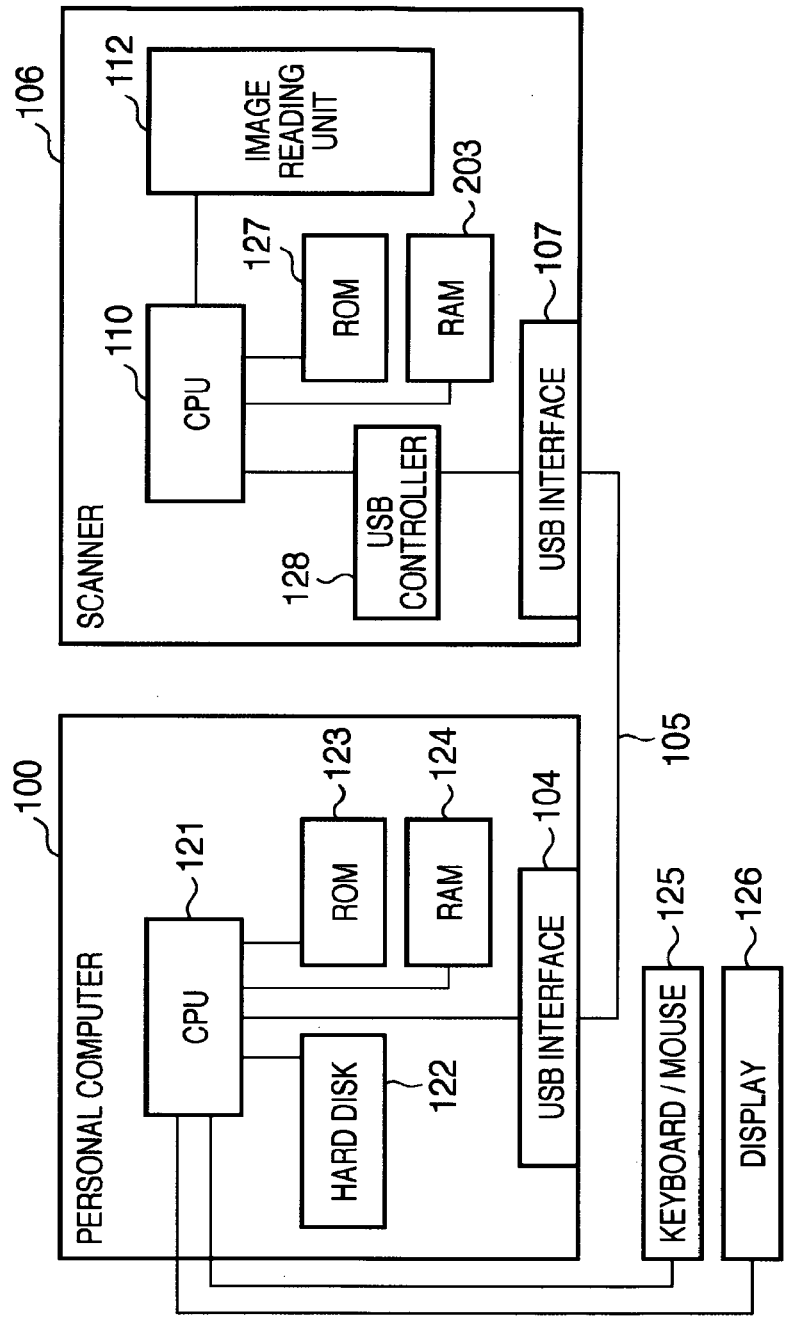
FIG. 2 is a hardware block diagram of the scanner and the computer exemplified as a personal computer.

FIG. 2 is a hardware block diagram of the scanner and the computer exemplified as a personal computer. Referring to FIG. 2, the computer 100 includes a CPU 121, ROM 123, RAM 124, hard disk drive 122, and USB interface 104. The USB interface 104 is connected to the scanner device 106 via a USB cable 105. The CPU 121 is connected to a keyboard/mouse 125 and a display 126.

When the computer 100 is powered on, the CPU 121 activates firmware from the ROM 123 and the Microsoft Windows® operating system 101 from the hard disk drive 122. Necessary software programs such as the OS are loaded to the RAM 124.

The scanner device 106 includes a CPU 110, ROM 127, RAM 203, image reading unit 112, USB controller 128, and USB interface 107. When the scanner device 106 is powered on, the CPU 110 activates firmware from the ROM 127. The firmware may be activated from a nonvolatile memory (not shown).

When a peripheral device of some kind is connected to the USB interface 104 via the USB cable 105, the operating system 101 on the computer 100 accesses the interface of the peripheral device and determines its type. And the scanner device 106 is recognized as a mass storage device class by the operating system 101. This is because the computer has the USB mass storage driver 202 to control a device of mass storage device class, and it is therefore unnecessary to newly install it. For this reason, the scanner device 106 of this embodiment has the USB mass storage class interface 206.

That is, the Microsoft Windows® operating system 101 supports a USB device of mass storage class on a standard basis. When the CPU 121 is to access a USB device of mass storage class, the computer 100 does not require installation of a special device driver or the like because the operating system 101 includes a USB driver 102 of mass storage class. The user can execute standard access to a mass storage class device using the operating system 101 without administrator's privileges.

Hence, when the scanner device 106 is connected to the computer 100, the CPU 121 activates the preinstalled standard USB mass storage driver 202. Since the scanner device 106 has the USB mass storage class interface 206, the CPU 121 and the operating system 101 recognize, as a mass storage device, the scanner device 106 connected to the computer 100. The CPU 121 and the operating system 101 access the ROM 127 or the RAM 203 of the scanner device 106 while recognizing it as an external storage device.

This recognition processing will be described in more detail. When the scanner device 106 is connected to the computer 100, the operating system 101 (CPU 121) detects connection of a peripheral device of some kind to the USB interface 104, and accesses the USB interface 107 of the scanner device 106 via the USB cable 105. When the computer 100 accesses the USB interface 107, the CPU 110 of the scanner device 106 causes the computer to access the USB mass storage class interface 206. The operating system 101 that has accessed the USB mass storage class interface 206 of the scanner device 106 can access the scanner device 106 from the USB interface driver 103 and the USB interface 104 via the USB cable 105 using the USB mass storage driver 202 included in the operating system 101 in advance.

The operating system 101 recognizes the scanner device 106 as a mass storage class device. For this reason, the computer 100 can access the scanner device 106 via the USB interface 107, USB mass storage class interface 206, and USB disk drive interface 205 of the scanner device 106 by an access method independent of the presence/absence of administrator's privileges. However, the computer 100 cannot directly control the image reading unit 112 and can only access the scanner device 106 recognized as a storage device.

The scanner device 106 stores the capture application 210 and the control file 204 used for controlling the scanner device 106 in the ROM 127 or the RAM 203 in advance. The ROM 127 and the RAM 203 can be implemented by a combination of flash memories, EEPROMs, DRAMs, and the like. The capture application 210 is a software to cause the scanner device 106 to perform image reading on command from the computer 100, and runs on the operating system 101.

The computer 100 forms, in a file folder associated with the file system 201, tables corresponding to the control file 204 and the capture application 210 stored in the scanner device 106.

Figure 3:
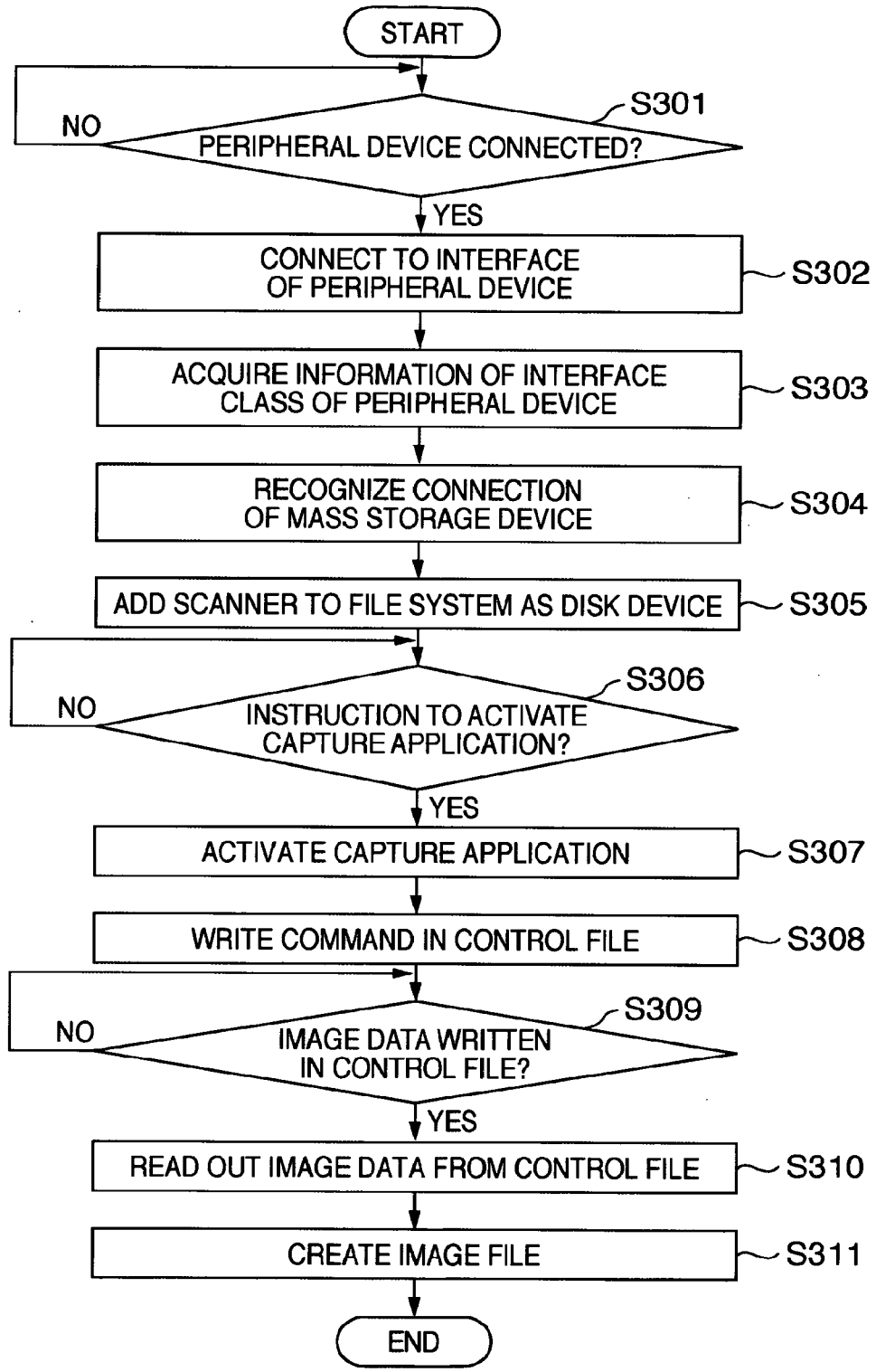
FIG. 3 is a flowchart illustrating a sequence that causes a scanner device 106 to perform image reading from a computer 100 using a capture application 210.

FIG. 3 is a flowchart illustrating a sequence that causes the scanner device 106 to perform image reading on command from the computer 100 using the capture application 210.

The CPU 121 of the computer 100 determines whether the scanner device 106 is connected (step S301). The CPU 121 connects to the interface of a peripheral device (the scanner device 106) (step S302).

The CPU 121 acquires the information of the interface class of the peripheral device from the scanner device 106 (step S303). The CPU can recognize the type of the connected peripheral device based on the information.

As described above, the scanner device 106 has the USB mass storage class interface. For this reason, when the scanner device 106 is connected to the computer 100, the CPU 121 recognizes that a USB mass storage device is connected (step S304). The scanner device 106 also has the USB disk drive interface 205 as the subclass of the USB mass storage class interface 206. The CPU 121 therefore recognizes the connected scanner device 106 as a disk drive.

The operating system 101 forms, in a file folder associated with the file system 201, tables corresponding to the control file 204 and the capture application 210 stored in the scanner device 106. The CPU 121 can thus handle the control file 204 and the capture application 210 stored in the scanner device 106 as files on a disk drive assigned a drive letter (step S305). This is because the scanner device 106 is recognized by the OS as a disk drive assigned a drive letter.

Figure 4:
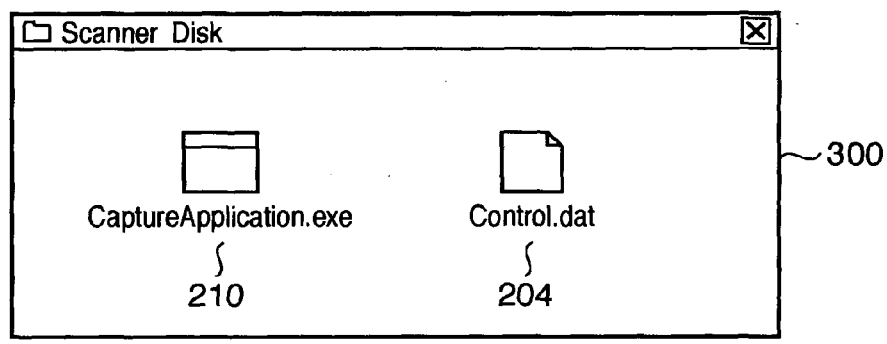
FIG. 4 is a view showing a state in which file management software (Explorer®) has opened a disk drive (scanner) assigned a drive letter.

FIG. 4 is a view showing a state in which file management software (Explorer) has opened a disk drive (scanner) assigned a drive letter. A memory provided on the scanner device 106 corresponds to a folder 300. The user can open the folder 300 using the keyboard/mouse 125 connected to the computer 100. The folder 300 stores the capture application 210 (file name: CaptureApplication.exe) and the control file 204 (file name: Control.dat).

The CPU 121 determines whether an instruction for activation of the capture application 210 of the folder 300 is input (step S306). This instruction can be input either by a user from a input unit such as the keyboard/mouse 125 or by an automatic execution information file such as autorun.inf not shown in the folder 300. For example, in the Microsoft Windows® operating system, when a CD-ROM is inserted in the CD drive, operating system detects an automatic execution information file called "autorun.inf" on the CD-ROM, and executes a execution file that is designated to be automatically executed in "autorun.inf". And, in a certain version of the Microsoft Windows® operating system, if a file is exist in the USB disk drive, the CPU detects a file called "autorun.inf" on the CD-ROM, and executes a command described in it. Therefore, it is possible to cause computer 100 to execute an execution file without user operation on keyboard/mouse 125 if the execution file name is described in "autorun.inf". That is, the above-mentioned CaptureApplication.exe is described in autorun.inf as an execution file. Upon receiving the instruction to activate the capture application 210, the CPU 121 loads the capture application from the scanner device 106 to the memory (RAM 124) and activates it (step S307). As described above, USB interface 107 is an example of communication unit transferring software in response to software loading operation of the computer 100.

Note that the automatic execution information file such as autorun.inf may describe the name of software such as autorun.exe having a function different from the function of CaptureApplication.exe. According to autorun.exe or CaptureApplication.exe loaded to the memory (RAM 124) of the computer 100 and activated, it is possible to control the scanner device 106 connected via the USB disk drive interface 205 and recognized as a disk drive without installing a scanner driver. More specifically, control software such as CaptureApplication.exe or autorun.exe has a driver function of enabling sending of commands concerning at least one of image reading and image forming and image data movement from a scanner or to a printer by transferring file from/to a RAM recognized as a USB memory. Sending of commands concerning image reading or image forming, and transferring of image data from a scanner or to a printer may be realized by transferring files from/to a RAM recognized as a USB memory in linkage with another program such as a DLL (Dynamic Link Library) module having a driver function.

If the software such as CaptureApplication.exe or autorun.exe requires a linkage to a specific DLL module or the like, the necessary DLL module or the like may be loaded from the scanner device 106 to the memory (RAM 124) of the computer 100.

Note that the automatic execution information file may have any name other than autorun.inf. In the Microsoft Windows® operating system, when power is turned on or USB connector of USB disk drive is connected, operating system detects the automatic execution information file called "autorun.inf" on the USB disk drive, and activate confirmation dialogue window of computer 100 in accordance with the description of autorun.inf so that a user operation activates CaptureApplication.exe or autorun.exe or the like. And if configuration of operating system 101 is changed, it may become possible to activate, in accordance with the description of autorun.inf, CaptureApplication.exe or autorun.exe or the like without displaying the dialogue window, upon power-on or USB connector insertion of USB disk drive.

The automatic execution information file such as autorun.inf is preferably stored in a protective memory area, out of the memory area of the peripheral device, that allows write protection or a memory area where write is impossible to prevent alterations by a malicious program such as a computer virus or a malicious person. In this embodiment, scanner device 106 is controlled based on instruction information of computer 100. More specifically, instruction information of computer 100 is written into memory of the scanner device 106 by computer 100 executing the software stored in scanner device 106. And CPU 110 of the scanner device 106 controls operation of the scanner device 106.

In this embodiment, for example, the computer 100 has the display 126 connected, and displays various kinds of user interfaces on it. In fact, the computer 100 can display user interface like FIG. 5 by execution of said software, and user can properly designate scanning parameter.

Figure 5:
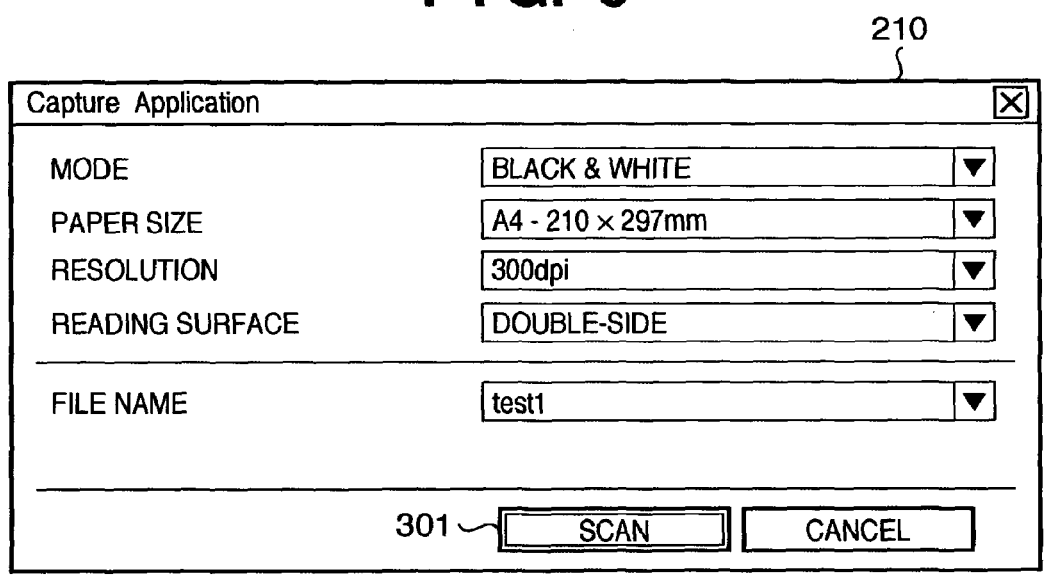
FIG. 5 is a view showing an example of a user interface displayed upon activation of the capture application 210.

For example, FIG. 5 is a view showing an example of a user interface displayed upon activating the capture application 210. When the interface of the capture application 210 as shown in FIG. 5 is displayed, the user executes scan setting by operating the keyboard/mouse 125. The user selects, for example, a reading mode (monochrome in the embodiment), paper size (A4 in the embodiment), resolution (300 dpi in the embodiment), and reading surface (double-side in the embodiment) using the keyboard/mouse 125. The user also inputs the file name (test1 in the embodiment) of an image file to store a read image by operating the keyboard/mouse 125. The user finally clicks on a scan button 301 using the keyboard/mouse 125.

When the user clicks on the scan button 301 using the keyboard/mouse 125, the capture application 210 (CPU 121) receives the scan settings and writes the scan settings (instruction information) in the control file 204 stored in the scanner device 106. The CPU 121 also writes scan start command data (instruction information) in the control file 204 (step S308).

The CPU 110 of the scanner device 106 monitors the control file 204. Upon detecting that the scan settings (instruction information) and scan start command data (instruction information) are written in the control file 204, the CPU 110 reads out the control file 204, and controls the image reading unit 112 in accordance with the written scan settings, thus starting scan. As described above, the scanner device of this embodiment performing designated operation connected with a information processing device (PC) is characterized by having memory, storing in it a program with which the scanner device becomes operable, and is writable of instruction information for controlling of the scanner device, and by having communication unit transferring said program from the memory to the information processing device, and by having control unit which controls the scanner device based on the instruction information written into the memory by execution of said program on the information processing device.

The scanner device 106 starts scan and the CPU 110 writes into a control file an image data read by the image reading unit 112. This control file is preferably the same control file that enables scan setting, but it may be other control file.

The CPU 121 of the computer 100 monitors whether the image data is written in the control file 204 or not (step S309). Upon detecting that the image data is written in the control file 204, the CPU 121 reads out the image data from the control file 204 (step S310). The CPU 121 creates a designated image file (file name "test1" in the embodiment), and stores it in the hard disk drive 122 (step S311). The peripheral device of this embodiment may be printer or multi-function device having image forming function. And the control software such as CaptureApplication.exe or autorun.exe may have a driver function of enabling sending of commands concerning at least one of image reading and image forming and image data movement from a scanner or to a printer etc. by transferring file from/to a RAM recognized as a USB memory. Sending of commands concerning image reading or image forming, and transferring of image data from a scanner or to a printer etc. may be realized by transferring files from/to a RAM recognized as a USB memory in linkage with another program such as a DLL (Dynamic Link Library) module having a driver function. As described above, even a user who cannot login to installer of the operating system 101 because of the absence of administrator's privileges or a user who wants to use other person's personal computer away from home or office can easily perform image reading.

In this embodiment, the RAM 203 read-accessible via the USB disk drive interface 205 of the USB mass storage class interface 206 stores control software(s) such as the CaptureApplication.exe 210, autorun.inf, or autorun.exe always at normal times. However, autorun.inf, CaptureApplication.exe, or autorun.exe to be read out via the USB mass storage class interface may be stored each time to the RAM 203 or the like based on information stored in a ROM 127 or a nonvolatile memory under the control of firmware (not shown) stored in a ROM or the like upon a moment of power-on, initialization, or accepting a predetermined command. If autorun.inf, CaptureApplication.exe, or autorun.exe itself is stored in a ROM or a nonvolatile memory, it may be copied to the RAM 203 or the like, as a matter of course. And, the control software(s), stored or copied to the RAM 203 or the like, is/are loaded into memory (RAM 124) and is/are activated. And the control software(s) perform(s) control of writing a command and the like into control file, and control of reading and/or writing image data from/into the control file.

These control software programs (CaptureApplication.exe 210 etc.) can be erased from the RAM 203 or the like to make it possible to effectively use the storage capacity of the RAM 203 readable/writable via the USB mass storage class interface for another purpose. And if the control software is infected with, for example, a computer virus, the control software is erased to prevent spread of infection.

Note that as a characteristic feature, the control software such as CaptureApplication.exe or autorun.exe becomes usable when being loaded to the memory (RAM 124) of the computer 100 and being activated, and requires no installation. And in this embodiment, RAM 123 of the scanner device 106 is assigned a drive letter and recognized as one disk drive by the computer 100. ROM (not shown) or nonvolatile memory (not shown) or the like is preferable not to be recognized by the computer 100. So the drive letter required for other equipments is not wasted because only one drive letter is assigned for the scanner device 106. As described above in the first embodiments, the present invention allows the scanner device 106 to perform image reading without installing any software such as a device driver or application in the computer 100. For example, even a user who cannot login to installer of the operating system 101 because of the absence of administrator's privileges or a user who wants to use other person's personal computer away from home or office can easily perform image reading.

Second Embodiment

Figure 6:
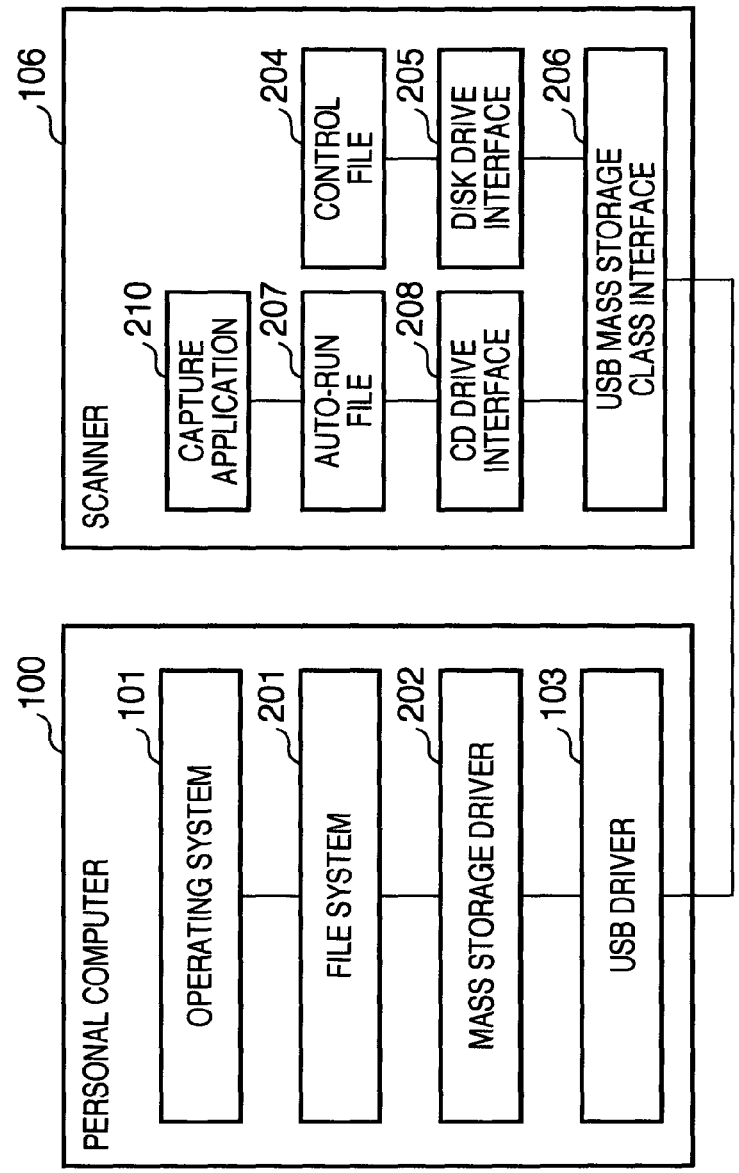
FIG. 6 is a software block diagram of a computer and a scanner serving as an image reading device according to the second embodiment of the present invention.

FIG. 6 is a software block diagram of a computer and a scanner serving as an image reading device according to the second embodiment of the present invention. Already described parts are given the same reference numerals to simplify the description.

The USB mass storage class interface 206 described in the first embodiment can have a plurality of USB mass storage subclasses. In the second embodiment, a scanner device 106 has two subclasses: a USB disk drive interface 205 and a USB CD drive interface 208. An operating system 101 on a computer 100 can access these logically separated devices. More specifically, a CPU 121 of the computer 100 recognizes the scanner device 106 as two logically different disk drives and assigns a drive letter to each of them.

This will be described in more detail. When the scanner device 106 is connected to the computer 100, the operating system 101 (CPU 121) detects connection of a peripheral device of some kind to a USB interface 104. The CPU 121 accesses a USB interface 107 of the scanner device 106 via a USB cable 105.

When the computer 100 accesses the USB interface 107, a CPU 110 of the scanner device 106 causes the computer to access a USB mass storage class interface 206. The operating system 101 thus accesses the USB mass storage class interface 206 of the scanner device 106. Hence, the CPU 121 can access the USB interface 104 of the scanner device 106 via the USB cable 105 using a USB interface driver 103 and a USB mass storage driver 202 included in the operating system 101 in advance.

Since the scanner device 106 has two USB mass storage subclasses, the operating system 101 recognizes it as two mass storage class devices. For this reason, the CPU 121 of the computer 100 can access the scanner device 106 via the USB interface 107, USB mass storage class interface 206, and USB CD drive interface 208 or USB disk drive interface 205 of the scanner device 106 by an access method that is available for user having no administrator's privileges.

The scanner device 106 stores an auto-run file 207, capture application 210, and control file 204 in advance. The auto-run file 207 is the above-described autorun.inf or the like.

The CPU 121 of the computer 100 accesses the capture application 210 and the auto-run file 207 via the USB CD drive interface 208. The CPU 121 accesses the control file 204 via the USB disk drive interface 205.

As described above, if the operating system 101 is Microsoft Windows®, it executes reading of "autorun.inf" (auto-run file 207) when a data CD is inserted in the CD drive. The auto-run file 207 is automatically read out and processed because it is accessed via the USB CD drive interface 208.

When connected to the computer 100, the CPU 110 of the scanner device 106 causes the operating system 101 to virtually recognize that no data CD is inserted in the CD drive. The CPU 110 then causes the operating system 101 to virtually recognize that a CD is inserted, thereby controlling to automatically execute the auto-run file 207.

The computer 100 forms, in a folder associated with a file system 201, tables corresponding to the control file 204, capture application 210, and auto-run file 207 stored in the scanner device 106.

Figure 7:
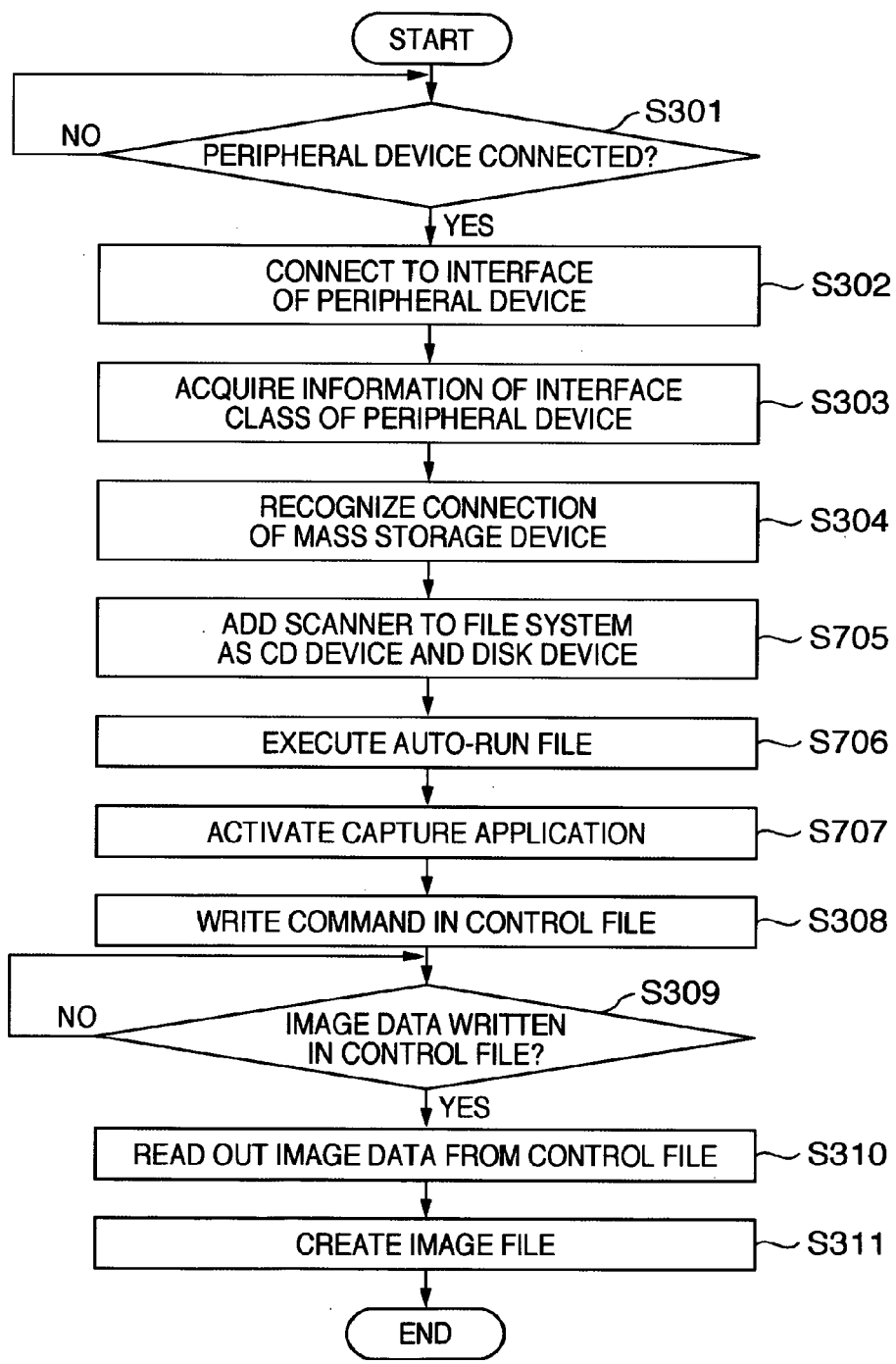
FIG. 7 is a flowchart illustrating a sequence that causes a scanner device 106 to perform image reading from a computer 100 using a capture application 210.

FIG. 7 is a flowchart illustrating a sequence that causes the scanner device 106 to perform image reading from the computer 100 using the capture application 210. Already described processes are given the same step numbers to simplify the description.

When steps S301 to S304 are executed, the CPU 121 of the computer 100 recognizes connection of a mass storage device. The scanner device 106 has the USB CD drive interface 208 and the USB disk drive interface 205 as the subclasses of the USB mass storage class interface 206. Hence, the CPU 121 of the computer 100 recognizes the connected scanner device 106 as a CD drive and a disk drive (step S705).

As described above, the operating system 101 (CPU 121) forms, in a file folder associated with the file system 201, tables corresponding to the control file 204, capture application 210, and auto-run file 207 stored in the scanner device 106. The CPU 121 therefore recognizes the control file 204 stored in the scanner device 106 as a file on the disk drive. The CPU 121 also recognizes the capture application 210 and the auto-run file 207 as files on the CD drive.

Figure 8:
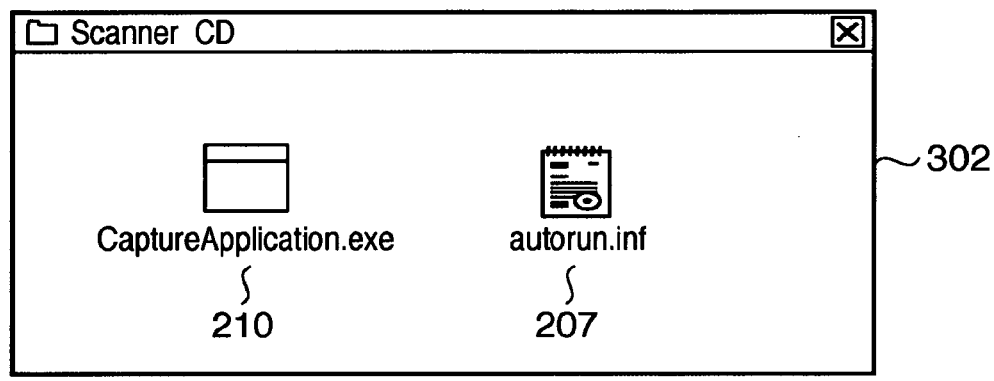
FIG. 8 is a view showing an example of a folder corresponding to a memory area recognized as a CD drive.

FIG. 8 is a view showing an example of a folder corresponding to a memory area recognized as the CD drive. The computer 100 recognizes, as a folder 302, a memory area recognized as the CD drive in the ROM or RAM of the scanner device 106. Hence, the capture application 210 and the auto-run file 207 seem to be stored in the folder 302.

Figure 9:
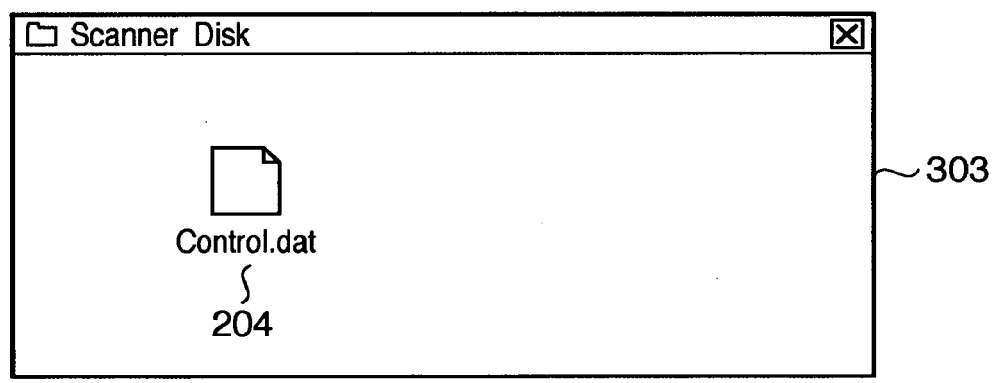
FIG. 9 is a view showing an example of a folder corresponding to a memory area recognized as a disk drive.

FIG. 9 is a view showing an example of a folder corresponding to a memory area recognized as the disk drive. The computer 100 recognizes, as a folder 303, a memory area recognized as the disk drive in the ROM or RAM of the scanner device 106. Hence, the control file 204 seems to be stored in the folder 303.

The user can open the folder 302 shown in FIG. 8 and the folder 303 shown in FIG. 9 using a keyboard/mouse 125 connected to the computer 100.

Upon determining that a data CD is inserted in the CD drive, the operating system 101 (CPU 121) executes the auto-run file 207 (step S706). The auto-run file 207 is described in advance to activate the capture application 210. For this reason, the CPU 121 interprets the description of the auto-run file 207 and activates the capture application 210 (step S707). Since the user operation need not be involved, the capture application 210 looks like to have been activated automatically for the user.

Without providing an area shown in FIG. 8 to be recognized as the CD drive, a RAM 124 may be recognized only as the USB disk drive, as shown in FIG. 9. In this case, autorun.inf and CaptureApplication.exe (or autorun.exe) are stored in a memory area of the RAM 124 recognized as the USB disk drive. A DLL module is also stored there if necessary. And upon power-on or USB connector insertion, the computer 100 may display a dialogue window to confirm activation of CaptureApplication.exe or autorun.exe in accordance with the description of autorun.inf so that a user operation activates the application. Changing the settings of the operating system 101 allows to activate CaptureApplication.exe or autorun.exe in accordance with the description of autorun.inf without causing the computer 100 to display the activation confirmation dialogue window. Instead of providing an area shown in FIG. 8, an area recognized as a read only USB disk drive(s) may be provided in the RAM 124, therefore RAM 124 may be recognized as multiple USB disk drives by computer 100. In this case, autorun.inf and CaptureApplication.exe and the like may be stored in a memory area of the RAM 124 recognized as the read only USB disk drive, therefore protecting those files from alterations by a malicious person.

After that, steps S308 to S311 described above are executed.

As described above in the first and second embodiments, the scanner device 106 is allowed to perform image reading without installing any software such as a device driver or application in the computer 100. For example, even a user who cannot login to installer of the operating system 101 because of the absence of administrator's privileges or a user who wants to use other person's personal computer away from home or office can easily perform image reading.

In the above first and second embodiments, scan is started via the capture application 210. However, scan may start when the computer 100 detects press of a start button arranged on the scanner device 106. At this situation, the capture application 210 (CPU 121) may monitor the start button on the scanner device 106 via the control file 204. In this case, the CPU 110 writes, into the control file 204, information that indicates the start button is pressed.

The capture application 210 may instruct the scanner device 106 to start scanning via the control file 204. Alternatively, the capture application 210 may determine that scan has started upon detecting image data stored in the control file 204, and read out them and store the image file in the hard disk drive.

In the first and second embodiments described above, the capture application 210 is activated to display a user interface. The capture application 210 may become resident software in the operating system 101 such as Microsoft Windows® after first connection of the scanner device 106.

In the first and second embodiments described above, the capture application 210 has no image display function. However, the capture application 210 may have an image display function of read image.

In the first and second embodiments described above, scan settings are written in the control file 204 stored in a RAM 203. Hence, the scan settings are not saved in the scanner device 106. Instead, the scan settings done in the scanner device 106 may be stored in, for example, a nonvolatile memory (not shown). Respective scan settings may be stored for each user of the operating system 101.

The first and second embodiments have been described by exemplifying an operation on the Microsoft Windows® operating system. However, this is merely an example. The technical idea of the present invention is also applicable to any other operating system such as an operating system of Apple Computer or a Linux operating system.

The first and second embodiments have been described by exemplifying an image reading device. However, peripheral device of this invention may be a printer or may be a multi-function peripheral having an image reading function and an image forming function.

When the peripheral device of the present invention has an image forming function, software such as autorun.exe has a function of sending of commands concerning image formation and a function of sending of image data to be used for image formation.

Third Embodiment

In the first or second embodiment, device driver installation is unnecessary. However, a dedicated capture application must always be used. On the other hand, for a computer having allowance of device driver installation, a demand for use of a popular general-purpose capture application is expected to rise.

In the third embodiment, a peripheral device will be proposed, which has a control mode that requires installation of software like a dedicated device driver and a control mode, similar to the first and second embodiments, that does not require installation of software like a dedicated device driver, and can switch between those modes. Latter mode is almost identical to the first and second embodiments. Therefore detailed operation of a control mode that requires installation of software like a dedicated device driver will be described.

Figure 10:
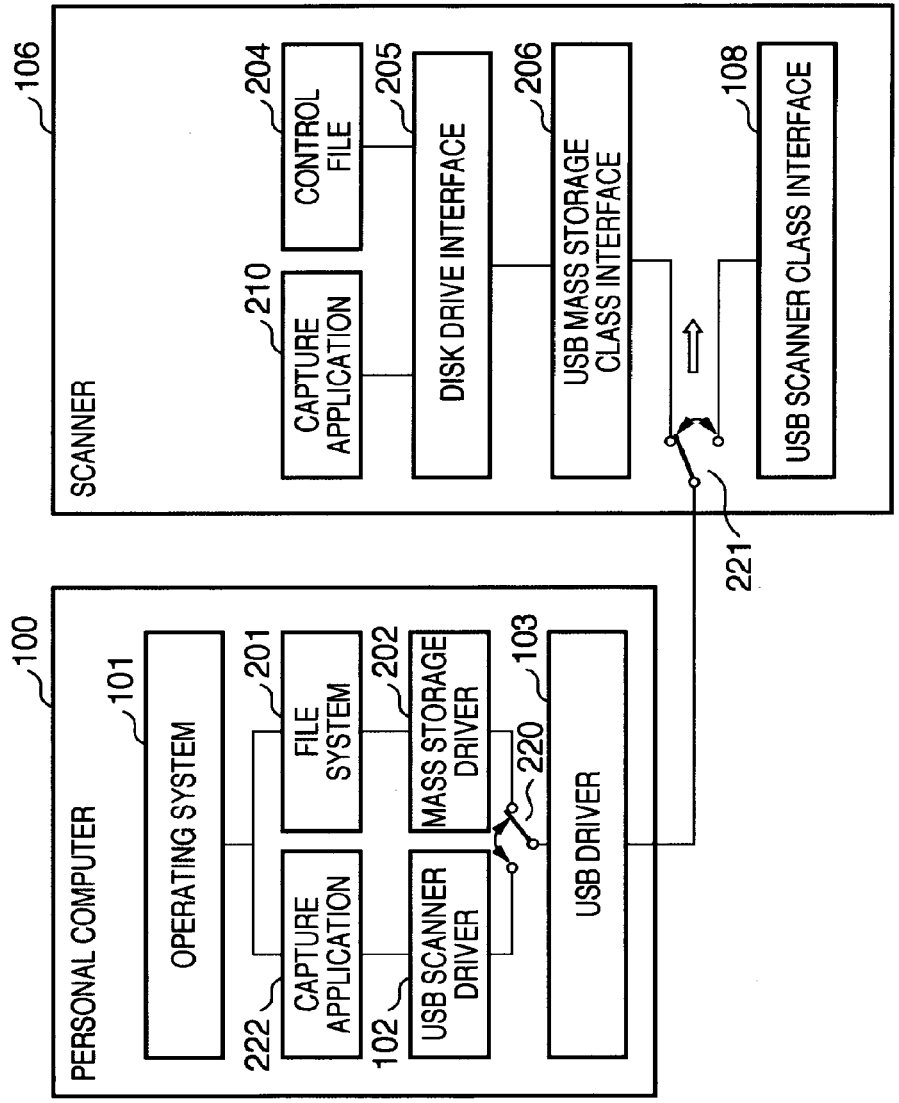
FIG. 10 is a software block diagram according to the third embodiment.

FIG. 10 is a software block diagram according to the third embodiment. Already described parts are given the same reference numerals. A general-purpose capture application 222, USB scanner driver 102, and switch 220 are added to a computer 100, as compared to FIG. 1. A scanner device 106 additionally includes a USB scanner class interface 108 and a switch 221.

When a peripheral device of some kind is connected to a USB interface 104 via a USB cable 105, an operating system 101 on the computer 100 accesses the interface of the peripheral device and determines its type. The scanner device 106 includes a USB mass storage class interface 206 which allows the scanner device to be recognized as a mass storage device class by the operating system 101, and the USB scanner class interface 108 which allows the scanner device 106 to be recognized as a scanner device class.

The switch 221 alternatively switches the two interfaces of different class. Note that the switch 221 may enable both interfaces of different class simultaneously as a third control mode. The switch 221 can be implemented either by software or by hardware using an electronic switch capable of electrical switching. The switch 221 may be implemented using both software and hardware.

The switch 221 may be, for example of hardware switch, a manual switch that allows switching by hand of the user. Otherwise another manual switch to generate an electrical signal for switching of the switch 221 may be provided independently. In these cases, the switch 221 cannot be switched under the control of a CPU 110 different from a controllable switch that will be described later. Otherwise, an indicator LED or the like may be provided so that the CPU 110 controls its lighting to make the user to change switching state of the switch 221 by hand operation.

The manual selector switch 221 or said another manual switch makes it possible to change, depending on the switching state of the switch 221, the operation to be performed upon pressing an operation button (not shown) of the scanner device 106. For example, the switch 221 or another manual switch is switched to the side to recognize the USB mass storage class interface 206. In this case, pressing a scan start button (not shown) can cause pseudo transition to a USB disconnection state and pseudo transition to a USB reconnection state. These transitions enable activation of an auto-run program or display of an auto-run confirmation dialogue, which is executed by the insertion/removal of the USB connector, without touching the USB connector. Hence, image reading can be done by a small number of operations.

Alternatively, the manual selector switch 221 or said another manual switch is switched to the side to recognize the USB scanner class interface 108. In this case, pressing the scan start button (not shown) allows to transmit, to the computer 100, information to make a predetermined JOB run on it, or write the information for job activation in the control file.

The operating system 101 running on the computer 100 supports a USB device of mass storage class. The operating system 101 includes a USB mass storage driver 202 serving as a device driver of mass storage class device. Hence, the user is never required to install a special device driver in the computer 100. The user can execute standard access to a mass storage class device via the operating system 101 without administrator's privileges.

Hence, when the scanner device 106 is connected to the computer 100, it uses the preinstalled standard USB mass storage driver 202. The scanner device 106 has the USB mass storage class interface 206. For this reason, when the scanner device 106 is connected to the computer 100, the operating system 101 recognizes the scanner device 106 as a mass storage device so that access is possible.

Note that the switch 220 in the computer 100 makes it possible to switch connection to a driver other than the USB mass storage driver 202. The switch 220 can be implemented either by software or by the electrical switching hardware using an electronic switch capable of electrical switching. The switch 220 may be implemented using both software and hardware.

The USB mass storage class interface 206 can have a plurality of USB mass storage subclasses. The scanner device 106 may be modified to have two subclasses, as shown in FIG. 6.

The capture application 222 installed in the computer 100 in advance is software to cause the scanner device 106 to perform image reading. The USB scanner driver 102 is a device driver to connect the scanner device 106 via a USB interface. This is a dedicated device driver which is not prepared in the OS on a standard basis. Hence, when the USB scanner class interface 108 is enabled, image reading is performed via the USB scanner driver 102.

In this embodiment, assume that a user having administrator's privileges installed the capture application 222 and the USB scanner driver 102 in the computer 100 in advance. The switch 220 switches between the USB mass storage driver 202 and the USB scanner driver 102. Both drivers may be enabled simultaneously, as a matter of course.

When the scanner device 106 is connected to the computer 100, the operating system 101 detects connection of a peripheral device of some kind to the USB interface 104, and accesses a USB interface 107 of the scanner device 106 via the USB cable 105. When the computer 100 accesses the USB interface 107, the CPU 110 of the scanner device 106 connects the selector switch 221 to the USB mass storage class interface 206 to make the computer access it. The operating system 101 accesses the USB mass storage class interface 206 of the scanner device 106. With this operation, the operating system connects the selector switch 220 to the USB mass storage driver 202 to enable it, and accesses the scanner device 106 from the USB interface 104 via the USB cable 105.

The operating system 101 recognizes the scanner device 106 as a mass storage class device. For this reason, the computer 100 can access the scanner device 106 via the USB interface 107, USB mass storage class interface 206, and USB disk drive interface 205 of the scanner device 106 by an access method executable without administrator's privileges for the operating system 101.

The scanner device 106 stores, in advance, a capture application 210 which runs on the operating system 101 to cause the scanner device 106 to perform image reading from the computer 100, and a control file 204 to control the scanner device 106.

The computer 100 forms, in a file folder associated with a file system 201, tables corresponding to the control file 204 and the capture application 210 stored in the scanner device 106. The CPU 121 therefore recognizes the control file 204 and the capture application 210 on the scanner device 106. In this embodiment description of an operation mode using capture application 210 on the scanner device 106 is omitted.

Figure 11:
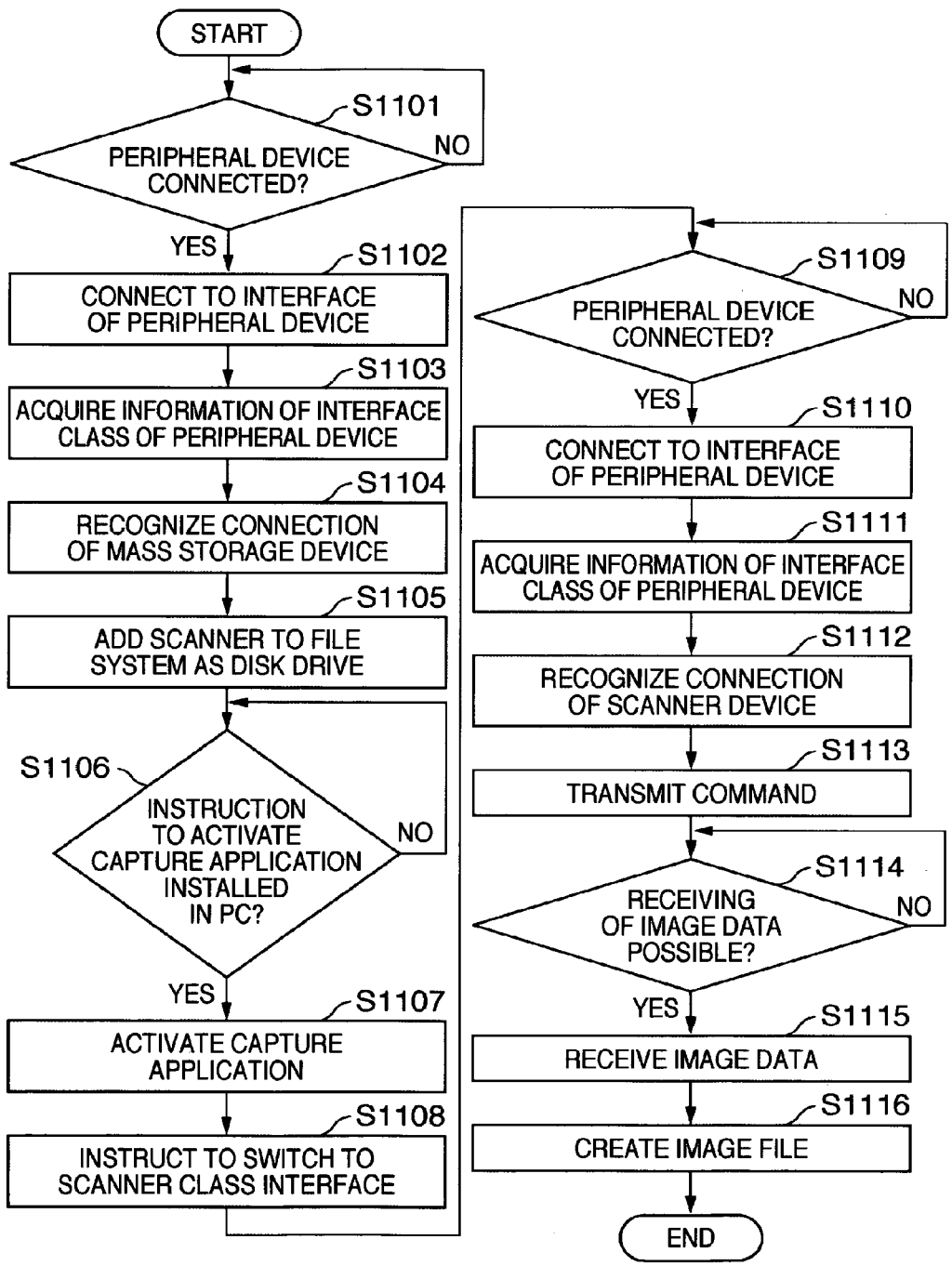
FIG. 11 is a flowchart illustrating a sequence that allows a user to activate a capture application 222 installed in a computer 100 so that a scanner device 106 performs image reading.

FIG. 11 is a flowchart illustrating a sequence that allows the user to activate the capture application 222 installed in the computer 100 so that the scanner device 106 performs image reading.

The computer 100 monitors whether the scanner device 106 is connected (step S1101). The computer 100 connects the scanner device 106 as the device having USB mass storage class interface (step S1102). The computer 100 acquires the information of the interface class and the like of the peripheral device from the scanner device 106 (step S1103). The computer 100 can recognize the type of the connected peripheral device based on the acquired information.

The selector switch 221 of the scanner device 106 is normally connected to the USB mass storage interface. Hence, the computer 100 recognizes the scanner device 106 as a USB mass storage device (step S1104). The computer 100 connects the selector switch 220 to the USB mass storage driver 202, and adds the connected scanner device 106 to the file system as a disk drive (step S1105).

The computer 100 thus recognizes the scanner device 106 as a mass storage. The computer 100 determines whether an instruction for activation of the capture application 222 is given (step S1106). When an instruction for activation of the capture application 222 is given, the computer 100 activates the capture application 222 (step S1107).

The computer 100 detects, from the file system 201, that the scanner device 106 is recognized as a mass storage device. The computer 100 outputs an instruction to the scanner device 106 via the file system 201 to reconnect via the USB scanner class interface 108 (step S1108). Upon receiving the interface switching instruction to the USB scanner class, the scanner device 106 temporarily makes a transition from the state connected to the computer 100 to a disconnected state, and then makes a transition to the connected state again.

At this time, the operating system 101 detects connection of a peripheral device of some kind to the USB interface 104 (step S1109). When the computer 100 accesses the USB interface 107, the CPU 110 of the scanner device 106 connects the selector switch 221 to the USB scanner class interface 108 to enable it, and causes the computer 100 to access the USB scanner class interface 108 (step S1110). The computer 100 acquires the information of the interface class and the like of the device (step S1111). The acquired information indicates that the computer 100 is connected to the USB scanner class interface 108. Hence, the computer 100 recognizes the connected device as a scanner device (step S1112).

Since the capture application 222 is activated, a display 126 displays a user interface window (FIG. 5). The capture application 222 of this embodiment and the capture application 210 use the same user interface. However, they may use different user interfaces. The user sets, on the capture application 222, a reading mode (monochrome in the embodiment), paper size (A4 in the embodiment), resolution (300 dpi in the embodiment), and reading surface (double-side in the embodiment). The setting is done using a keyboard/mouse 125. The user also inputs the file name (test1 in the embodiment) of an image file using the keyboard/mouse 125. The user finally clicks on a scan button 301 using the keyboard/mouse 125.

When the user clicks on the scan button 301, the capture application 222 (CPU 121) transmits the scan settings and also a scan start command to the scanner device 106 via the USB scanner driver 102, USB interface driver 103, and USB interface 104 (step S1113).

The scanner device 106 detects that the scan settings and scan start command have been received from the USB interface 107 via the USB scanner class interface. The scanner device 106 starts scan based on the received scan settings.

The computer 100 receives image data read by an image reading unit 112 via the USB scanner class interface 108 and the USB interface 107 (step S1114, S1115). The capture application 222 concatenates received image data and stores it in the hard disk drive as an image file having a designated file name (test1 in the embodiment) (step S1116).

Note that the operation to be performed when the USB scanner driver 102 cannot be installed in the computer 100 is the same as in the first and second embodiments, and a description thereof will not be repeated.

Fourth Embodiment

Figure 12:
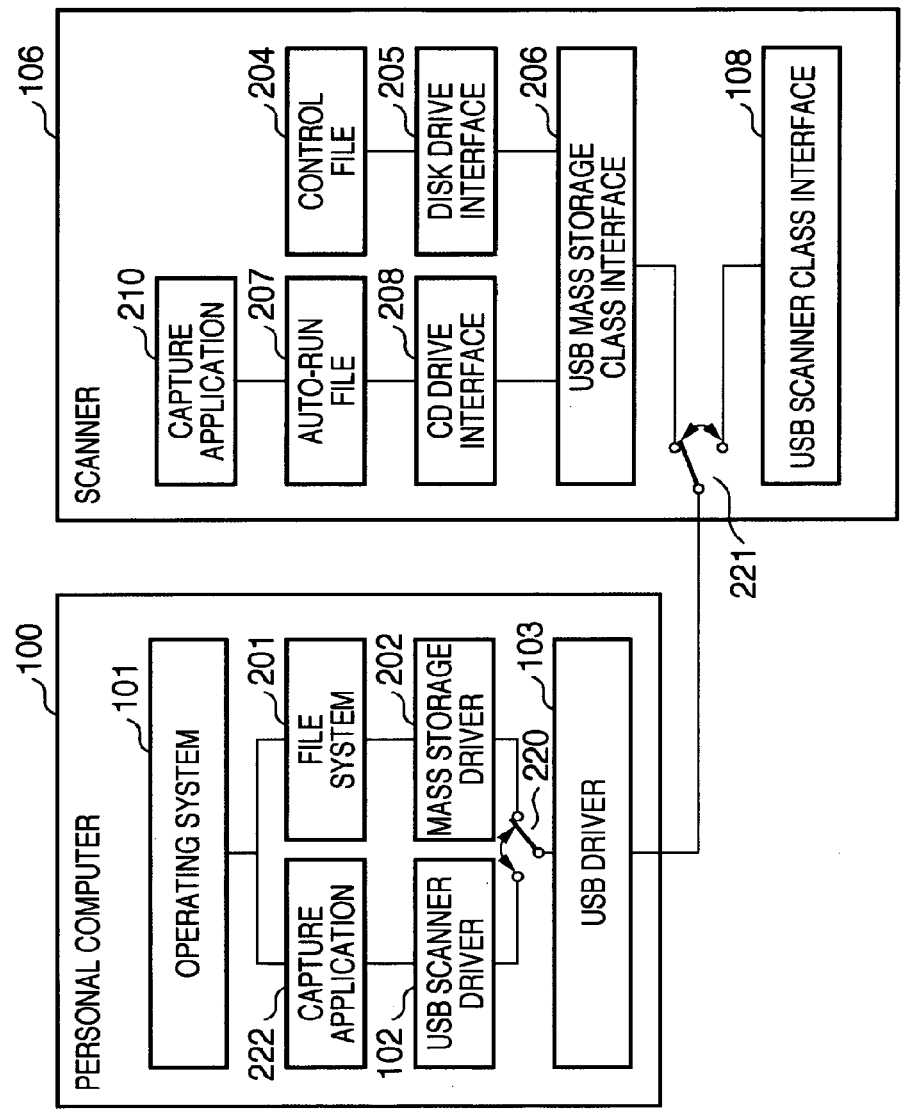
FIG. 12 is a software block diagram according to the fourth embodiment.

FIG. 12 is a software block diagram according to the fourth embodiment. As is apparent from comparison between FIG. 12 and FIG. 10, the software configuration of a scanner device 106 is a combination of the second and third embodiments. More specifically, when the scanner device 106 is connected to a computer into which software installation is restricted, the computer and the scanner device 106 operate in the same way as described in the second embodiment. If in the computer a USB scanner driver 102 and a capture application 222 are already installed, the computer and the scanner device 106 operate in the same way as described in the third embodiment.

[Image Transfer Processing]

Figure 13:
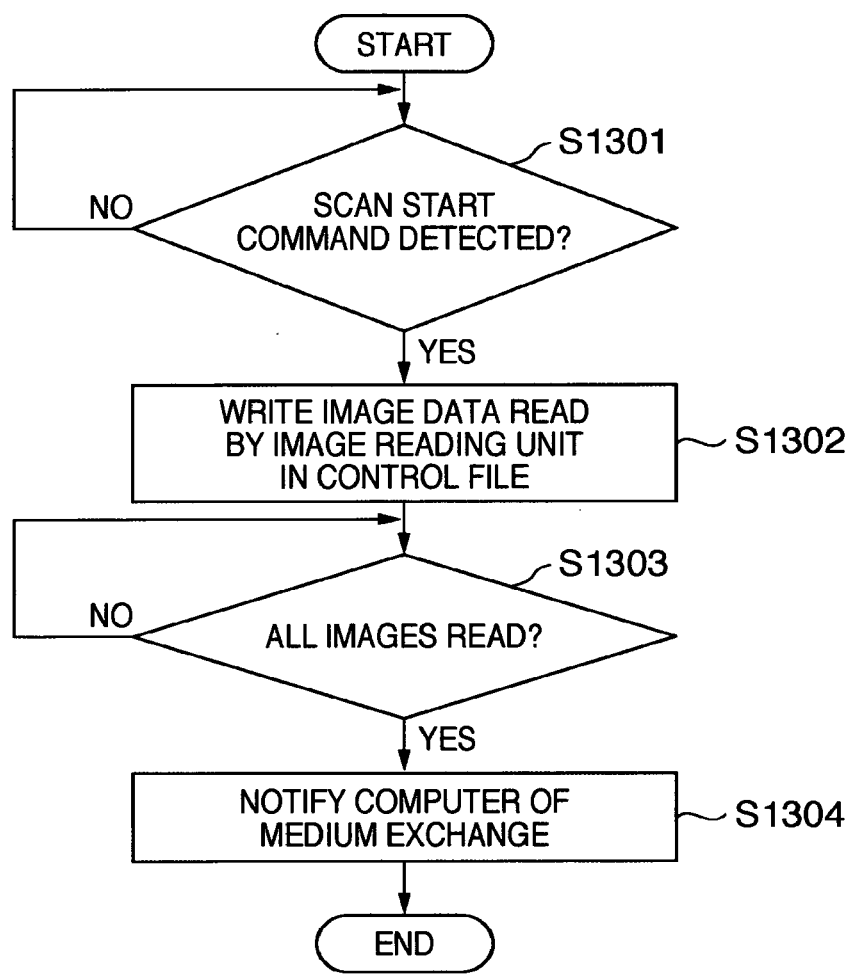
FIG. 13 is a flowchart illustrating an example of image transfer processing.

FIG. 13 is a flowchart illustrating an example of image transfer processing in the above-described second and fourth embodiments. A CPU 110 of the scanner device 106 confirms whether a scan start command has been written in a control file 204 (step S1301). Upon detecting the write of the scan start command, the CPU 110 performs control of scanning, and the image data read by the image reading unit 112 is written in the control file 204 under control of the CPU 110 (step S1302). The CPU 110 determines whether image data of one page has been written in the control file 204 (step S1303). If the writing of one page data has ended, the CPU 110 notifies a computer 100 via a USB cable 105 that the removable medium has been exchanged (S1304).

Upon receiving the notification indicating that the removable medium has been exchanged, the operating system 101 determines that the CD medium has been exchanged and updates a management table in a file system 201 corresponding to the control file 204 stored in the scanner device 106. The CPU 121 reads the updated management table and recognizes that the image data has been written in the control file 204.

The capture application 210 executed by the CPU 121, extracts the written image data from the control file 204, creates one image file by concatenating extracted image data, adds a designated file name (test1 in the embodiment) to the image file, and stores it in a hard disk drive. In addition to the method making condition in which change of removable medium is determined, method of notifying completion of image data storing and the like to the computer may be the method exemplified below.

[Another Example of Image Transfer Processing]

Figure 14:
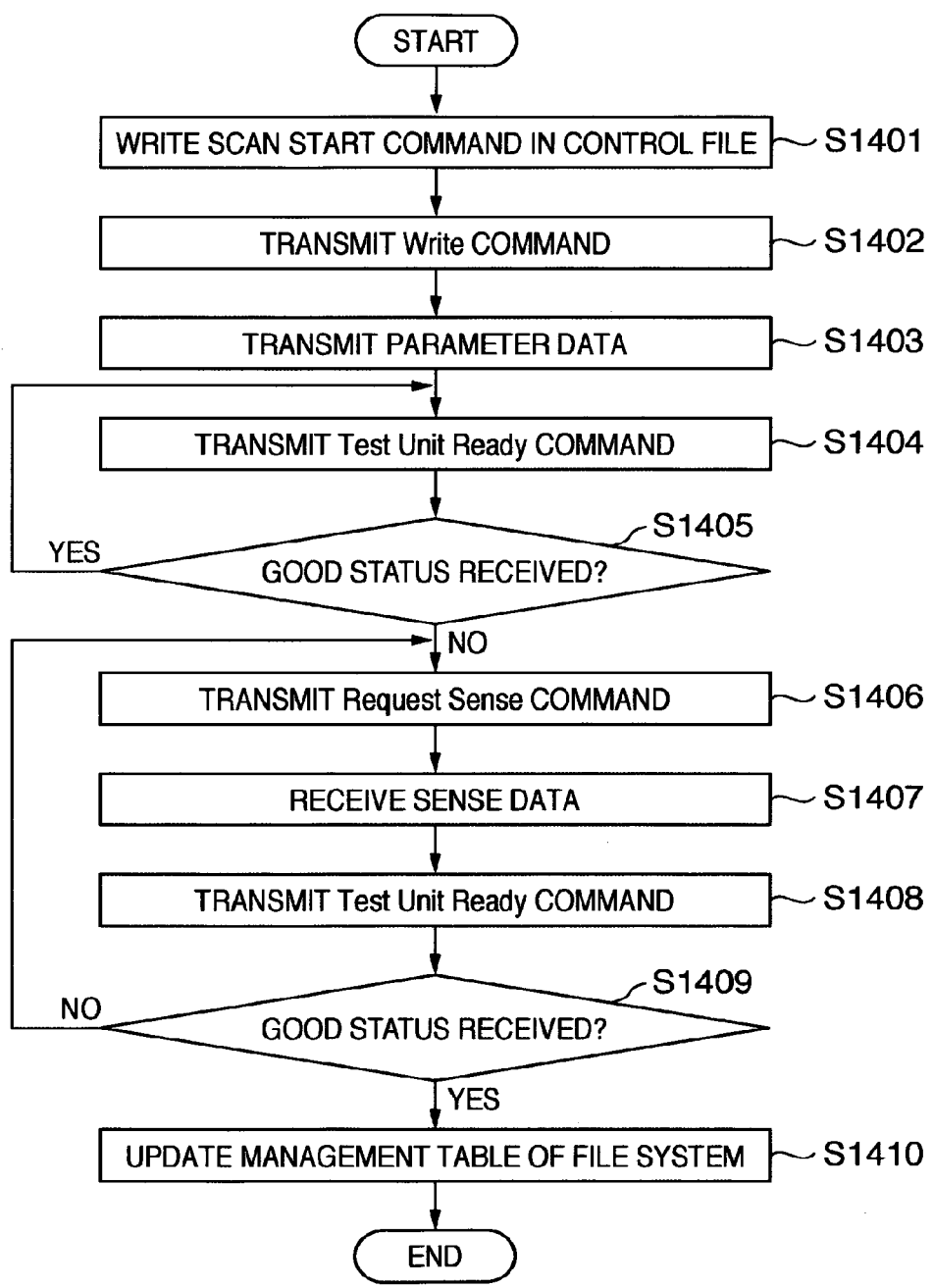
FIG. 14 is a flowchart illustrating an example of image transfer processing on a computer side.
Figure 15:
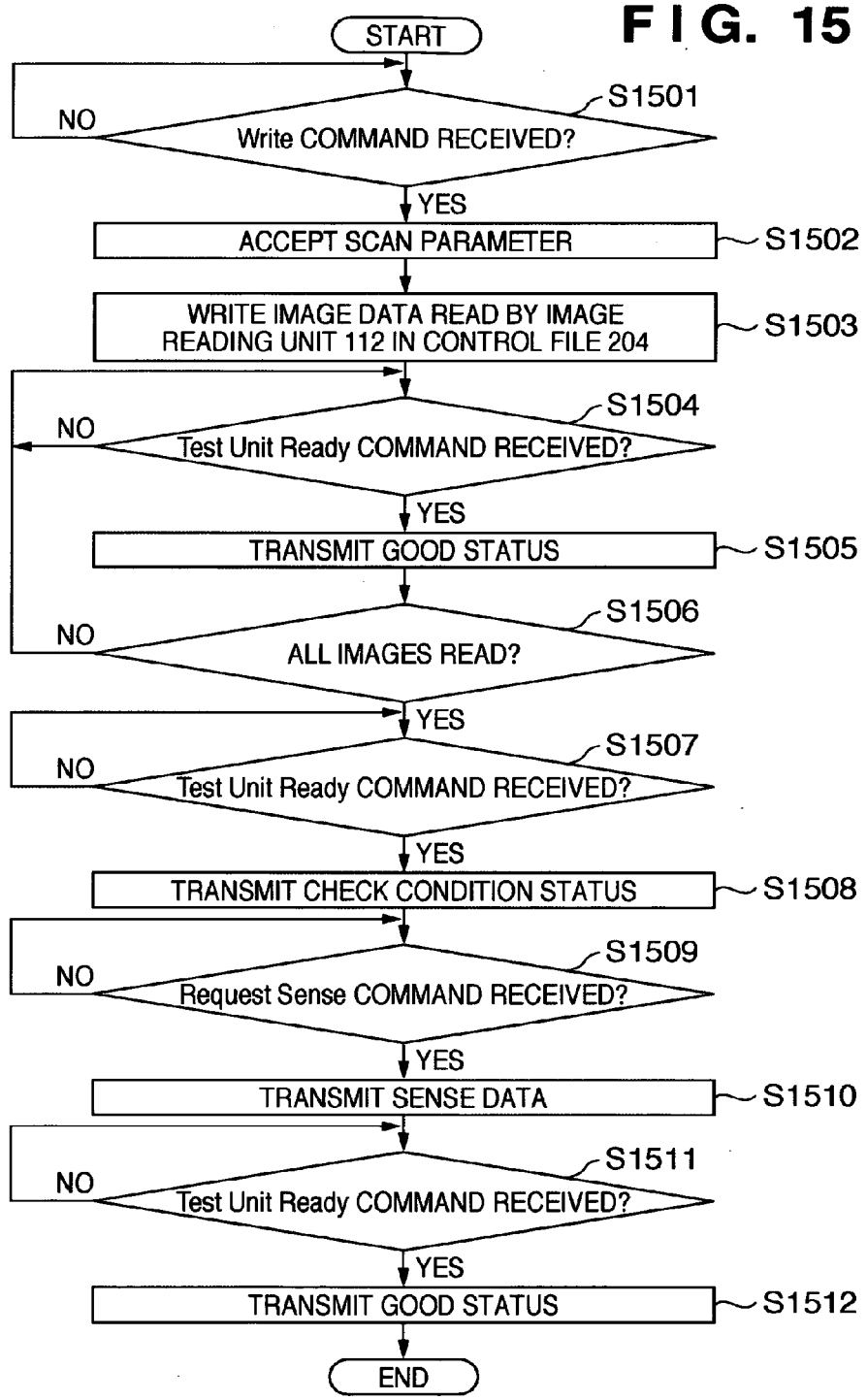
FIG. 15 is a flowchart illustrating an example of image transfer processing on a scanner device side.

FIG. 14 is a flowchart illustrating an example of image transfer processing on the computer side in the above-described four embodiments. FIG. 15 is a flowchart illustrating an example of image transfer processing on the scanner device side in the above-described four embodiments.

The mass storage class device of the embodiment supports transmission/reception of the SCSI command system. That is, the computer 100 issues commands of the SCSI command system to the mass storage device. When a mass storage device is connected, a Microsoft Windows® operating system 101 on the computer 100 periodically issues a Test Unit Ready command.

When the computer 100 instructs the scanner device 106 to start scanning, at first the capture application 210 writes a scan start command in the control file 204. More specifically, the Microsoft Windows® operating system 101 issues a Write command, and transmits a scan start command as parameter data (S1401, S1402 and S1403).

Upon receiving the scan start command as the parameter data of the Write command and accept scan parameter read out from the control file 204 (S1501 and S1502), the scanner device 106 starts scan, and writes image data read by the image reading unit 112 in the control file 204 (S1503).

At this time, if the read image data is being written in the control file 204, the scanner device 106 returns a GOOD status indicating a normal state in response to a Test Unit Ready command (S1504 and S1505). The computer 100 periodically transmits the Test Unit Ready command (S1404).

When writing of the image data into the control file 204 has ended (S1506), the scanner device 106 returns a CHECK CONDITION status for indicating end of writing (S1508) in response to a Test Unit Ready command (S1507).

When receiving not the GOOD status but the CHECK CONDITION status from the scanner device 106 (S1405), the operating system 101 on the computer 100 issues a Request Sense command to acquire detailed information of a state of the scanner device 106 (S1406).

Upon receiving the Request Sense command (S1509), the scanner device 106 transmits, as sense data, a MEDIUM NOT PRESENT sense key and sense code or a MEDIUM MAY HAVE CHANGED sense key and sense code because the CHECK CONDITION status is returned in response to the preceding Test Unit Ready command (S1510).

The operating system 101 on the computer 100 receives, as sense data, the MEDIUM NOT PRESENT sense key and sense code or the MEDIUM MAY HAVE CHANGED sense key and sense code from the scanner device 106 (S1407), and determines that the removable medium of mass storage device has been discharged. In addition, the operating system 101 on the computer 100 periodically issues a Test Unit Ready command to wait for insertion of a removable medium of mass storage device (S1408).

Upon receiving a new Test Unit Ready command after the return of the CHECK CONDITION status (S1511), the scanner device 106 returns a GOOD status to the operating system 101 representing a normal state in response to it (S1512).

The operating system 101 on the computer 100 receives the GOOD status (S1409), and determines that a removable medium of mass storage device has been inserted. The operating system 101 updates a management table in the file system 201 corresponding to the control file 204 in the scanner device 106, and the capture application 210 recognizes based on the updated management table that the image data has been written in the control file 204 (S1410).

The capture application reads the written image data from the control file 204 and store it with a designated storage file name (test1 in the embodiment).

In the embodiment, a CHECK CONDITION status is returned in response to a Test Unit Ready command, as described above. The processing can also be implemented by returning a CHECK CONDITION status in response to another command (e.g., Mode Select command or Start-Stop unit command) issued by the operating system 101 on the computer 100.

In the embodiment, the scanner device exhibits behavior for recognition of discharge/insert of the removable medium of mass storage device, thereby prompting the operating system 101 to update the management table in the file system 201. However, the scanner device may exhibit behavior of making both D+ and D− signals of the USB bus zero and making a transition to a USB bus reset state to make virtual detached condition of the USB device.

[Device Recognition Processing]

Upon detecting connection of a USB device, the operating system 101 on the computer 100 issues a GET_DESCRIPTOR standard device request at the setting stage of controlled transfer.

The scanner device 106 receives the GET_DESCRIPTOR standard device request, and returns the requested descriptor. The descriptor has a defined format and is used to express information such as the type, characteristic, and attribute of the device.

The operating system 101 on the computer 100 acquires information such as the type, characteristic, and attribute of the connected device based on a standard device descriptor, standard configuration descriptor, and standard interface descriptor of the GET_DESCRIPTOR standard device request received from the scanner device 106.

[Processing to Connect Peripheral Device as Mass Storage Device]

Figure 16:
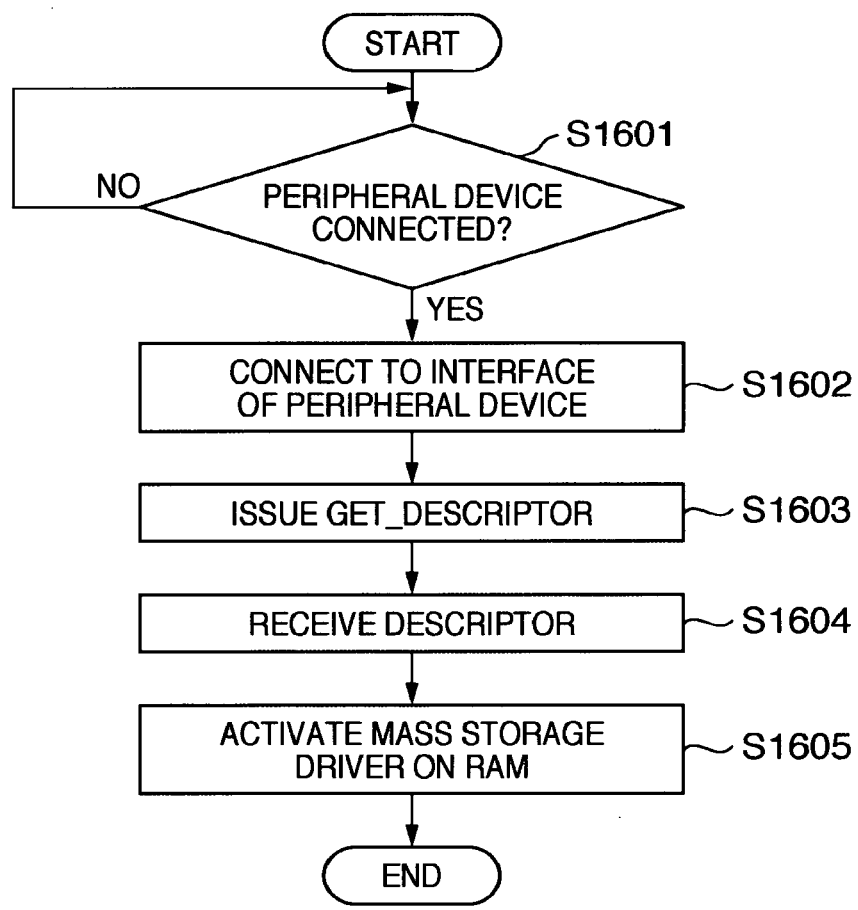
FIG. 16 is a flowchart illustrating an example of processing to connect a peripheral device as a mass storage device.
Figure 17:
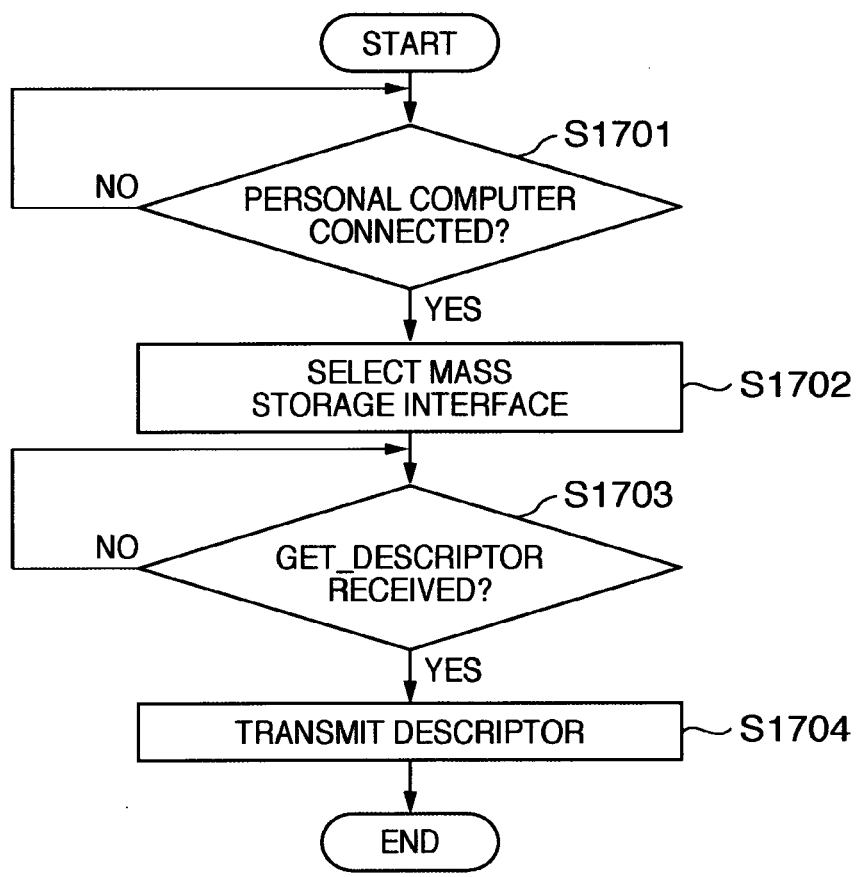
FIG. 17 is a flowchart illustrating an example of processing to connect a peripheral device as a mass storage device.

FIGS. 16 and 17 are flowcharts illustrating an example of processing to connect a peripheral device as a mass storage device. FIG. 16 shows processing in the computer 100. FIG. 17 shows processing in the peripheral device.

Referring to FIG. 16, the computer 100 monitors whether the scanner device 106 is connected (step S1601). Upon detecting connection of a peripheral device, the computer 100 is connected to the interface of the peripheral device (step S1602). The computer 100 issues a GET_DESCRIPTOR standard device request to the peripheral device (step S1603). The descriptor allows the computer to recognize the type of the connected peripheral device.

Referring to FIG. 17, when the scanner device 106 recognizes connection to the computer (S1701), the scanner device 106 controls a selector switch 221 of the scanner device 106 via software to select the USB mass storage interface by default. Therefore, the scanner device 106 causes the computer to connect to the USB mass storage interface (step S1702). Hence, the scanner device 106 receives the GET_DESCRIPTOR (S1703), and transmits a USB mass storage class code as the device class code of the standard device descriptor or the interface class code of the standard interface descriptor of the GET_DESCRIPTOR standard device request (step S1704).

Referring to FIG. 16, the operating system 101 on the computer 100 receives the USB mass storage class code as the device class code or the interface class code (step S1604). Then, the operating system 101 activates a USB mass storage driver associated with the USB mass storage class code or another client driver on a RAM 124, thereby connecting an internal selector switch 220 to a USB mass storage driver 202 via software (step S1605).

The switch 221 may be manual switch that allow manual switching by hand of the user. Another manual switch to generate an electrical signal for switching of the switch 221 may be provided independently. In these cases, the switch 221 cannot be switched via software under the control of the CPU 110, as described above. Otherwise, an indicator LED or the like may be provided so that the CPU 110 controls its lighting to make the user change connection of the switch 221 by hand.

[Processing of Switching to Scanner Device]

Figure 18:
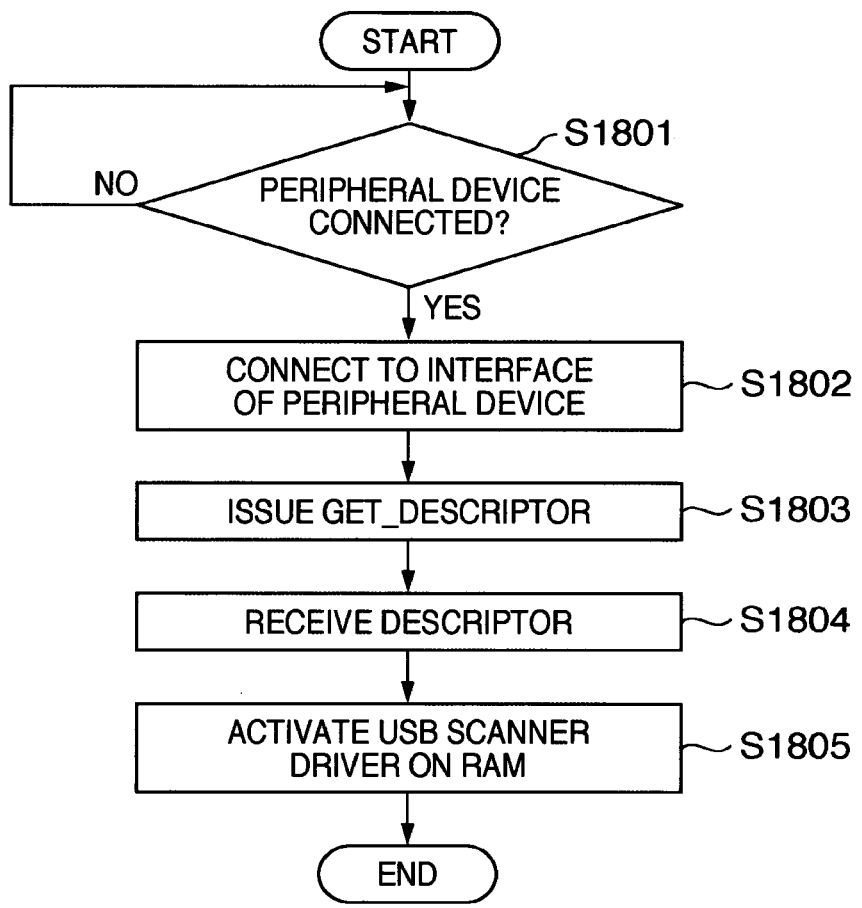
FIG. 18 is a flowchart illustrating an example of processing to connect a peripheral device as a scanner device.
Figure 19:
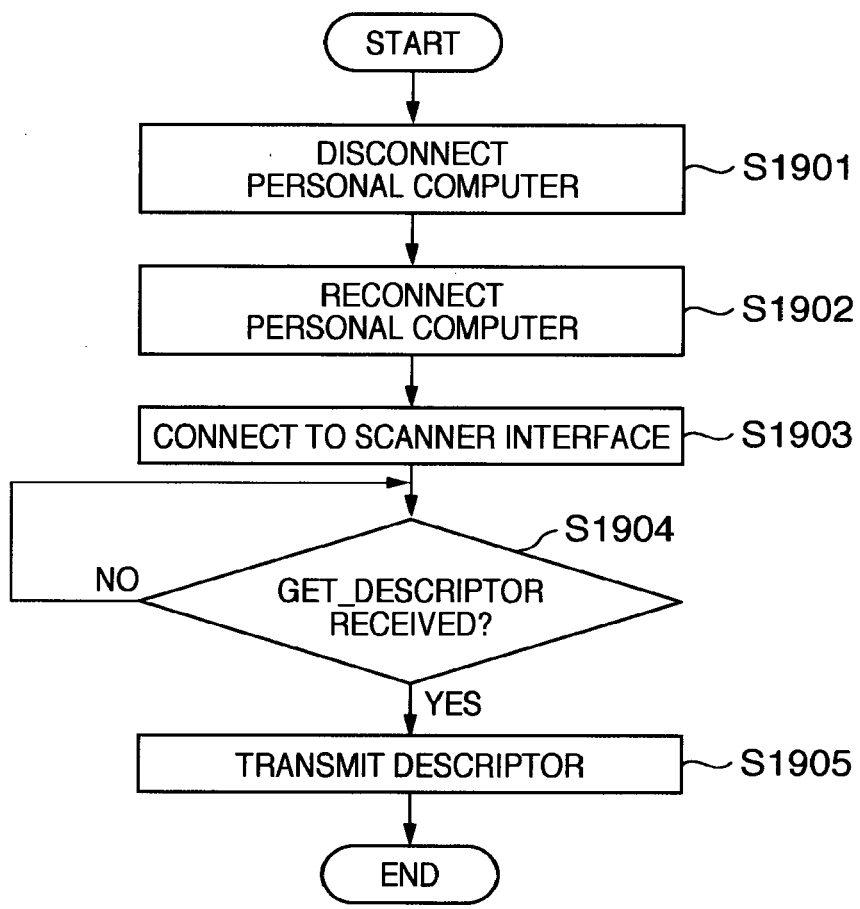
FIG. 19 is a flowchart illustrating an example of processing to connect a peripheral device as a scanner device.

FIGS. 18 and 19 are flowcharts illustrating an example of processing to connect a peripheral device as a scanner device. FIG. 18 shows processing in the computer 100. FIG. 19 shows processing in the peripheral device.

Referring to FIG. 19, when instructed to switch the interface class by the computer, the scanner device 106 exhibits behavior of making both D+ and D− signals of the USB bus zero and making a transition to a USB bus reset state to temporarily disconnect itself from the computer 100 (step S1901), and then making a transition to a connected state again (step S1902).

Referring to FIG. 18, the computer 100 monitors whether the scanner device 106 is connected (step S1801). The computer 100 acquires connection to the interface of the peripheral device (step S1802). The computer 100 issues a GET_DESCRIPTOR standard device request to the peripheral device (step S1803). The descriptor allows the computer to recognize the type of the connected peripheral device.

Referring to FIG. 19, the scanner device 106 changes the connection of the selector switch 221 to the USB scanner interface via software (step S1903). The scanner device 106 receives the GET_DESCRIPTOR (S1904), and transmits a USB scanner class code as the device class code of the standard device descriptor or the interface class code of the standard interface descriptor of the GET_DESCRIPTOR standard device request (step S1905).

The operating system 101 on the computer 100 receives the USB scanner class code as the device class code or the interface class code (step S1804). Then, the operating system 101 activates a USB scanner driver associated with the USB scanner class code or another client driver on the RAM 124, thereby connecting the internal selector switch 220 to the USB scanner driver 102 via software (step S1805).

In the above-described embodiment, the USB scanner class code is transmitted as a device class code or a interface class code. Instead, the scanner device may transmit no class (0), and the operating system may determine the class by referring to a definition file installed in the computer 100 based on the vendor ID and product ID of the standard device descriptor.

The above embodiments have been described by exemplifying an image reading device (scanner) as the peripheral device. However, the peripheral device of the present invention may be an image forming device (printer) or a multifunction peripheral having an image reading function and an image forming function. In this case, the image processing unit corresponds to an image forming unit, and the capture application corresponds to a print application.

More specifically, the CPU 121 writes data of a print job in the control file 204 stored in a memory (which is recognized as a readable/writable disk drive assigned a drive letter) of the peripheral device in accordance with the print application. The CPU 110 of the peripheral device monitors the control file 204. When the print job data is written by the print application, the CPU 110 reads out and transfers it to the image forming unit (printer engine). The CPU 110 may convert (e.g., rasterize) the print job data as needed. This enables the image forming unit to execute print processing. That is, the peripheral device may be an image forming device.

Note that, if the device driver of the peripheral device is not installed in the computer, the peripheral device cannot perform printing by conventional control method. In this embodiment, the print application is activated from the storage unit of the peripheral device by CPU 121. When application software (e.g., word processor or image editing software) on the computer outputs the print object data as a file having a general-purpose format, the CPU 121 converts the file in the general-purpose format into print job data and writes it in the control file 204 by activated print application. The file in the general-purpose format may directly be written in the storage unit of the peripheral device. This allows the peripheral device to execute printing without installing its device driver.

Fifth Embodiment

An OS generally includes the device driver of an external storage device by default but does not necessarily have the device driver of an image processing device by default, therefore control of the image processing device is not always possible.

It is an object of the present invention to solve at least one of such and other problems. For example, the present invention has as its object to control the operation mode switching of a peripheral device depending on whether a device driver is already installed in an information processing device (PC). Note that other problems will be apparent throughout the specification.

Figure 20:
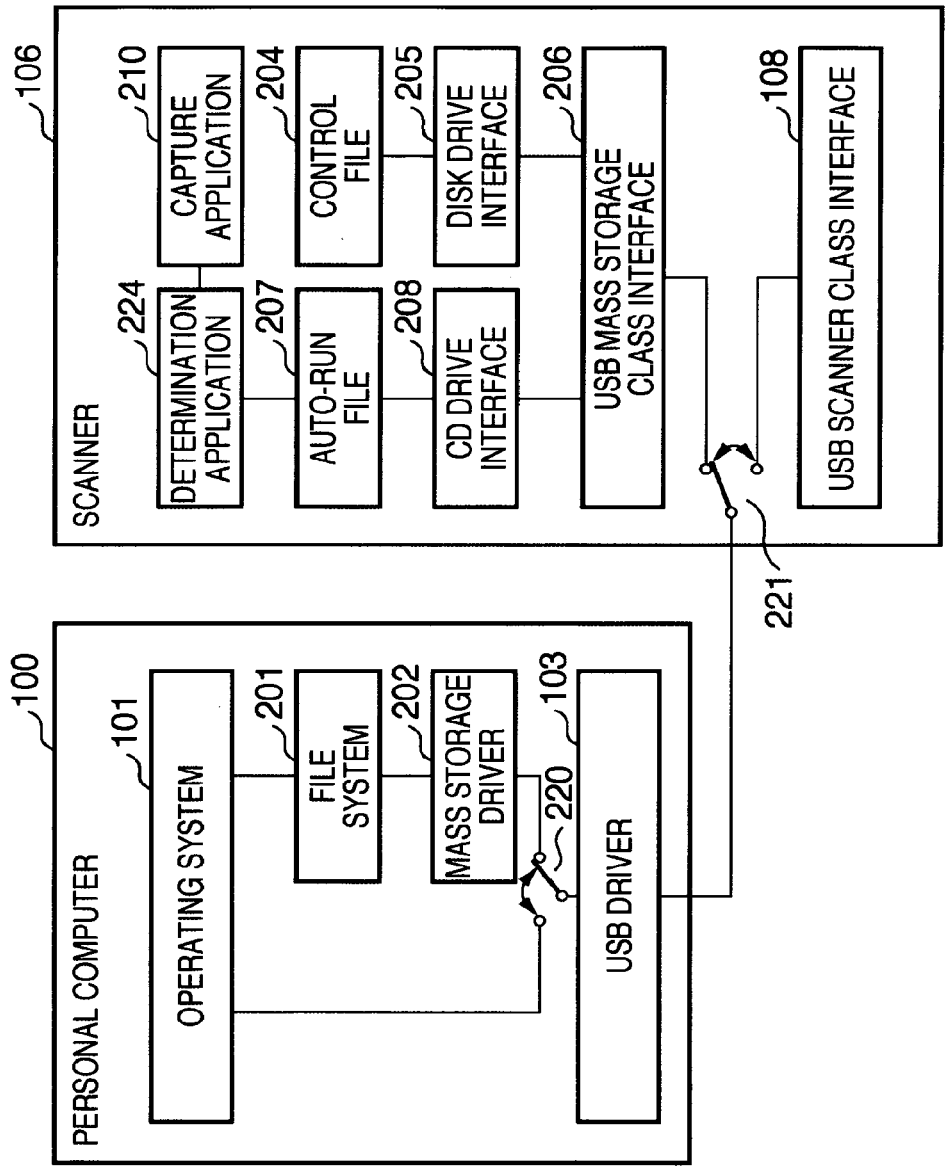
FIG. 20 is a software block diagram of a computer and a scanner device.

FIG. 20 is a software block diagram of a computer and a scanner device. A computer 100 is a host computer such as a personal computer (PC). The computer 100 will be described here as an example of an information processing device.

An operating system 101, file system 201, USB mass storage driver 202, and USB interface driver 103 are installed in a computer 100. The operating system 101 is a so-called OS which is the fundamental software of the computer 100. The file system 201 is software to store files in a storage device such as a hard disk drive. The USB mass storage driver 202 is software to control mass storages such as a hard disk drive, CD-ROM, DVD-ROM, CD-R, DVD-R, DVD+R, CD-RW, DVD-RW, DVD+RW, DVD-RAM, BD-ROM, BD-R, BD-RE, and USB memory, and the like. The USB interface driver 103 is software to control a USB device connected to a USB interface. These software programs may constitute part of the OS.

A switch 220 makes it possible to switch connection to a device driver other than the USB mass storage driver 202. The switch 220 can be implemented either by software or by hardware using an electronic switch capable of electrical switching. The switch 220 may be implemented using both software and hardware.

On the other hand, a scanner device 106 that is an example of a peripheral device includes a capture application 210, control file 204, USB disk drive interface 205, and USB mass storage class interface 206. The capture application 210 is software to be executed on the computer 100 to control image reading. The control file 204 is a file accessed to write thereon, for example, a control command from the computer 100 which is executing the capture application 210. The USB disk drive interface 205 is software to use a memory (e.g., RAM, flash memory or EEPROM) in the scanner device 106 as a disk drive. The USB mass storage class interface 206 is software to use a memory as a USB mass storage via the USB disk drive interface 205.

The scanner device 106 has not only the USB disk drive interface 205 but also a USB CD drive interface 208 as the subclasses of the USB mass storage class interface 206. The USB CD drive interface 208 is an interface to make the computer 100 use part of the memory of the scanner device 106 as a CD-ROM drive. A nonvolatile memory area used as the CD-ROM drive stores an auto-run file 207, a determination application 224, and the capture application 210.

Note that the USB CD drive interface 208 can be any one of a USB CD-ROM drive interface, USB CD-R drive interface, and USB CD-RW drive interface. The USB CD-R drive interface and the USB CD-RW drive interface are interfaces which allow the computer 100 to use part of the readable/writable memory of the scanner device 106 while regarding the memory area as a CD-R disk in a CD-R drive or a CD-RW disk in a CD-RW drive.

The auto-run file 207 includes information to instruct automatic execution of the determination application 224 on the computer 100. The auto-run file 207 is, for example, autorun.inf. If the operating system 101 is Microsoft Windows®, "autorun.inf" is executed when a data CD has been mounted in the CD drive. The auto-run file 207 is accessed via the USB CD drive interface 208 and therefore activated automatically. The determination application 224 is a determination program which is executed on the computer 100 to determine whether a device driver for controlling of an image processing unit (e.g., USB scanner class interface 108 or image reading unit) from the computer 100 has already been installed in it.

The capture application 210 is software which is executed on the computer 100 for controlling of image reading. The capture application 210 works well for a PC having no device driver or a PC that restricts installation of device drivers and applications. This is because the capture application 210 is software capable of directly controlling the scanner device 106 without installing a device driver or some capture application in a PC.

The scanner device 106 includes the USB scanner class interface 108 and a switch 221. When the determination application 224 determines that a device driver is installed in the computer 100, the switch 221 is controlled based on determined result to switch the scanner device 106 from an external storage device (USB mass storage class interface) to an image processing unit (USB scanner class interface 108). Note that upon determining that no device driver is installed in the computer 100, the switch 221 is not controlled to switch the scanner device 106 from an external storage device (USB mass storage class interface) to an image processing unit (USB scanner class interface 108). That is, the scanner device 106 remains recognized by the computer 100 as an external storage device.

Alternatively, when determining that no device driver is installed in the computer 100, the computer may temporarily cancel the state in which the scanner device 106 is recognized as an external storage device (USB mass storage class interface) by default, and then recognize the scanner device 106 again as an external storage device (USB mass storage class interface).

The hardware blocks of the computer and scanner device are the same as in FIG. 2, and a description thereof will not be repeated.

In the present embodiment, the scanner device 106 can read an image while being recognized by the OS as an external storage device. More specifically, when the computer 100 loads and executes the capture application 210 on a RAM 124, the CPU 121 writes various kinds of control commands in the control file 204 in accordance with the capture application 210. The CPU 110 of the scanner device 106 monitors writing access to the control file 204, and when a command is written in it, executes the command. The CPU 110 writes, in the control file 204, image data of an image read in accordance with the command. The CPU 121 extracts the image data from the control file 204 and creates an image file by concatenating image data in accordance with the capture application 210. That is, intervention of the control file 204 allows the scanner device 106 to read an image while being recognized by the OS as a USB memory or the like.

When a device of some kind is connected to a USB interface 104 via a USB cable 105, the operating system 101 on the computer 100 accesses as the device having USB mass storage class interface and determines its type. The scanner device 106 includes the USB mass storage class interface 206 which allows the scanner device to be recognized as a mass storage device class by the operating system 101, and the USB scanner class interface 108 which allows the scanner device to be recognized as a USB scanner class device.

The switch 221 alternatively switches the two USB class interfaces. Note that the switch 221 may enable interfaces of two classes simultaneously as a third control mode. The switch 221 can be implemented either by software or by hardware using an electronic switch capable of electrical switching. The switch 221 may be implemented using both software and hardware.

The scanner device 106 stores, in advance, the capture application 210 which runs on the operating system 101 and causes the scanner device 106 to read an image from the computer 100, the determination application 224 which determines whether the capture application 222 and a USB scanner driver 102 are installed in advance in the computer 100. Also, the scanner device 106 stores, in advance, the auto-run file 207 which is automatically executed when the scanner device 106 is connected to the computer 100, and the control file 204 for controlling the scanner device 106.

The computer 100 accesses the capture application 210, determination application 224, and auto-run file 207 via the USB CD drive interface 208. The computer 100 accesses the control file 204 via the USB disk drive interface 205.

As described above, the operating system 101 has a function of detecting and automatically executing a file called "autorun.inf" on a data CD when it is mounted in the CD drive. The auto-run file 207 is accessed via the USB CD drive interface 208. It is therefore necessary to make the computer 100 virtually recognize that a data CD is mounted. The CPU 110 outputs a signal virtually representing CD insertion to the computer 100 via the USB interface 107. More specifically, when the scanner device is connected to the computer 100, the CPU 110 causes it to virtually recognize that no data CD is mounted in the CD drive. Immediately after that, the CPU 110 makes the computer 100 virtually recognize that a CD is mounted, thereby controlling to automatically execute the auto-run file 207. The operating system 101 and the CPU 121 detect mounted data CD, read out and analyze autorun.inf, and activate the determination application which is read out.

The computer 100 forms, in a file folder associated with the file system 201, tables corresponding to the control file 204, capture application 210, determination application 224, and auto-run file 207 stored in the scanner device 106.

Figure 21:
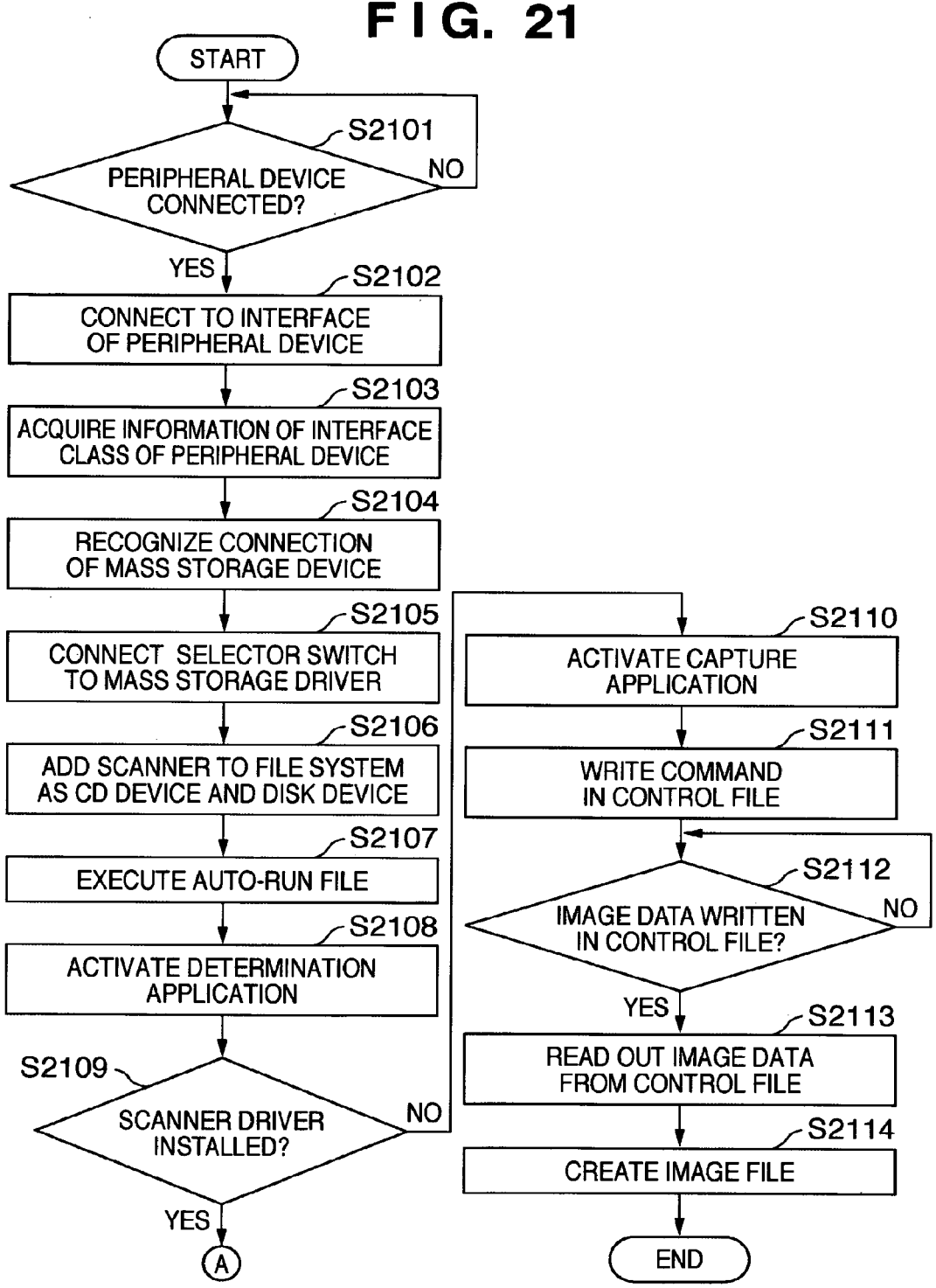
FIG. 21 is a flowchart illustrating a sequence that causes a scanner device 106 to perform image reading from a computer 100 using a capture application 210.
Figure 22:
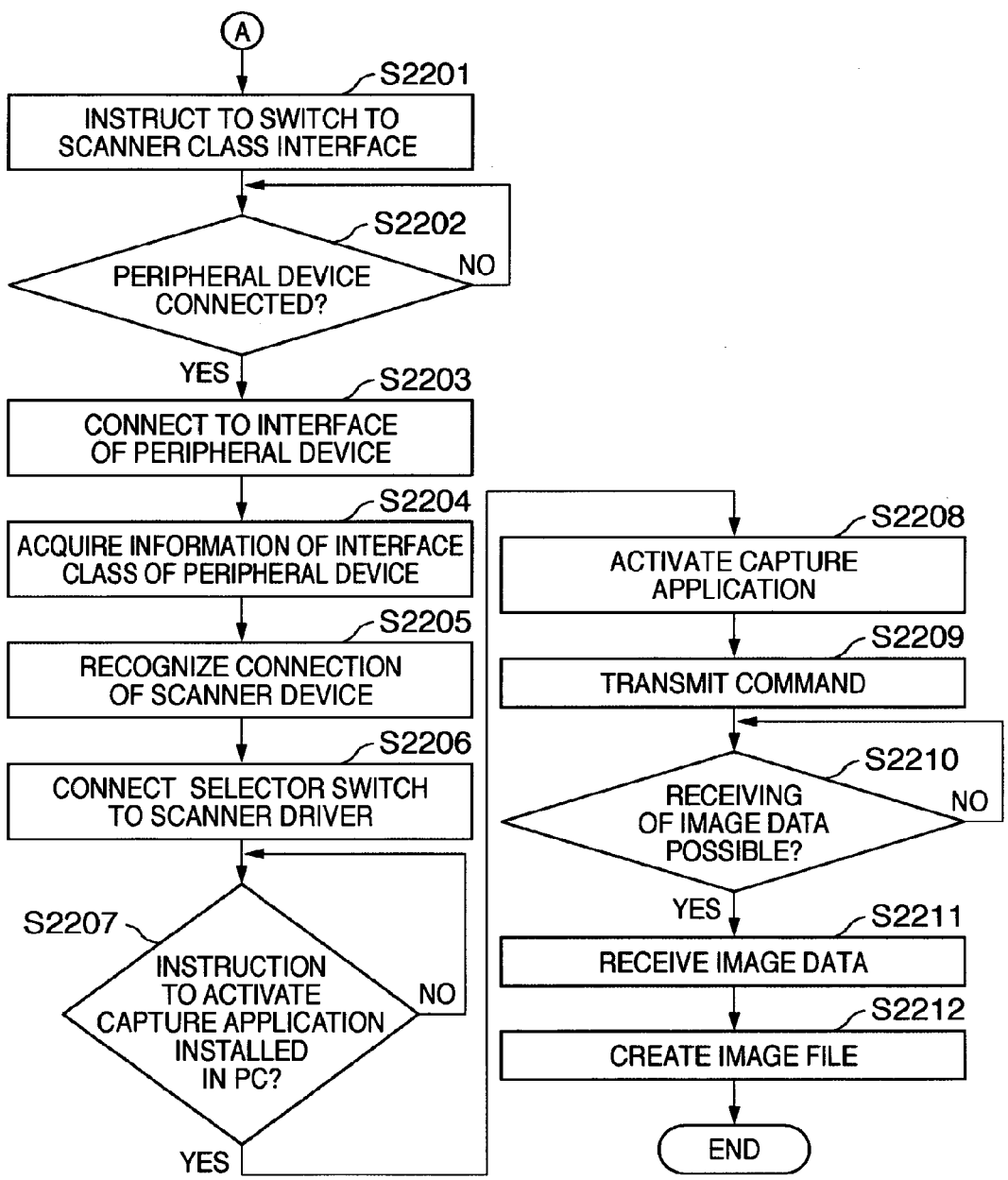
FIG. 22 is a flowchart illustrating a sequence that causes a scanner device 106 to perform image reading from a computer 100 using a capture application 210.

FIGS. 21 and 22 are flowcharts illustrating a sequence that causes the scanner device 106 to perform image reading from the computer 100 using the capture application 210.

The CPU 121 of the computer 100 monitors whether a peripheral device (scanner device 106) is connected (step S2101). The CPU 121 of the computer 100 connects the scanner device 106 as the device having USB mass storage class interface (step S2102). The computer 100 acquires the information of the interface class and the like of the peripheral device (the scanner device 106) (step S2103). The CPU 121 can recognize the type of the connected peripheral device based on the information.

At the time of recognizing the type of the peripheral device, the selector switch 221 of the scanner device 106 is switched to the USB mass storage interface 206. Hence, the CPU 121 of the computer 100 recognizes the scanner device 106 as a USB mass storage device (step S2104).

The CPU 121 of the computer 100 connects the internal selector switch 220 to the USB mass storage driver 202 (S2105). The scanner device 106 has the USB CD drive interface 208 and the USB disk drive interface 205 as the subclasses of the USB mass storage class interface 206. Hence, the operating system 101 and the CPU 121 add the connected scanner device 106 to the file system as a CD drive and a disk drive (step S2106).

The operating system 101 forms, in a file folder associated with the file system 201, tables corresponding to the control file 204, capture application 210, determination application 224, and auto-run file 207 stored in the scanner device 106. This causes the CPU 121 to recognize the control file 204 stored in the scanner device 106 as a file on the disk drive assigned a drive letter (e.g., D). The CPU 121 can also handle the capture application 210, determination application 224, and auto-run file 207 as files on the CD drive assigned a drive letter (e.g., E).

FIG. 23 is a view showing a state in which file management software (Explorer) has opened a CD drive (scanner) assigned a drive letter. A memory region provided by the scanner device 106 corresponds to a folder 302. The memory region is accessible from the computer 100 as the folder 302. The user can open the folder 302 using a keyboard/mouse 125 connected to the computer 100. The folder 302 stores the capture application 210 (file name: CaptureApplication.exe), the determination application 224 (file name: Judge.exe), and the auto-run file 207 (file name: Autorun.inf).

As already shown in FIG. 9, a memory region provided by the scanner device 106 corresponds to a folder 303. The folder 303 is readable/writable from computer 100 and stores the control file 204 (file name: Control.dat).

Next, the operating system 101 (CPU 121) determines that a data CD is inserted in the CD drive, and starts processing of loading the auto-run file 207 (automatic execution information file) from the scanner device 106 to the RAM 124 and automatically checking its contents (S2107). The auto-run file 207 is described to activate the determination application 224. Hence, the operating system 101 loads the determination application 224 from the scanner device 106 to the RAM 124 and automatically activates it (S2108). The determination application 224 determines whether both a device driver (USB scanner driver 102) corresponding to the scanner device 106 and an arbitrary capture application (e.g., image editing software) are previously installed (S2109). This is because image reading is not executable if at least one of them is absent. However only simple reading can be done using only the scanner driver. In this case, the determination application may only determine installation of the scanner driver.

Upon determining that at least one of the arbitrary capture application and the USB scanner driver 102 is not installed, the determination application 224 performs operation for activation of the capture application 210 (S2110). More specifically, the operating system 101 and the CPU 121 load the capture application 210 from the scanner device 106 to the RAM 124 and activates it. The CPU 121 recognizes the scanner device 106 as an external storage device and can therefore activate the capture application 210 directly.

A display 126 is connected to the computer 100. It is therefore possible to display various kinds of user interfaces. An example of a user interface displayed upon activating the capture application 210 is shown in FIG. 5. When the user interface of the capture application 210 is displayed, the user executes scan setting by operating the keyboard/mouse 125. The user finally clicks on a scan button 301 using the keyboard/mouse 125.

When the user clicks on the scan button 301 using the keyboard/mouse 125, the capture application 210 (CPU 121) receives the scan settings and writes them in the control file 204 stored in the scanner device 106. The CPU 121 also writes scan start command data in the control file 204 (step S2111).

The CPU 110 of the scanner device 106 monitors the control file 204. Upon detecting that the scan settings and scan start command data are written in the control file 204, the CPU 110 reads out the control file 204, and controls an image reading unit 112 in accordance with the written scan settings, thus starting scan.

The scanner device 106 starts scanning and writes an image read by the image reading unit 112 in a control file. This control file may be the same as the control file that enables scan setting, or different.

The CPU 121 of the computer 100 monitors whether the image data is written in the control file 204 (step S2112). Upon detecting that the image data is written in the control file 204, the CPU reads out the image data from the control file 204 (step S2113). The CPU 121 creates a designated image file (file name "test1" in the embodiment), and stores it in a hard disk drive 122 (step S2114).

Figure 24:
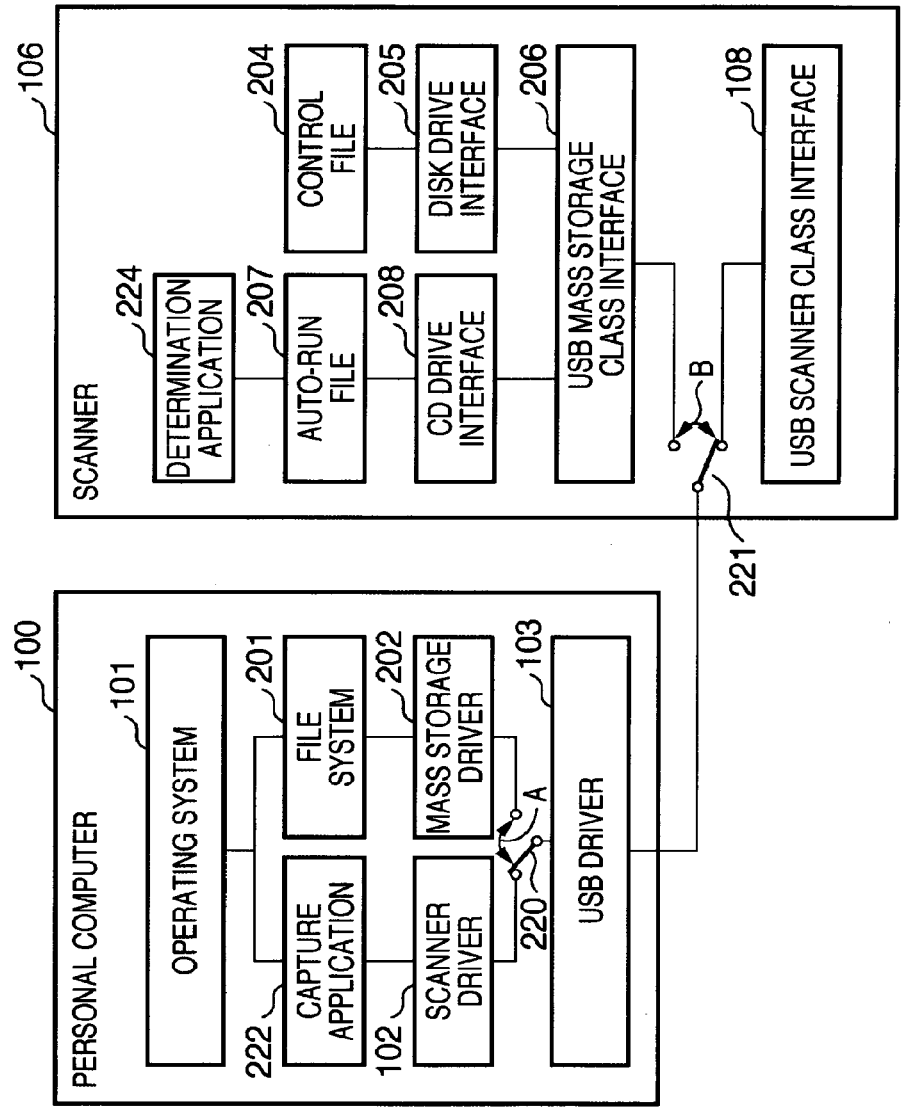
FIG. 24 is a software block diagram of a computer 100 in which a user having administrator's privileges has already installed an arbitrary capture application 222 and a USB scanner driver 102.

FIG. 24 is a software block diagram of the computer 100 in which a user having administrator's privileges has already installed arbitrary capture application 222 and the USB scanner driver 102.

In general, any capture application 222 to cause the scanner device 106 to perform image reading and the USB scanner driver 102 to connect the scanner device 106 via a USB are not prepared in the operating system 101 on a standard basis. For this reason, it is usually necessary to install, in the computer 100, the USB scanner driver 102 and the capture application 222 to receive an image from the scanner device 106 via the USB scanner driver 102.

However, a user having no administrator's privileges is sometimes unable to install the capture application 222 and the USB scanner driver 102 in the computer 100. If they are not installed because of installation restrictions, steps S2110 to S2114 are executed.

On occasion, a user having administrator's privileges previously installs these software programs into the computer 100. In this case, the CPU determines in step S2109 that the software programs have already been installed, and the process advances to step S2201 in FIG. 22. Note that the switch 220 alternatively switches (selects) the USB mass storage driver 202 and the USB scanner driver 102.

A detailed operation will be described with reference to FIG. 22. The scanner device 106 is recognized as a mass storage device by default. Upon determining that the capture application 222 and the USB scanner driver 102 have been installed, the determination application 224 (CPU 121) transmits an instruction to the scanner device 106 to reconnect itself via the USB scanner class interface 108 (step S2201). Upon accepting the interface class switching instruction, the CPU 110 of the scanner device 106 temporarily makes a transition from the state connected to the computer 100 to a disconnected state, and then makes a transition to the connected state again.

At this time, the operating system 101 (CPU 121) detects connection of a peripheral device of some kind to the USB interface 104 (step S2202). The CPU 121 connects the scanner device 106 as the device having the USB mass storage class interface (step S2203). When the computer 100 accesses via the USB interface 107, the CPU 110 of the scanner device 106 switches the selector switch 221 from the USB mass storage class interface 206 to the USB scanner class interface 108, thereby causing the computer 100 to access the USB scanner class interface 108. The computer 100 acquires the information of the interface class and the like of the peripheral device (step S2204) and thus recognizes the connected peripheral device as a scanner device (step S2205).

On the other hand, the CPU 121 operates the switch 220 in accordance with the determination program (determination application) to switch the connection destination of the USB interface driver 103 from the USB mass storage driver 202 to the USB scanner driver 102 (S2206).

The CPU 121 receives an activation instruction from the user, and activates the capture application 222 installed in the computer 100 (steps S2207 and S2208). Note that the display 126 is connected to the computer 100 so that it is possible to display various kinds of user interfaces. The capture application 222 can have either the user interface shown in FIG. 5 or a different user interface. In this embodiment the user interface is assumed to be the same as in FIG. 5 for the descriptive convenience.

The user selects, on the capture application 222, a reading mode (monochrome in the embodiment), paper size (A4 in the embodiment), resolution (300 dpi in the embodiment), and reading surface (double-side in the embodiment) using the keyboard/mouse 125, inputs the storage file name (test1 in the embodiment) using the keyboard/mouse 125, and presses or clicks on the scan button 301 using the keyboard/mouse 125.

When the user presses or clicks on the scan button 301 using the keyboard/mouse 125, the capture application 222 (CPU 121) transmits the scan settings and also a scan start command from the USB scanner driver 102 to the scanner device 106 via the USB interface driver 103 and the USB interface 104 (step S2209).

The scanner device 106 detects that the scan settings and scan start command have been received from the USB interface 107 via the USB scanner class interface, and starts scan based on the received scan settings. The CPU 110 transmits image data read by the image reading unit 112 from the USB scanner class interface 108.

The CPU 121 of the computer 100 receives, via the USB interface 107, the image data transmitted from the scanner device 106 (steps S2210 and S2211). The capture application 222 (CPU 121) generates an image file given a designated file name (test1 in the embodiment) from the received image data, and stores it (step S2212).

As described above, according to this embodiment, if a scanner driver is already installed, the information processing device recognizes the peripheral device as an image processing device. If no scanner driver is installed, the information processing device recognizes the peripheral device as an external storage device readable/writable by the information processing device. As described above, if at least one of a plurality of software programs (capture application and driver) necessary for image reading is not installed, the information processing device may recognize the peripheral device as an external storage device. In this case, the peripheral device such as the scanner device 106 is usable as an external storage device. When all control programs such as a scanner driver required for image reading are installed, the information processing device recognizes the peripheral device as a scanner device, as a matter of course.

The determination program (determination application) that is a file of an automatic execution type saves the user instructing its activation.

In this embodiment, if necessary control programs such as a device driver are not installed, the capture application 210 stored in the scanner device 106 is activated to enable image reading. For example, to install a scanner driver, the user sometimes needs administrator's privileges for the operating system 101. Such a situation will occur when the user is going to use a PC on the road. In this embodiment, installation of a scanner driver and the like is unnecessary. This allows even a restricted user or general user who cannot log in without administrator's privileges to execute image reading.

It goes without saying that on the computer 100 in which a user having administrator's privileges has already installed the capture application 222 and the USB scanner driver 102, any user can execute image reading using the general-purpose capture application with the scanner device of this embodiment.

The scanner device 106 is recognized as a mass storage device by default when connected to the computer 100. This prevents the operating system 101 from recognizing it as an unknown device because of the absence of an installed device driver. Activation of the driver installation wizard of the operating system 101 can also be avoided.

In this embodiment, an example has been described in which scan is started from the capture application 210. However, scan may start when the CPU 110 detects press of a start button arranged on the scanner device 106. At this time, the capture application 210 (CPU 121) may monitor the start button on the scanner device 106 via the control file 204. In this case, the CPU 110 writes, in the control file 204, that the start button is pressed.

The capture application 210 may instruct the scanner device 106 to start scanning via the control file 204. Alternatively, the capture application 210 may determine that scan has started upon detecting image data generation in the control file 204, and store the image file in the hard disk drive.

In this embodiment, the capture application 210 is activated to display a user interface responding the connection of the scanner device 106. The capture application 210 may become resident in the operating system 101 when first connection of the scanner device 106 is performed.

In this embodiment, the capture application 210 has no image display function. However, the capture application 210 may have an image display function.

If the USB CD drive interface does not exist, an area that is recognized as an area readable/writable via the USB disk drive interface may store the automatic execution information file and the determination application. This enables automatically activating the determination application in accordance with the contents described in the automatic execution information file.

Sixth Embodiment

Figure 25:
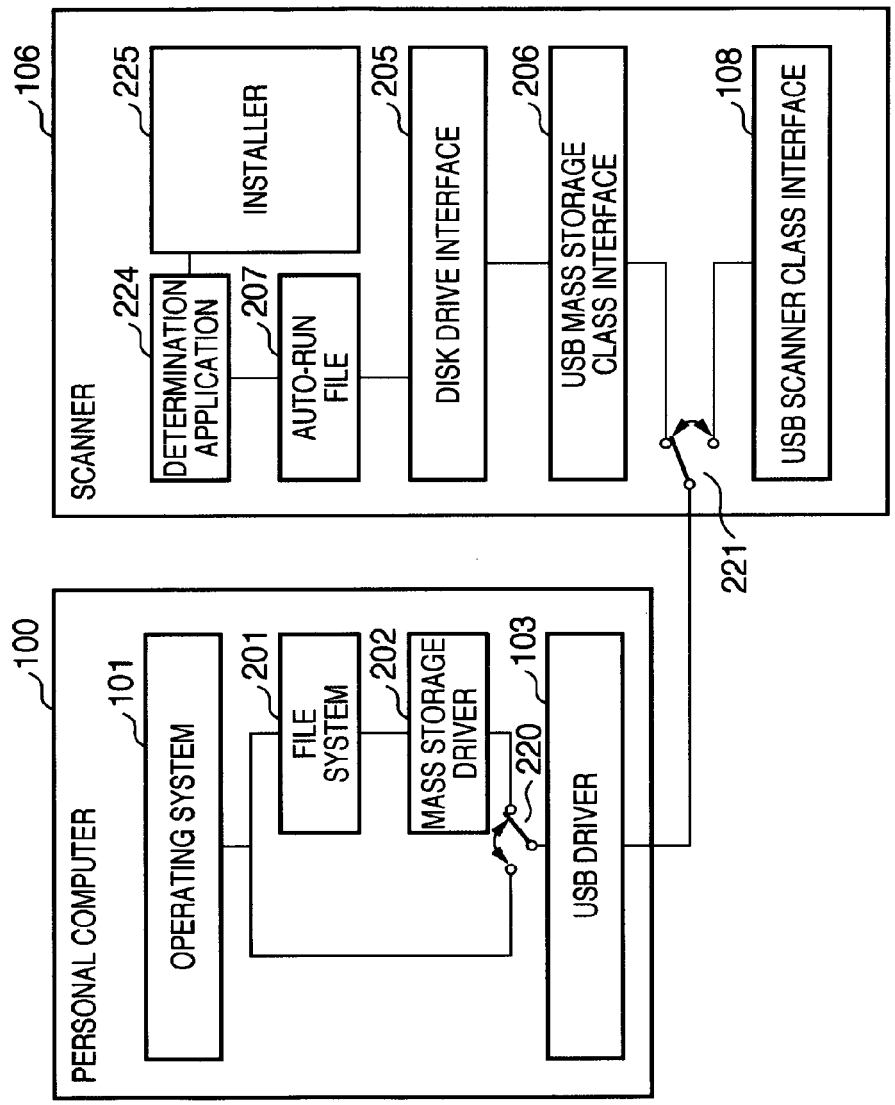
FIG. 25 is a software block diagram of a computer and a scanner device.

FIG. 25 is a software block diagram of a computer and a scanner device. The same reference numerals as in FIG. 1 and the like denote the same parts in FIG. 25. In particular, a capture application 210, control file 204, and USB disk drive interface 205 are removed from a scanner device 106. Instead, the scanner device 106 employs an installer 225. The installer 225 is software to install, in a computer 100, control programs such as a scanner driver necessary for image reading. The necessary control programs are, for example, a capture application 222 and a USB scanner driver 102 described above. A CPU 121 determines in accordance with a determination application 224 whether these control programs have been installed. If the control programs have not been installed yet, the scanner device 106 transmits them to the computer 100 and installs them. The CPU 121 can access the installer 225, the determination application 224, and an auto-run file 207 via a USB CD drive interface 208. The auto-run file 207 is, for example, autorun.inf which causes the CPU 121 to automatically activate the determination application 224. The determination application 224 causes the CPU 121 to activate the installer 225.

Figure 26:
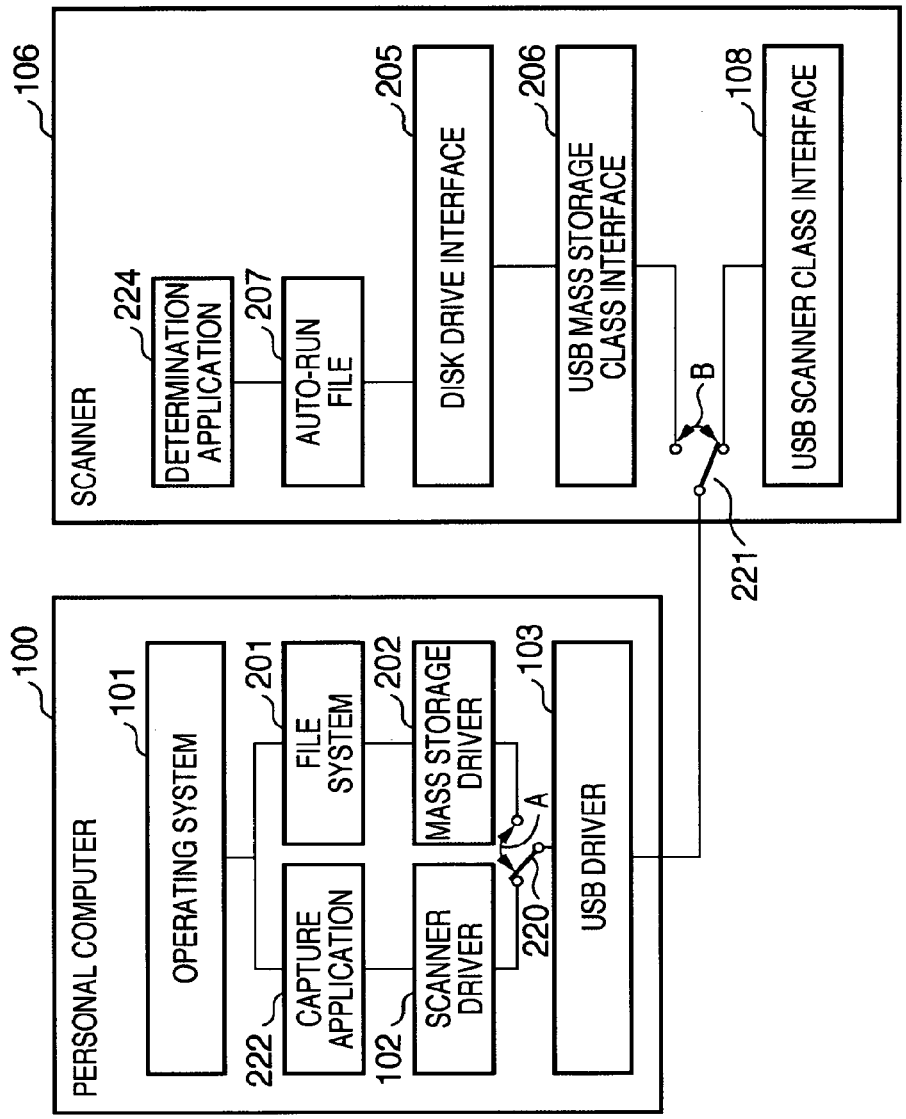
FIG. 26 is a software block diagram of the computer and the scanner device.

FIG. 26 is a software block diagram of the computer and the scanner device. FIG. 26 illustrates a state in which the capture application 222 and the USB scanner driver 102 are installed in the computer 100. In this case, the CPU 121 changes the connection of a switch 220 from a USB mass storage driver 202 to the USB scanner driver 102. This switching is executed depending on the determination result of the determination application 224.

Figure 27:
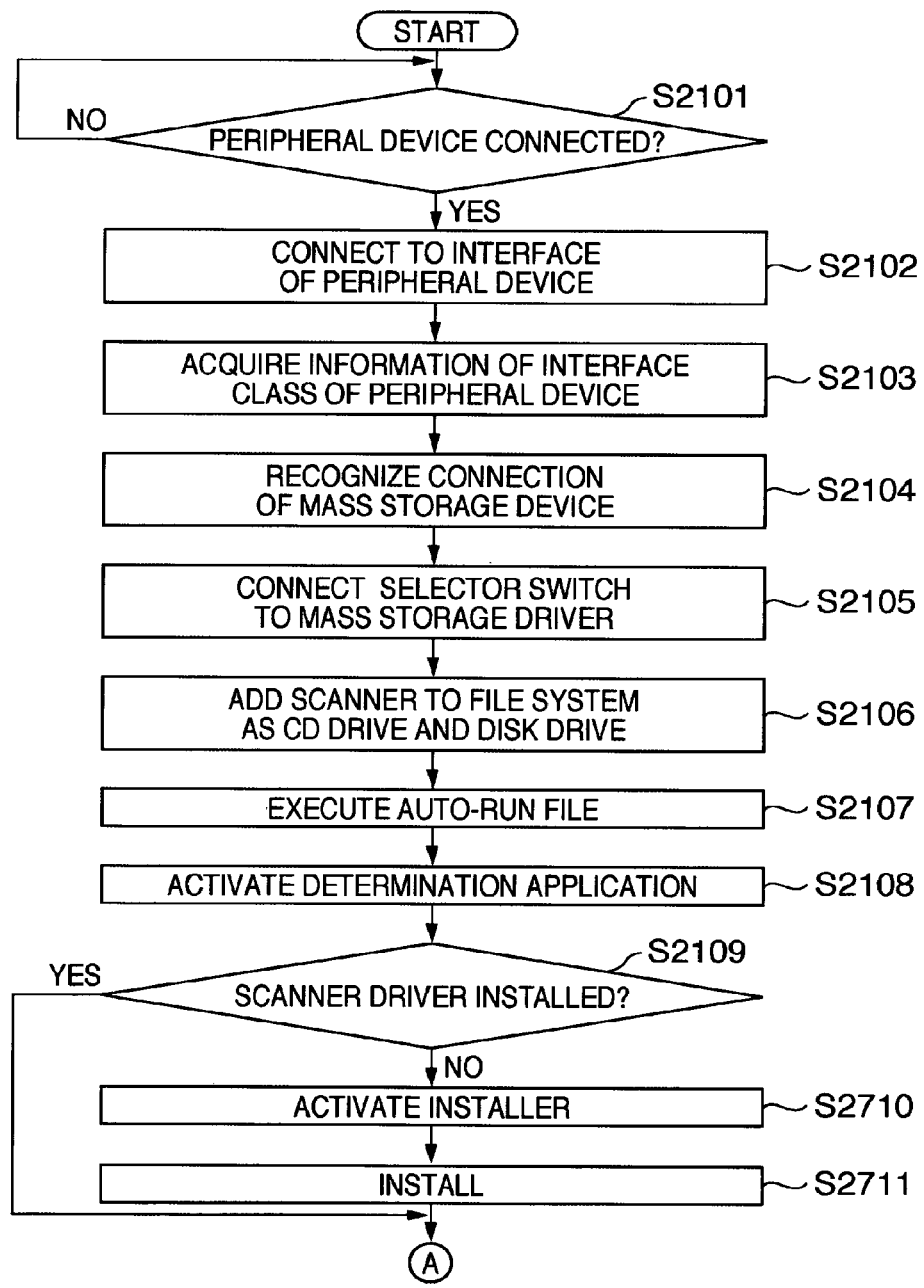
FIG. 27 is a flowchart illustrating image reading according to the sixth embodiment.

FIG. 27 is a flowchart illustrating image reading according to the sixth embodiment. Processes common to FIG. 21 are given the same step numbers to simplify the description. Steps S2101 to S2108 are executed to cause the CPU 121 to activate the determination application 224.

The CPU 121 determines in accordance with the determination application 224 whether the capture application 222 and the USB scanner driver 102 are installed (S2109). The CPU 121 searches for a file having a predetermined file name or analyzes the contents of a registry, thereby determining whether these software programs have already been installed. If they are not installed, the process advances to step S2710. Otherwise, the process advances to step S2201 in FIG. 22.

The CPU 121 activates the installer 225 in accordance with the determination application 224 (S2710). The installer 225 installs the capture application 222 and the USB scanner driver 102 in the computer 100 (S2711). The installer 225 includes the capture application 222 and the USB scanner driver 102 in a compressed state. When installation has ended, the internal configuration of the computer 100 changes to that shown in FIG. 26. Then, the process advances to step S2201 in FIG. 22.

Note that only some software components of the capture application 222 and the USB scanner driver 102 are sometimes installed in the computer 100. In this case, the CPU 121 preferably installs only necessary software components from the viewpoint of shortening the operation time. Already installed software may be overwritten by installation, as a matter of course.

As described above, according to the sixth embodiment, when software programs necessary for image reading are not installed, they can be installed from the scanner device 106. Hence, even when a dedicated CD-ROM storing the software programs is lost, or the dedicated CD-ROM is not packed in the product package, the scanner device 106 is usable. This also saves the user searching for the software programs through Web sites.

The fifth and sixth embodiments have been described by exemplifying an image reading device as the peripheral device. However, the peripheral device of the present invention may be an image forming device (printer) or a multi-function peripheral having an image reading function and an image forming function. In this case, the image processing unit corresponds to an image forming unit, and the capture application corresponds to a print application.

More specifically, the CPU 121 writes data of a print job in the control file 204 stored in a memory (a readable/writable disk drive assigned a drive letter) of the peripheral device in accordance with the print application. The CPU 110 of the peripheral device monitors the control file 204. When the print job data is written, the CPU 110 reads out and transfers it to the image forming unit (printer engine). The CPU 110 may convert (e.g., rasterize) the print job data as needed. This enables the image forming unit to execute print processing. That is, the peripheral device may be an image forming device.

Note that, in case the device driver of the peripheral device is not installed in the computer, the peripheral device in the marketplace cannot perform printing by ordinary method. In this embodiment, the print application is loaded and activated, from the storage unit of the peripheral device by CPU 121. When application software (e.g., word processor or image editing software) on the computer outputs the print object data as a file having a general-purpose format, the CPU 121 converts the file in the general-purpose format into print job data and writes it in the control file 204 by activated print application. The file in the general-purpose format may directly be written in the storage unit of the peripheral device. This allows the peripheral device to execute printing without installing its device driver.

When the capture application 222 and the USB scanner driver 102 are installed in the computer 100 from the scanner device 106, the CPU 121 may forcibly uninstall (delete) them. For example, when an instruction to detach the peripheral device is input by, for example, disconnecting the scanner device 106 from the computer 100, the CPU 121 deletes the capture application 222 and the USB scanner driver 102. Alternatively, the CPU 121 may delete them when the user's scan operation has ended. In this case, since the determination application 224 stays resident, the CPU 121 monitors in accordance with the determination application 224 whether the scanner device 106 has been detached, or the capture application 222 has ended.

When the capture application 222 and the USB scanner driver 102 are installed in the computer 100, the CPU 121 may compare the versions of the software modules held in the scanner device 106 with those of the installed software modules. Only when the versions of the software modules stored in the scanner device 106 are newer, they may be installed in the computer 100.

In this embodiment, scan settings are written in the control file 204 stored in a RAM 203. Hence, the settings are not saved. Instead, the scan settings done in the scanner device 106 may be stored in, for example, a nonvolatile memory (not shown). Settings may be stored for each user of an operating system 101.

This embodiment has been described by exemplifying an operation on the Microsoft Windows® operating system. However, this is merely an example. The technical idea of the present invention is also applicable to any other operating system such as an operating system of Apple Computer or a Linux operating system.

In the above-described embodiment, when the operating system 101 on the computer 100 recognizes the scanner device as a readable/writable external storage device to execute the software described in autorun.inf, the scanner device is recognized as a CD-R drive or a CD-RW drive. It may be recognized as a DVD drive of standard such as DVD-RW or a Blu-ray standard drive.

Seventh Embodiment

The several embodiments described above concern an invention which makes an image reading device usable without installing device drivers and software in a computer. More specifically, the information processing device recognizes the image reading device as an external storage device. An image file is written in the external storage device, and the information processing device reads out the image file. This invention uses the properties of the operating system (OS) for controlling the information processing device, which does not include the device driver of the image reading device but includes that of the external storage device.

However, it is conceivable that the storage device of the image reading device can not store a whole image file (e.g. one page) depending on its size. In this case, the image reading device can transfer only a very small image file to the information processing device. That is, it may be impossible to sufficiently exploit the capability of the image reading device.

The seventh embodiment therefore has as its object to, for example, allow the image reading device to read a relatively large image without installing its device driver in the computer.

The software blocks of a computer exemplified as a general information processing device and a scanner serving as an image reading device according to the seventh embodiment are the same as in FIG. 1. Their hardware blocks are the same as in FIG. 2.

According to FIG. 2, a scanner device 106 includes a CPU 110, ROM 127 (software storage unit), RAM 203 (file storage unit), image reading unit 112, USB controller 128, and USB interface 107. When the scanner device 106 is powered on, the CPU 110 activates firmware read out from the ROM 127. Most of all, the ROM 127 is an example of a software storage unit which stores software to be read out and executed by the information processing device to use the image reading device and the RAM 203 is an example of a file storage unit which stores control files and the like. The ROM 127 and the RAM 203 can be implemented by nonvolatile memories such as flash memories or EEPROMs. The ROM 127 and the RAM 203 may be implemented by one nonvolatile memory. Note that a buffer area for temporarily storing image data acquired by the image reading unit is allocated in the RAM 203.

When the scanner device 106 is connected to a computer 100, a CPU 121 activates a preinstalled standard USB mass storage driver 202. The scanner device 106 has a USB mass storage class interface 206. When the scanner device 106 is connected to the computer 100, the USB mass storage class interface 206 transmits identification information indicating that it is a USB mass storage class interface. Hence, the CPU 121 and an operating system 101 recognize the scanner device 106 as a mass storage device. The CPU 121 and the operating system 101 access the ROM 127 or the RAM 203 of the scanner device 106 while recognizing it as an external storage device. That is, the scanner device 106 operates like a well-known USB memory. The operating system 101 assigns an unused drive letter (e.g., D: or E:) to the scanner device 106 so that it serves as one drive.

Figure 28:
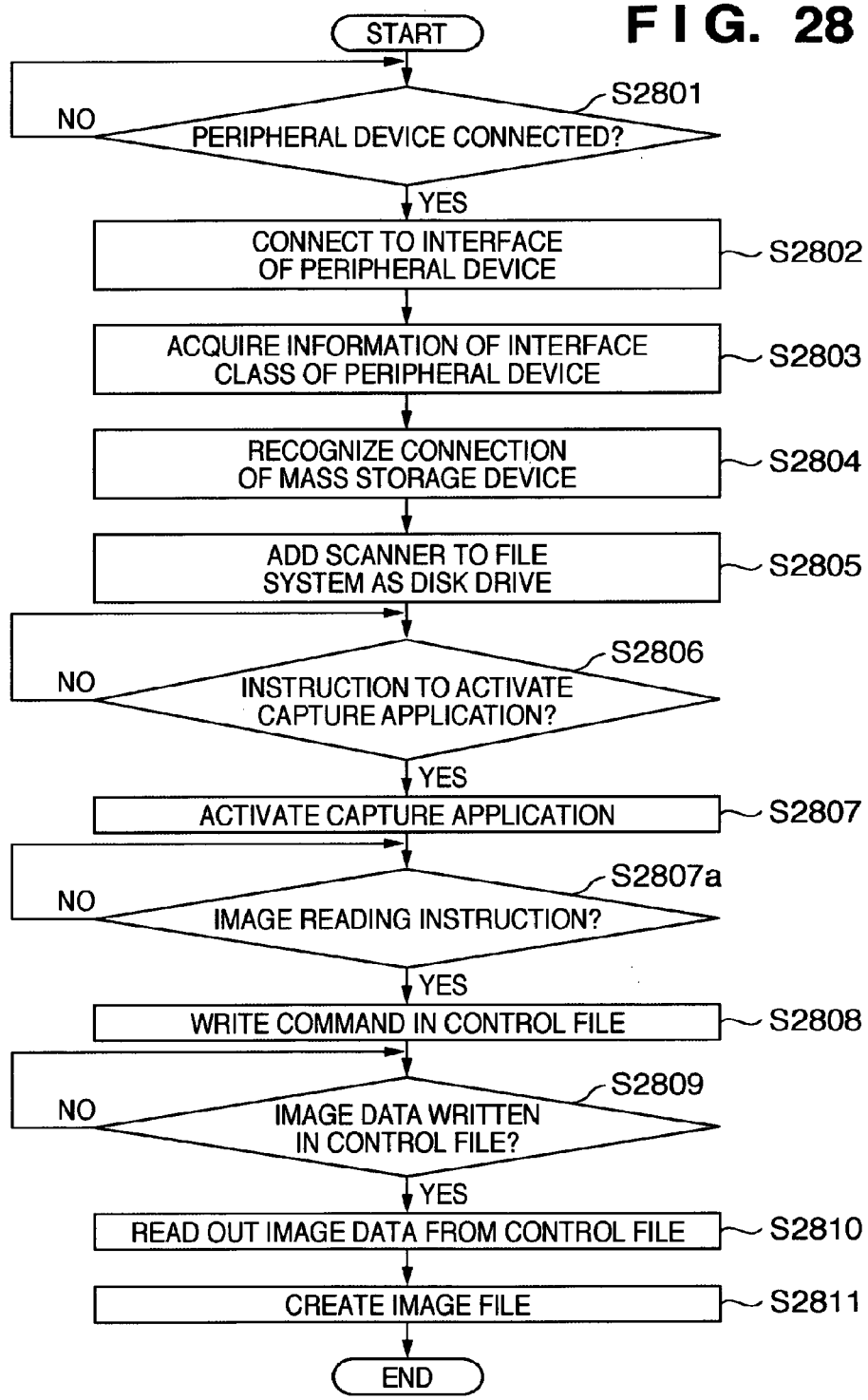
FIG. 28 is a flowchart illustrating processing that causes a scanner device 106 to perform image reading from a computer 100 using a capture application 210.

FIG. 28 is a flowchart illustrating processing that causes the scanner device 106 to perform image reading from the computer 100 using a capture application 210.

The CPU 121 of the computer 100 monitors whether the scanner device 106 is connected (step S2801). The CPU 121 connects the scanner device 106 as the device having USB mass storage class interface (step S2802).

The CPU 121 acquires the information of the interface class and the like from the scanner device 106 (step S2803). The CPU can recognize the type of the connected peripheral device based on the information.

As described above, the scanner device 106 has the USB mass storage class interface. For this reason, when the scanner device 106 is connected to the computer 100, the CPU 121 recognizes that a USB mass storage device is connected (step S2804). The scanner device 106 also has the USB disk drive interface 205 as the subclass of the USB mass storage class interface 206. The CPU 121 therefore recognizes the connected scanner device 106 as a disk drive. That is, the USB mass storage class interface 206 is an example of a recognition control unit which causes the information processing device to recognize the image reading device as the external storage device of the information processing device.

The operating system 101 forms, in a file folder associated with a file system 201, tables corresponding to a control file 204 and the capture application 210 stored in the scanner device 106. The CPU 121 can thus handle the control file 204 and the capture application 210 stored in the scanner device 106 as files on a disk drive assigned a drive letter (step S2805). This is because the scanner device 106 is recognized by the OS as a disk drive assigned a drive letter.

A state in which file management software (Explorer) has opened a disk drive (scanner) assigned a drive letter is already shown in FIG. 4.

The CPU 121 monitors whether an instruction to activate the capture application 210 in a folder 300 is input (step S2806). This instruction can be input either from a keyboard/mouse 125 or by autorun.inf stored in the folder 300 not shown. For example, in the Microsoft Windows® operating system, when a CD-ROM is inserted in the CD drive, the CPU detects a file called "autorun.inf" on the CD-ROM, and executes a command described in autorun.inf. And, in a certain version of the Microsoft Windows® operating system, if a file called "autorun.inf" is exist in the USB disk drive, operating system executes a command described in it. Therefore, it is possible to cause computer 100 to execute an execution file without user operation on keyboard/mouse if the execution file name is described in "autorun.inf". That is, the above-mentioned CaptureApplication.exe is described in autorun.inf as a command file. Upon receiving the instruction to activate the capture application 210, the CPU 121 reads out the capture application 210 from the ROM 127 of the scanner device 106, loads it to the RAM 124, and then activates it (step S2807). That is, the information processing device executes the software from the software storage unit of the image reading device recognized as an external storage device.

The command file described in autorun.inf and designated to be executed may be a program such as autorun.exe having a function simpler than CaptureApplication.exe. The program described as command file need only include at least a driver program function which enables image reading by transferring files on the memory.

The computer 100 has a display 126 connected, and displays various kinds of user interfaces on it. An example of a user interface displayed upon activating the capture application 210 is already shown in FIG. 5.

Upon determining that the user has clicked on a scan button 301 shown in FIG. 5 using the keyboard/mouse 125 (step S2807a), the capture application 210 (CPU 121) receives the scan settings and writes them in the control file 204 stored in the scanner device 106, thereby transmitting the scan settings to the scanner device 106. The CPU 121 also writes a scan start command in the control file 204 (step S2808). Note that the scan settings may be data attached to the scan start command and transferred.

The CPU 110 of the scanner device 106 monitors whether the control file 204 is updated. When the control file 204 is updated, the CPU 110 analyzes it and executes a command included in it. For example, upon detecting that the scan settings and scan start command are written in the control file 204, the CPU 110 controls the image reading unit 112 in accordance with the scan settings written in the control file 204, thus starting scan. That is, the CPU 110 is an example of an execution unit which analyzes a control file written in the file storage unit and executes a command included in the control file.

The CPU 110 of the scanner device 106 may execute the command included in the control file 204, as described above, and also write response information representing acceptance of the command in the control file 204 or another specific file. This allows execution of an operation equivalent to response information transmission to the computer 100 which periodically polls the control file 204 or another specific file and the like.

The scanner device 106 starts scan and writes image data read by the image reading unit 112 in a control file. This control file may be the same as the control file 204 in which scan settings and command are written, or different. The control file is here assumed to be the same for the descriptive convenience. Not a control file but another file used for transferring image data may be prepared independently. Note that readout of the control file 204 or the specific file is blocked when response information or image data is being written in the control file 204 or the specific file.

The CPU 121 of the computer 100 monitors whether the image data is written in the control file 204 (step S2809). Upon detecting that the image data is written in the control file 204, the CPU reads out the image data from the control file 204 (step S2810). The CPU 121 creates a designated image file (file name "test1" in the embodiment), and stores it in a hard disk drive 122 (step S2811).

In some occasions, an image has a data size larger than the size of the buffer allocated in the RAM 203. This situation readily occurs when the document size is large, or the image compression ratio is low. Note that the buffer may be allocated in a memory (not shown) other than the RAM 203.

In this embodiment, if image data has a size larger than the storage capacity of the buffer, the CPU 110 executes reading and storing in the control file 204 for every partial image data block having a size smaller than that of the image data. That is, partial image data block is an image data fragment with respect to entire image data representing a whole image (e.g. one page).

When the buffer is filled with partial image data block read from a document, the CPU 110 writes status data representing it in the control file 204. The CPU 110 also saves the partial image data block in the control file 204. That is, the CPU 110 is an example of a saving unit which saves, in a control file, partial image data block stored in a buffer.

The CPU 121 of the computer 100 reads out part of the control file 204, and determines whether it stores status data indicating that the buffer is full of data. Storing status data indicating that the buffer is filled indicates that the partial image data block is ready for transfer. Hence, the CPU 121 reads out the partial image data block from the control file 204, stores it in the RAM 124, and deletes the partial image data block from the control file 204. Hence, the control file which involving the status data is an example of a notification unit which notifies that partial image data block is ready for transfer. Note that the notification unit may be prohibited from responding to a read request of a control file or another file from the information processing device from the time point when the information processing device, in which control software is executing, has written a command in the control file until the execution unit completes writing of partial image data block in the control file or another file. In this case the information processing device recognizes that it becomes possible to transfer the partial image data and at that moment the information processing device completes read out of the partial image data, upon read response of the scanner device 106.

When the partial image data block is deleted from the control file 204, the CPU 110 of the scanner device 106 resumes the interrupted image reading. When the buffer is filled by new partial image data block read from the document, the CPU 110 writes status data representing it in the control file 204. These operations are repeatedly executed until image reading of one document ends. When image reading of one document has ended, the CPU 110 writes status data representing image reading completion in the control file 204.

The CPU 121 of the computer 100 reads out the control file 204, and determines whether it stores status data representing reading completion. If status data representing reading completion is stored, the CPU 121 composites the series of partial image data blocks stored in the RAM 124, thereby creating image data of one document. Note that the operation of the CPU 121 is implemented by causing the CPU 121 of the computer 100 to execute the capture application 210 stored in the scanner device 106. On the other hand, the operation of the CPU 110 of the scanner device 106 is implemented by firmware.

Eighth Embodiment

The software blocks of a computer and a scanner serving as an image reading device according to the eighth embodiment are the same as in FIG. 6.

The USB mass storage class interface 206 described in the seventh embodiment can have a plurality of USB mass storage subclasses. In the eighth embodiment, a scanner device 106 has two subclasses: a USB disk drive interface 205 and a USB CD drive interface 208. An operating system 101 on a computer 100 can logically access these devices separately. More specifically, a CPU 121 of the computer 100 recognizes the scanner device 106 as two disk drives and assigns a drive letter to each of them.

This will be described in more detail. When the scanner device 106 is connected to the computer 100, the operating system 101 (CPU 121) detects connection of a peripheral device of some kind to a USB interface 104. The CPU 121 accesses a USB interface 107 of the scanner device 106 via a USB cable 105.

When the computer 100 accesses the USB interface 107, a CPU 110 of the scanner device 106 causes the computer to access a USB mass storage class interface 206. The operating system 101 thus accesses the USB mass storage class interface 206 of the scanner device 106. Hence, the CPU 121 can access the scanner device 106 from a USB interface driver 103 and the USB interface 104 via the USB cable 105 using a USB mass storage driver 202 included in the operating system 101 in advance.

Since the scanner device 106 has two USB mass storage subclasses, the operating system 101 recognizes it as two mass storage class devices. For this reason, the CPU 121 of the computer 100 can access the scanner device 106 via the USB interface 107, USB mass storage class interface 206, and USB CD drive interface 208 or USB disk drive interface 205 of the scanner device 106 by an access method that requires no administrator's privileges.

The scanner device 106 stores an auto-run file 207, capture application 210, and control file 204 in advance. The auto-run file 207 is the above-described autorun.inf or the like.

The CPU 121 of the computer 100 accesses the capture application 210 and the auto-run file 207 via the USB CD drive interface 208. The CPU 121 accesses the control file 204 via the USB disk drive interface 205.

As described above, if the operating system 101 is Microsoft Windows®, it executes "autorun.inf" when a data CD is inserted in the CD drive. The auto-run file 207 is automatically activated because it is accessed via the USB CD drive interface 208.

When connected to the computer 100, the CPU 110 of the scanner device 106 causes the operating system 101 to virtually recognize that no data CD is inserted in the CD drive. The CPU 110 then causes the operating system 101 to virtually recognize that a CD is inserted, thereby controlling to automatically execute the auto-run file 207.

The computer 100 forms, in a folder associated with a file system 201, tables corresponding to the control file 204, capture application 210, and auto-run file 207 stored in the scanner device 106.

Figure 29:
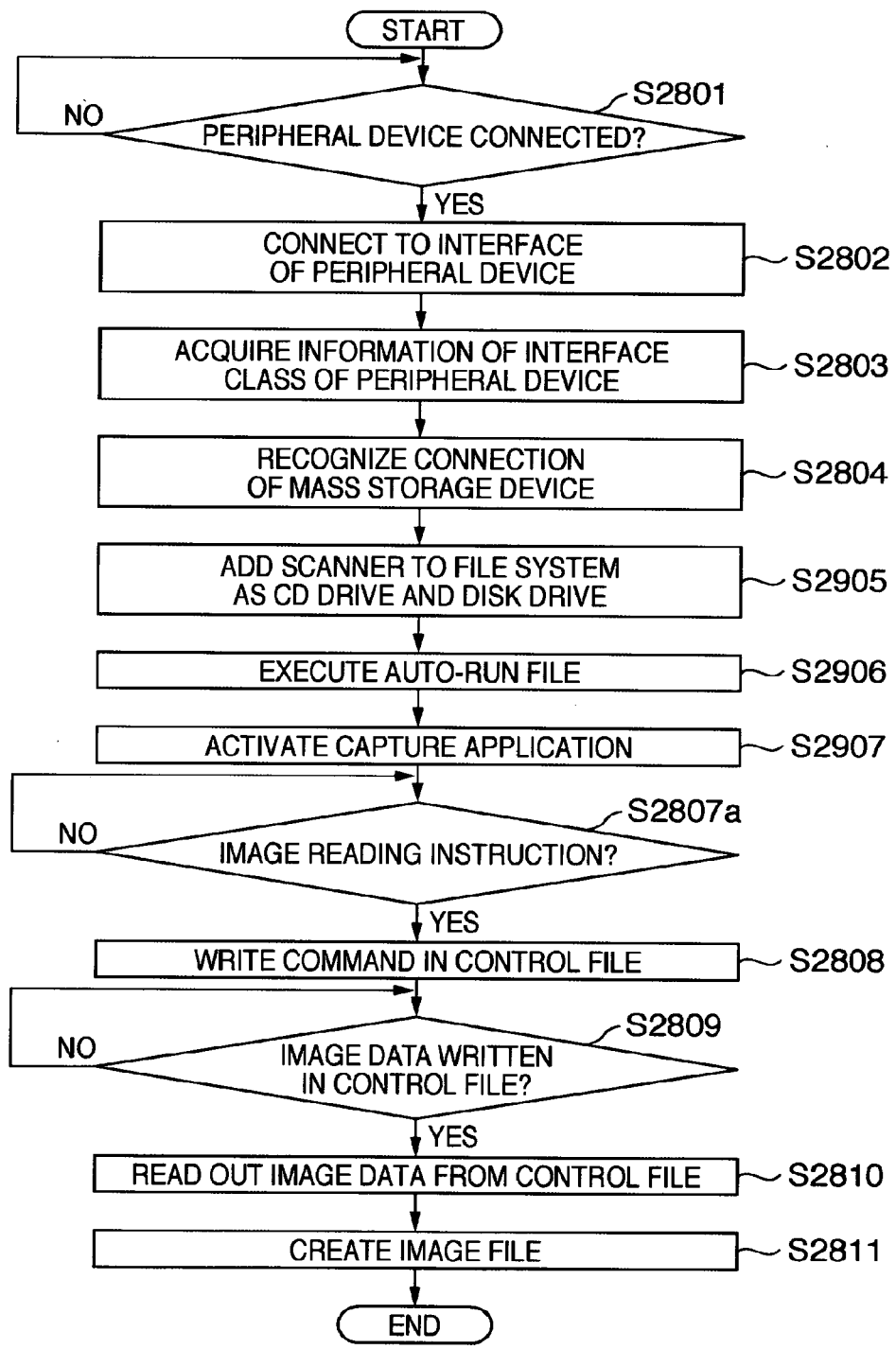
FIG. 29 is a flowchart illustrating processing that causes a scanner device 106 to perform image reading from a computer 100 using a capture application 210.

FIG. 29 is a flowchart illustrating processing that causes the scanner device 106 to perform image reading from the computer 100 using the capture application 210. Already described processes are given the same step numbers to simplify the description.

When steps S2801 to S2804 are executed, the CPU 121 of the computer 100 recognizes connection of a mass storage device. The scanner device 106 has the USB CD drive interface 208 and the USB disk drive interface 205 as the subclasses of the USB mass storage class interface 206. Hence, the CPU 121 of the computer 100 recognizes the connected scanner device 106 as a CD drive and a disk drive (step S2905). Note that the USB mass storage class interface 206 notifies the computer 100 that it has the USB CD drive interface 208 and the USB disk drive interface 205 as subclasses. This notification is sent to the operating system 101 via the USB interface driver 103.

The operating system 101 (CPU 121) forms, in a file folder associated with the file system 201, tables corresponding to the control file 204, capture application 210, and auto-run file 207 stored in the scanner device 106. The CPU 121 therefore recognizes the control file 204 stored in the scanner device 106 as a file on the disk drive. The CPU 121 also recognizes the capture application 210 and the auto-run file 207 as files on the CD drive.

An example of a folder corresponding to a memory area recognized as the CD drive is already shown in FIG. 8. The computer 100 recognizes, as a folder 302, a memory area recognized as the CD drive in the ROM or RAM of the scanner device 106. Hence, the capture application 210 and the auto-run file 207 seem to be stored in the folder 302.

An example of a folder corresponding to a memory area recognized as the disk drive is already shown in FIG. 9. The computer 100 recognizes, as a folder 303, a memory area recognized as the disk drive in the ROM or RAM of the scanner device 106. Hence, the control file 204 seems to be stored in the folder 303.

The user can open the folder 302 shown in FIG. 8 and the folder 303 shown in FIG. 9 using a keyboard/mouse 125 connected to the computer 100.

Upon determining that a data CD is inserted in the CD drive, the operating system 101 (CPU 121) executes the auto-run file 207 (step S2906). The auto-run file 207 is described in advance to activate the capture application 210. For this reason, the CPU 121 interprets the description of the auto-run file 207 and activates the capture application 210 (step S2907). Since the user need not be involved, the capture application 210 looks like to have been activated automatically for the user.

After that, steps S2807a to S2811 described above are executed.

As described above in the 7th and 8th embodiments, the present invention allows the scanner device 106 to perform image reading without installing any software such as a device driver or application in the computer 100. For example, even a user who cannot log in to the operating system 101 because of the absence of administrator's privileges or a user who wants to use a personal computer on the road can easily perform image reading.

In the 7th and 8th embodiments, scan is started via the capture application 210. However, scan may start when the CPU 110 detects the press of a start button arranged on the scanner device 106. At this time, the capture application 210 (CPU 121) may monitor the start button on the scanner device 106 via the control file 204. In this case, the CPU 110 writes, in the control file 204, that the start button is pressed.

The capture application 210 may instruct the scanner device 106 to start scan via the control file 204. Alternatively, the capture application 210 may determine that scan has started upon detecting image data generation in the control file 204, and store the image file in the hard disk drive.

In the 7th and 8th embodiments described above, the capture application 210 is activated to display a user interface. The capture application 210 may become resident in the operating system 101 such as Microsoft Windows® when connecting the scanner device 106.

In the 7th and 8th embodiments described above, the capture application 210 has no image display function. However, the capture application 210 may have an image display function.

In the 7th and 8th embodiments described above, scan settings are written in the control file 204 stored in a RAM 203. Hence, the settings are not saved. Instead, the scan settings done in the scanner device 106 may be stored in, for example, a nonvolatile memory (not shown). Settings may be stored for each user of the operating system 101.

The 7th and 8th embodiments have been described by exemplifying an operation on the Microsoft Windows® operating system. However, this is merely an example. The technical idea of the present invention is also applicable to any other operating system such as an operating system of Apple Computer or a Linux operating system.

Ninth Embodiment

A scanner device executes image reading usually under the direct control of a scanner driver installed in a computer. Hence, the scanner device successively transfers image data to the computer. In a scanner device of this embodiment, however, image data is transferred not via a scanner driver but via a mass storage driver. In this case, the size of the buffer prepared in the scanner device limits the size of image data.

In this embodiment, a method of divisionally storing image data having a size larger than that of a buffer in a scanner device 106 will be described in detail. That is, steps S2808 to S2811 mentioned above will be explained in more detail.

[Command Transmission/Acceptance]

Figure 30:
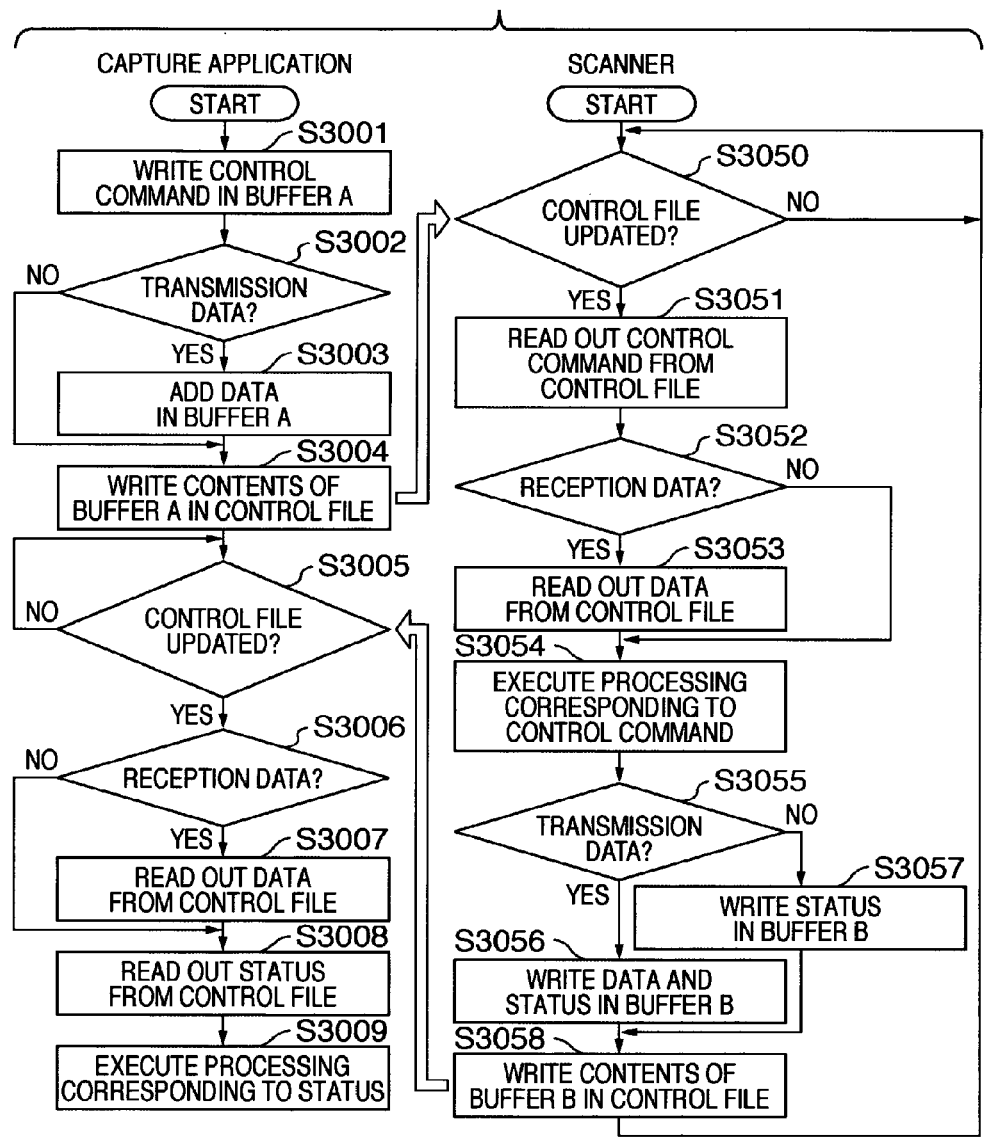
FIG. 30 is a flowchart illustrating a communication protocol to be executed on a computer side and scanner device side as an example of divisional image data transfer.

FIG. 30 is a flowchart illustrating a communication protocol to be executed on a computer side and scanner device side as an example of divisional image data transfer. Processing on the computer side to be described below is executed by a CPU 121 of a computer 100, which executes a capture application 210 stored in the scanner device 106. More specifically, the subject on software is the capture application 210, and the subject on hardware is the CPU 121. Note that the CPU 121 of the computer 100 allocates a buffer A in a RAM 124 in accordance with the capture application 210. On the other hand, processing on the scanner device side to be described below is executed by a CPU 110 in accordance with firmware. More specifically, the subject on software is the firmware, and the subject on hardware is the CPU 110. Note that the CPU 110 of the scanner device 106 allocates a buffer B in a RAM 203 in accordance with the firmware.

In step S3001, the CPU 121 of the computer 100 writes a control command in the buffer A in accordance with the capture application 210. The control command is, for example, a data sequence uniquely defined based on the format of an SCSI command. For example, a Set Window command to set a scan resolution and the like necessary for image acquisition, a Scan command to instruct the start of image acquisition, and a Read Image command to be used to read image data are defined in advance as control commands. Control command definition information representing the relationship between the control commands defined in advance and their meanings is held in both the capture application 210 and the scanner device 106. The control command definition information includes a unique command data sequence to identify each command, an integer value representing the length of each command data sequence, a true/false value representing necessity of transferring a data-attached command, and information representing a data transfer direction (whether to transfer data from the scanner device 106 to the capture application 210 or vice versa).

In step S3002, the CPU 121 determines whether it is necessary to transmit a data-attached control command. The CPU 121 searches the command definition information using the control command written in the buffer A as a key, and determines based on an extracted true/false value whether to attach data. If the control command should be attached data, the process advances to step S3003. If the control command should not be attached data, the process advances to step S3004.

In step S3003, the CPU 121 additionally writes data, in the buffer A, next to the control command already written in step S3001.

In step S3004, the CPU 121 writes the contents of the buffer A in a control file 204 stored in the scanner device 106. In this embodiment, the file cache function of Microsoft Windows®, which works at the start of read/write-access from the capture application 210 to the control file 204, may impede normal communication. To prevent this, the CPU 121 disables the file cache function.

The scanner device 106 waits until the control file 204 is updated in step S3004 while monitoring it. In step S3050, the CPU 110 of the scanner device 106 monitors whether the control file 204 has been updated. To detect update of the control file 204, for example, the CPU 110 refers to, in the address table of the file system held in the RAM 203 of the scanner device 106, a sector address at which the control file 204 exists. When the computer 100 writes data at the sector address, and the CPU 110 detects the end of write, the control file 204 is determined to have been updated. Alternatively, the CPU 110 reads out the control file 204 at a predetermined period. If the contents, size, date, or the like of the control file 204 has changed, it is determined to have been updated. The control file update detection processing is exclusively controlled not to overlap the write/read processing for the control file 204 by the capture application 210.

In step S3051, the CPU 110 reads out, from the top of the control file 204, a command data sequence in a size corresponding to the control command. The CPU 110 acquires the length of the control command written in the control file 204 with reference to the command definition information, and reads out the command data sequence.

In step S3052, the CPU 110 analyzes the control file 204 and determines whether data is attached to the accepted control command. If no data is attached, the process advances to step S3054. If data is attached, the process advances to step S3053.

In step S3053, the CPU 110 reads out the attached data from the end of the control command. The length of the attached data to be read out is acquired with reference to the above-described command definition information.

In step S3054, the scanner device 106 executes the control command extracted from the control file 204. For example, if the control command is a Set Window command described above, the CPU 110 allocates, in the RAM 203 of the scanner device 106, an area to hold scan settings, and writes the scan settings there based on the attached data. For example, if the control command is a Scan command, the CPU 110 controls an image reading unit 112 and the like with reference to the area where the scan settings are held in the RAM 203, and stores acquired image data in a scan buffer separately allocated in the RAM 203.

In step S3055, the CPU 110 determines whether the control command extracted from the control file 204 requires transmission of attached data. This determination is executed with reference to the control command definition information. If the command requires data transmission, the process advances to step S3056. If the command does not require data transmission, the process advances to step S3057.

In step S3056, the CPU 110 writes, in the buffer B, data corresponding to the command together with status data corresponding to the extracted command. For example, if the control command is a Read Image command, the CPU 110 extracts image data in only a size designated by the capture application 210 from the image data acquired by controlling the image reading unit 112 and the like, and writes the image data in the buffer B. Then, the process advances to step S3058.

In step S3057, the CPU 110 writes status information corresponding to the extracted command in the buffer B. Then, the process advances to step S3058. The status information represents the execution state of the control command. Examples of status information are GOOD STATUS indicating that processing corresponding to a control command has normally been executed, and BUSY indicating that the scanner device 106 is executing another processing and cannot accept a command. When attached data is written in the buffer B in step S3056, the CPU 110 adds similar status information to, for example, the end of the attached data.

When completing the write, in the buffer B, of the data to be transmitted to the capture application 210, the CPU 110 writes the contents of the buffer B in the control file 204 in step S3058. The data write processing for the control file 204 by the scanner device 106 is exclusively controlled not to overlap the write/read processing for the control file 204 by the capture application 210. At this time, the control command in the control file 204 remains unchanged. However, it may be changed.

When the process in step S3058 has ended, the scanner device 106 returns to step S3050.

In step S3005, the CPU 121 of the computer 100 waits until the control file 204 is updated while monitoring it. To monitor the control file 204 and detect its update, for example, the CPU 121 repeatedly reads out the contents of the control file 204 except the attached data portion at a predetermined period, and compares the control file contents with those stored in the RAM 124. If the current control file does not match the preceding control file, the CPU 121 determines that the control file 204 has been updated. Alternatively, for example, the CPU 121 may read out another notification file and determine update of the control file 204 based on the contents of the readout file. For example, if the CPU 121 of the computer is going to read out the control file 204 between the control command update detection in step S3050 and the update of the control file 204 in step S3058, the scanner device 106 may control a disk drive interface 205 to block the processing and prohibit response. In this case, the CPU 121 of the computer executes the read processing of the control file 204, and upon detecting the end of the processing, determines that the control file 204 has been updated. The contents of the updated and readout control file 204 are held in the RAM 124.

When writing response information representing command acceptance in the control file 204 or another specific file as well, if the CPU 121 of the computer is going to read out the control file 204 or another specific file before the control file 204 has been updated, the reading operation is blocked, and response is prohibited.

In step S3006, the CPU 121 determines whether the control command written in the control file 204 in step S3004 for transmission or the control command read out from the control file 204 in step S3005 requires acceptance of attached data. This determination is executed with reference to the above-described command definition information, as in step S3002. If the transmitted or readout command requires attached data acceptance, the process advances to step S3007. If the command does not require attached data acceptance, the process advances to step S3008.

In step S3007, the CPU 121 reads out the attached data from the control file 204.

In step S3008, the CPU 121 reads out status information from the control file 204. If attached data exists, status information is extracted from its end. If no attached data exists, status information is read out from the top of the control file 204.

In step S3009, the CPU 121 decides, based on the status information, an operation to be executed next and executes it. For example, if the status information is GOOD STATUS, the CPU 121 continuously executes next command transmission/acceptance. If the status information indicates an error of some kind, like BUSY, the CPU 121 newly issues a command to acquire its cause (step S3001). The CPU 121 reads out detailed information written in the control file 204 by the scanner device 106 in response to the command (S3007 and S3008). The CPU 121 displays a dialogue box on a display 126 to notify the cause in accordance with the detailed information.

[Image Reading Processing]

Figure 31:
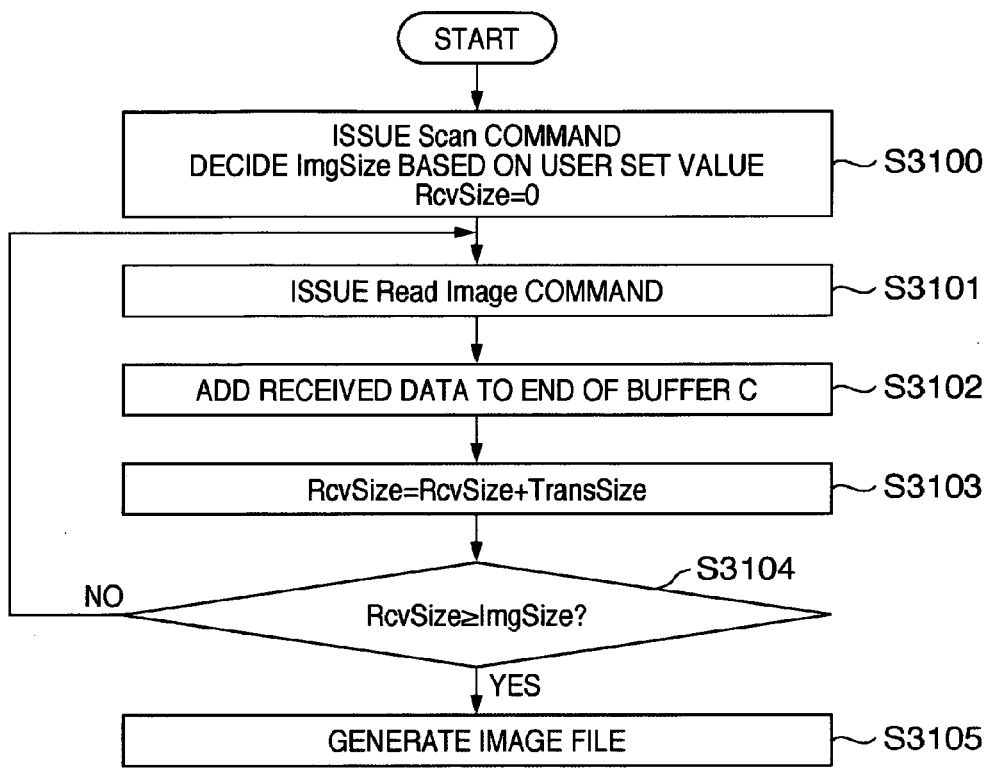
FIG. 31 is a flowchart illustrating an example of image reading processing.

FIG. 31 is a flowchart illustrating an example of image reading processing. An image data transfer method (the operation of the capture application 210) in step S2810 will be explained here. The communication protocol is the same as in FIG. 30.

In step S3100, the CPU 121 issues, in accordance with the capture application 210, a Scan command to instruct the scanner device 106 to start an image acquisition operation. Note that the command issue processing is the same as described in association with step S2808 or S3001. The CPU 121 initializes a variable RcvSize and a variable ImgSize. The variable RcvSize represents the size of data received until then from the scanner device 106 and is cleared to 0 by initialization. The variable ImgSize represents the size of whole image data to be received, into which an image data size calculated based on a user set value is substituted by initialization. The CPU 110 of the scanner device 106 accepts the Scan command via the control file 204, and performs control of the image reading unit 112 to start image reading. The CPU 110 temporarily accumulates acquired image data in the RAM 203. Note that the RAM 203 has only a limited storage capacity, and therefore stores only part of whole image data to be received.

In step S3101, the CPU 121 issues a Read Image command. The CPU 110 of the scanner device 106 accepts the Read Image command via the control file 204, and stores, in the control file 204, the image data accumulated in the RAM 203 in accordance with the communication protocol in FIG. 30 to allow the computer 100 to read out it. The size of image data to be read out by the computer 100 per Read Image command is defined in advance as, for example, a constant TransSize inside the capture application 210. The constant TransSize is set to be smaller than the storage capacity of the RAM 203 in advance. The CPU 121 executes command transfer by attaching the value of the constant TransSize to the command sequence of the Read Image command and writing it in the control file 204 stored in the scanner device 106. The CPU 110 of the scanner device 106 analyzes the accepted Read Image command, and writes image data with a size corresponding to the constant TransSize contained in the command sequence in the control file 204 in accordance with the communication protocol in FIG. 30. When the image data write has ended, the CPU 121 (capture application 210) can read out the image data from the control file 204. The CPU 121 reads out the control file 204 in accordance with the above-described communication protocol. The size of the image data read out here is that defined by the constant TransSize.

In step S3102, the CPU 121 writes the image data received via the control file 204 in a buffer C allocated in the RAM 124.

Figure 32:
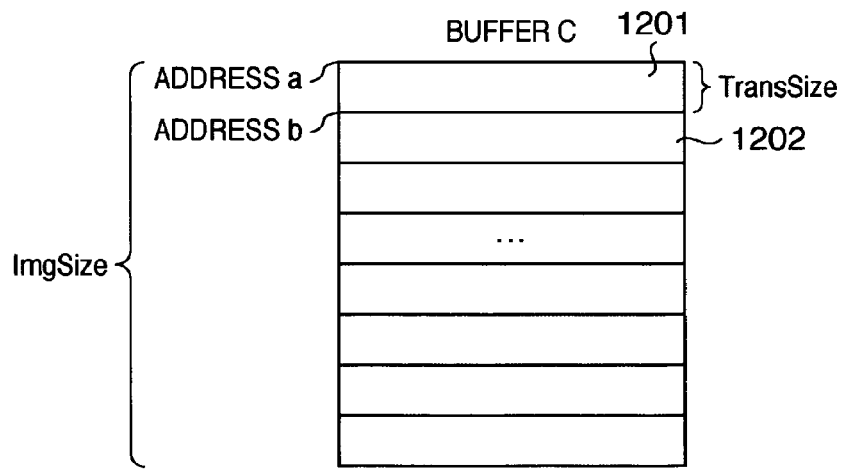
FIG. 32 is a view showing an example of a buffer C allocated in a RAM 124.

FIG. 32 is a view showing an example of the buffer C allocated in the RAM 124. The CPU 121 writes image data from an address ahead of the start address of the buffer C by the variable RcvSize.

For example, when the first Read Image command is issued, the variable RcvSize is 0 because no image data has been received yet. First image data 1201 is written in the buffer C by setting an address a as the start address. Second image data 1202 is written by setting an address b as the start address. At this time, b=a+TransSize.

In step S3103, the CPU 121 adds the constant TransSize to the variable RcvSize (step S3103). Letting n be the transfer count, RcvSize=n×TransSize holds. The value of a quotient obtained by dividing ImgSize by TransSize represents the total transfer count.

In step S3104, the CPU 121 determines whether all image data of one document have been transferred. More specifically, the CPU 121 compares the size ImgSize of all images to be acquired with the value of the variable RcvSize, and determines whether RcvSize is equal to or larger than ImgSize. If RcvSize is smaller than ImgSize, transfer has not ended yet. The process returns to step S3101 to issue a Read Image command to read out the next image data from the control file 204 in the scanner device 106. If RcvSize is equal to or larger than ImgSize, transfer has ended. Then, the process advances to step S3105.

The processes in step S3101 to S3104 are repeatedly executed, thereby reading out a large document image by dividing it into partial image data blocks.

In step S3105, the CPU 121 concatenates all partial image data blocks stored in the buffer C to generate the image file of one document image.

Note that image data received from the scanner device 106 may have a format unique to the image reading unit. In this case, the CPU 121 may convert the image data to facilitate handling by various applications on the computer 100. For example, to store received image data as a full-color BMP file, the CPU 121 converts the color depth of each image data accumulated in the buffer C into 24 bits, and adds a bitmap header to the top of the image file. Note that the CPU 121 gives a file name set in advance by the user via the user interface in FIG. 5 to the completed image file, and stores it in a hard disk drive 122.

The operation of the scanner device 106 will be described next.

Figure 33:
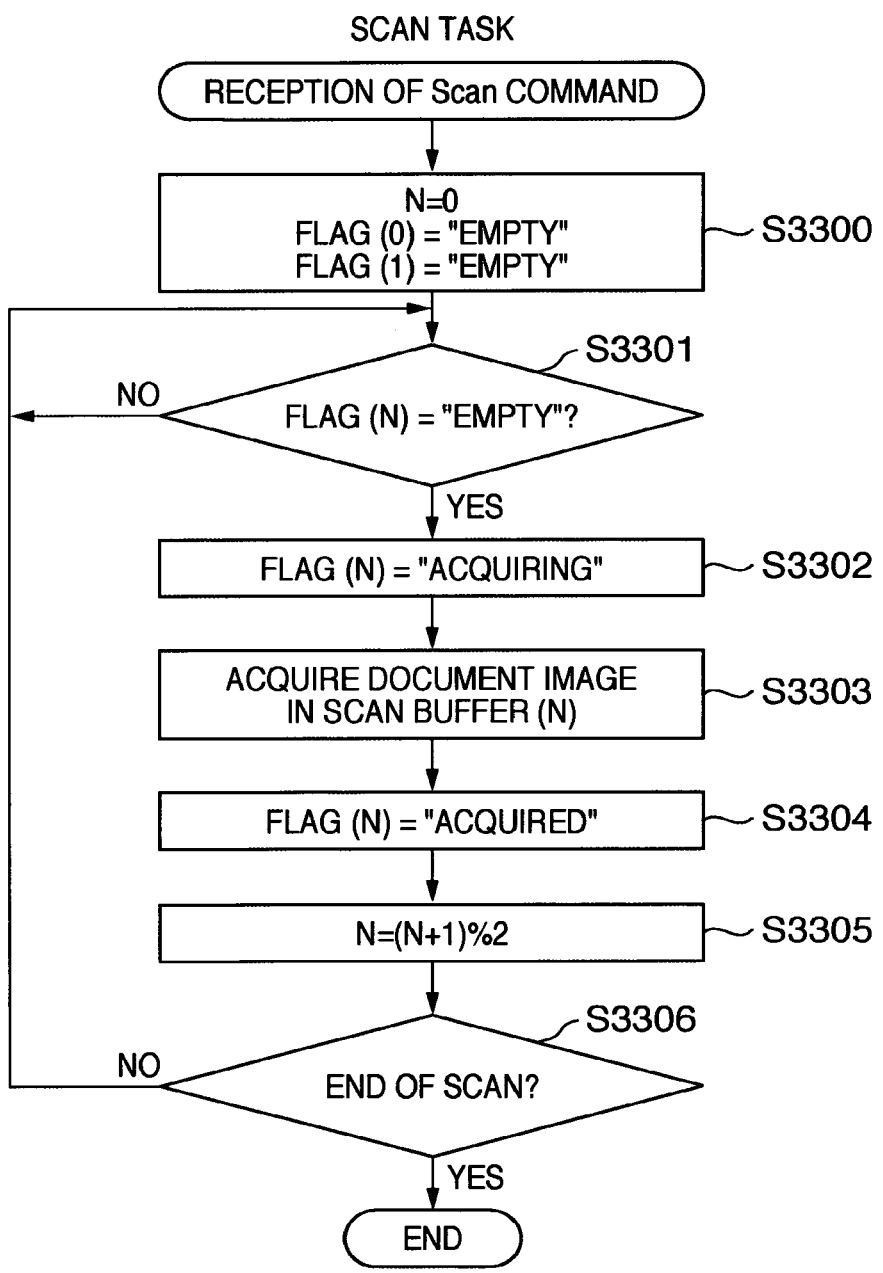
FIG. 33 is a flowchart illustrating an example of a scan task.

FIG. 33 is a flowchart illustrating an example of a scan task. FIG. 34 is a flowchart illustrating an example of an image transfer task. If a control command read out from the control file 204 is a Scan command, the scanner device 106 executes the scan task and the image transfer task in parallel. N and M in FIGS. 33 and 34 are integer type variables to identify flags.

The CPU 110 of the scanner device 106 allocates, in the RAM 203, a plurality of scan buffers serving as storage areas for temporarily holding image data acquired by the image reading unit 112. The size of each scan buffer corresponds to the constant TransSize.

Figure 35:
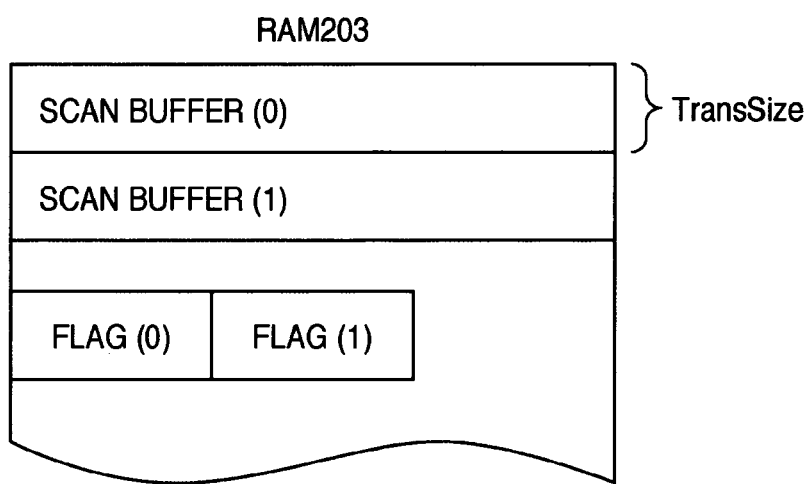
FIG. 35 is a view showing an example of scan buffers.

FIG. 35 is a view showing an example of scan buffers. In FIG. 35, two scan buffers (0) and (1) exist. A flag (0) indicates the state of the scan buffer (0). A flag (1) indicates the state of the scan buffer (1). These flags are also allocated in the RAM 203 simultaneously with the two scan buffers.

The scan task will be described first with reference to FIG. 33.

In step S3300, the CPU 110 initializes the integer N and two flags concerning the scan task. More specifically, the CPU sets 0 in N and "empty" in the flag (0) corresponding to the scan buffer (0) and the flag (1) corresponding to the scan buffer (1). "Empty" is a value indicating that a scan buffer corresponding to a flag (N) holds no unprocessed image data.

In step S3301, the CPU 110 monitors the state of the scan buffer (N), and waits until it changes to an empty state (step S3301). More specifically, the CPU 110 determines whether the scan buffer (N) is empty by referring to the value of the flag (N). When the scan buffer (N) shifts to an empty state, the scanner device S3302.

In step S3302, the CPU 110 sets the value of the flag (N) to "acquiring". "Acquiring" is a value indicating that the scan task is acquiring image data in the scan buffer corresponding to the flag (N).

In step S3303, the CPU 110 instructs the image reading unit 112 to start reading a document, thereby starting scanning it. The image reading unit 112 writes, in the scan buffer (N), image data read from the document.

In step S3304, when the image reading unit 112 notifies that image data storage in the scan buffer (N) has ended, the CPU 110 sets the value of the flag (N) to "acquired". "Acquired" is a value indicating that the scan task has acquired image data in the scan buffer corresponding to the flag (N).

In step S3305, the CPU 110 executes scan buffer switching processing. For example, the CPU 110 decides the integer N to identify the next scan buffer by calculating (N+1)%2, where % is an operation symbol to obtain a remainder, and (N+1)%2 is an operation expression to obtain a remainder by dividing (N+1) by 2. For example, if the current scan buffer is the scan buffer (0), the next is the scan buffer (1). That is, (0+1)%2=1. Hence, the CPU 110 changes N to 1. Conversely, if the current scan buffer is the scan buffer (1), the next is the scan buffer (0). That is, (1+1)%2=0. Hence, the CPU 110 changes N to 0.

In step S3306, the CPU 110 determines whether the computer 100 has instructed to end image reading, or image reading should finish. For example, image reading finishes when document scan has ended, the capture application 210 has issued a command representing the end of document acquisition, or document jam has occurred in the scanner having a document table with a document mounted on it. If image reading should not finish, the scan task returns to step S3301 to continue image reading. Upon determining to end image reading, the scan task of the scanner device 106 finishes the processing.

The image transfer task will be described next with reference to FIG. 34.

In step S3400, the CPU 110 initializes the integer M to identify a flag. More specifically, the CPU sets 0 in M.

In step S3401, the CPU 110 determines whether the computer 100 has written, in the control file 204, a Read Image command to instruct image acquisition. The CPU 110 waits until reading out of a Read Image command successes. Upon acceptance of a Read Image command, the process advances to step S3402.

In step S3402, the CPU 110 reads out the value of the flag (M) from the RAM 203, and determines whether the value is "acquired". The CPU 110 waits until the value of the flag (M) changes to "acquired". When the value of the flag (M) has changed to "acquired", the image transfer task advances to step S3403.

In step S3403, the CPU 110 sets the value of the flag (M) to "transmitting". "Transmitting" is a value indicating that the capture application 210 can read out image data stored in a scan buffer corresponding to the flag (M).

In step S3404, the CPU 110 makes the data included in the scan buffer (M) readable by the capture application 210 as partial image data block created by processing corresponding to the Read Image command. That is, transmission in step S3404 means writing of image data into the control file 204 by the CPU 110. As described above, partial image data block written into the control file 204 is read out each time upon writing by the computer 100 which is monitoring the control file 204. Therefore, each time upon acceptance of command via the control file 204 of transmission of image data, transmission of image data to the computer 100 is performed, data amount of single transmission being that of partial image data block. And, according to FIG. 31, the computer 100 issues repeatedly ReadImage command until total data amount of received partial image data blocks (RecvSize) becomes ImgSize. Therefore transmission of partial image data to the computer 100 is performed repeatedly. Meanwhile, in some cases multiple transmissions of image data may be performed in lower-level communication while performing transmission of one partial image data. For example multiple lower-level transmissions of image data having data amount of 512 sectors of USB disk drive may be performed as transmission of one partial image data. Therefore, in present invention, repeated transmission of partial image data, in which data amount of single transmission is that of partial image data, does not mean lower-level transmission (e.g. transmission of data of designated multiple sectors) described above.

In step S3405, the CPU 110 sets the value of the flag (M) to "empty".

In step S3406, the CPU 110 executes scan buffer switching processing. For example, the CPU 110 decides the integer M to identify the next scan buffer by calculating (M+1)%2. For example, if the current scan buffer is the scan buffer (0), the next is the scan buffer (1). That is, (0+1)%2=1. Hence, the CPU 110 changes M to 1. Conversely, if the current scan buffer is the scan buffer (1), the next is the scan buffer (0). That is, (1+1)%2=0. Hence, the CPU 110 changes M to 0.

In step S3407, the CPU 110 determines whether the computer 100 has instructed to end image reading, or image reading should finish (step S3407). The determination conditions are the same as in step S3306 of the above-described scan task. If image reading should not finish, the image transfer task returns to step S3401 to continue image transfer processing. Upon determining to end image reading, the image transfer task of the scanner device 106 ends.

Figure 36:
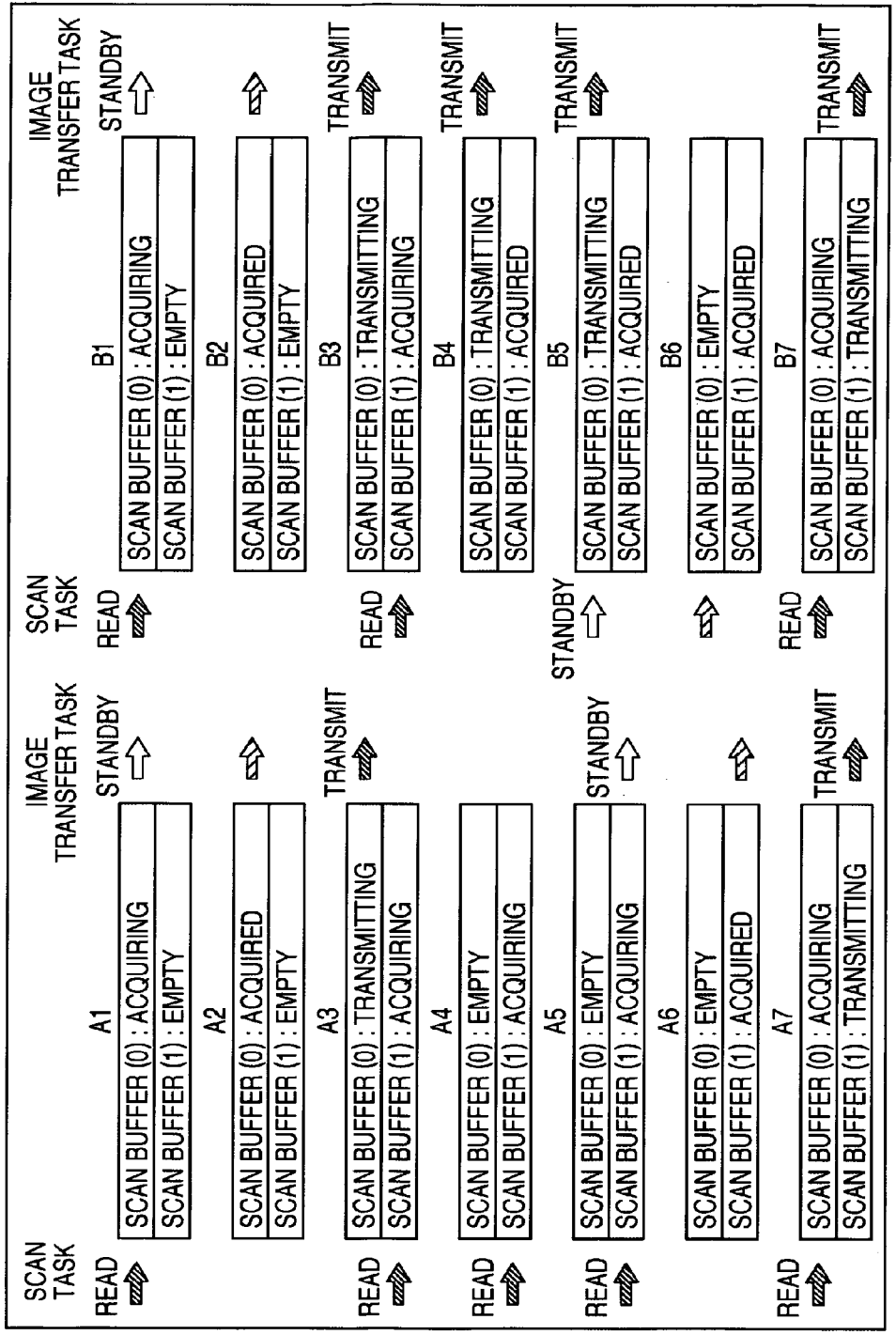
FIG. 36 is a view showing an example of state transition of the scan buffers.

FIG. 36 is a view showing an example of state transition of the scan buffers. A1 to A7 indicate an example when the transfer rate of the image transfer task is higher than the image reading rate of the scan task. B1 to B7 indicate an example when the transfer rate of the image transfer task is lower than the image reading rate of the scan task.

When the capture application 210 (CPU 121) issues a Scan command, the scan task (CPU 110) executes steps S3300 to S3302 in order. The scan task starts reading an image and storing image data in the scan buffer (0) in step S3303. Assume that a Read Image command has already been issued. The image transfer task (CPU 110) executes steps S3400 and S3401 in order and advances to step S3402. In step S3402, the image transfer task waits until the value of the flag (0) changes to a value representing the end of image reading (A1, B1).

When the scan task finishes steps S3303 and S3304, the image transfer task ends step S3402. In steps S3403 and S3404, the image transfer task writes the contents of the scan buffer (0) in the control file 204 to make the image data readable by the computer 100 (A2, B2). Without an image reading end instruction, the scan task executes steps S3305, S3306, S3301, and S3302 in order to continue the operation of reading an image and storing image data in the scan buffer (1) (A3, B3).

If the transfer rate of the image transfer task, that is, the speed of processing of, for example, causing the image transfer task to write image data in the control file 204 and causing the capture application 210 on the computer 100 to read out the image data from the control file 204 is higher than the image reading rate of the scan task, the following operation is performed. That is, before the scan task ends image data write in the scan buffer (1), the image data written by the image transfer task from the scan buffer (0) to the control file 204 is read out by the computer 100, and the transfer finishes (A4). When image transfer from the scan buffer (0) has ended, the image transfer task executes steps S3405, S3406, S3407, and S3401 in order. When the capture application 210 issues a second Read Image command, the image transfer task ends the standby state in step S3401, and refers to the value of the flag (1) in step S3402. If the image data storage in the scan buffer (1) by the scan buffer has not ended yet at this time, the image transfer task waits until the end of image data storage (A5). When the scan task has ended the storage operation for the scan buffer (1) (A6), the image transfer task ends the standby state in step S3402, and writes the contents of the scan buffer (1) in the control file 204. More specifically, the image transfer task stores the image data in the control file 204 to make it readable by the capture application 210 on the computer 100, thereby transferring the image data to the capture application 210 (A7).

When the transfer rate of the image transfer task is higher than the image reading rate of the scan task, as in this example, implementation of processing according to the above-described flowcharts makes the scan task wait as needed in accordance with the progress of the image transfer task. Even when the speed of the image reading operation of the capture application 210 is higher than the speed of image acquisition processing of the scanner device 106, the scanner device 106 can divide document image data by TransSize and smoothly transfer it.

On occasion, the transfer rate of the image transfer task is lower than the image reading rate of the scan task inversely. In this case, for example, since the image data reading of the capture application 210 is slow, the scan task can end write of acquired image data in the scan buffer (1) before the image transfer task finishes image data storage from the scan buffer (0) to the control file 204 (B4). At this time, the scan task executes steps S3304, S3305, and S3306 in order, and then refers to the value of the flag (0) in step S3301 to start acquiring image data in the scan buffer (0). However, image data storage from the scan buffer (0) to the control file 204 has not finished yet at this point of time. For this reason, the scan task waits until the image data in the scan buffer (0) is completely written in the control file 204 (B5). The scan task stops image data acquisition, and temporarily halts document scan. After that, when the image transfer task has ended the operation of storing, in the control file 204, the image data from the scan buffer (0) (B6), the scan task ends the standby state in step S3301, resumes document scan, and starts writing image data in the scan buffer (0) (B7).

Even when the rate of image data transfer to the computer 100 is lower than the image reading rate of the scan task, as in this example, implementation of processing according to the above-described flowcharts allows the scan task to wait as needed in accordance with the progress of the image transfer processing of the image transfer task. Even when the image reading rate of the capture application 210 on the computer 100 is lower than the rate of image acquisition processing of the scanner device 106, the scanner device 106 can divide document image data by TransSize and transfer it to the capture application 210.

According to the above-described embodiment, the capture application 210 writes a Read Image command in the control file 204 a plurality of number of times. This enables the scanner device 106 to transfer large document image data beyond the capacity of the RAM 203 to the capture application.

According to the above-described seventh to ninth embodiments, the information processing device recognizes the image reading device as an external storage device (e.g., USB mass storage class) of the information processing device. It is therefore unnecessary to install the device driver of the image reading device in the information processing device. Additionally, partial image data block having a small size is acquired and stored readably in the control file. This makes it possible to read a relatively large image.

Especially, since reading and transfer are executed for each of a plurality of smaller partial image data blocks obtained by dividing image data, a large image can be transferred using a buffer with a small size. Meanwhile, to an image reading device having large buffer which can store image data of one document, transmission of partial image data of present invention is applicable effectively. Because, in a case in which transmission is performed when partial image data is stored in buffer, speed of image reading becomes faster, compared with a case in which transmission begins after image data of one document is stored in buffer.

Partial data transfer via the control file allows implementation of image reading while making the information processing device continuously recognize the image reading device as an external storage device.

Normally, to transfer partial data via the control file, it is necessary to notify the information processing device that the partial data has been written in the control file. Although a method of periodically monitoring the control file is also available, a too long monitoring period increases delays, whereas a too short monitoring period increases a waste of computing power of the information processing device. When detecting a written command instructing reading out of partial image data, the image reading device may performs control for causing USB interface to block of reading out of partial image data, upon responding to a read request of a control file from the information processing device, until the image reading device completes writing of partial image data block into the control file. More specifically, when the image reading device receives a command for reading out of the control file from the USB mass storage driver of the information processing device, while writing of partial image data block into the control file, the image reading device returns NAK packet as response of the read request of the data stage. In this case the information processing device repeatedly may perform reading out from the control file, from the time point just after writing into the control file of command of reading out partial image data. And when the information processing device detects the completion of reading out of the control file, the information processing device also detects update of the control file, and then the acquisition of the partial image data is completed. The image reading device may notify the information processing device that the partial image data block has been written in the control file by another file or another notifying unit. More specifically, upon receiving a Test Unit Ready command, Mode Select command, or Start-Stop Unit command from the information processing device, the image reading device returns a CHECK CONDITION status. This causes the information processing device to look up the file table and recognize update of the control file.

Alternatively, both D+ and D− signals of the USB bus may be changed to zero to make a transition to a USB bus reset state. In this case as well, the information processing device refers to the file table and recognizes update of the control file.

10th Embodiment

An image processing device (e.g., scanner, printer, or multi-function peripheral), which is a peripheral device of this embodiment, has an operation mode in which the device operates in accordance with instructions from a driver installed in an information processing device (PC) while causing the information processing device to recognize an image processing device as the image processing device (scanner, printer etc.), and an operation mode in which image data transfer is done while making the information processing device recognize the image processing device as an external storage device. A method of causing a user to easily set either mode to use the image processing device is preferably employed.

An image processing device which is a peripheral device of this embodiment has a manual switch that allows manual switching by a user's hand so that the mode of the image processing device changes in accordance with switching of the manual switch. Additionally, to enable the information processing device to recognize the operation mode of the image processing device, information to be transmitted to the information processing device is switched by user's manual switching of the switch.

This embodiment corresponds to an arrangement in which a switch 221 to be switched by software in a scanner 106 shown in, for example, FIG. 10 is replaced with a manual switch that allows manual switching by a user's hand. Alternatively, another manual switch to control the set state of the electrically controlled switch 221 may be added to the device shown in, for example, FIG. 10. This makes it possible to cause the scanner 106 to work in a desired operation mode only by a simple operation of causing the user to manually operate the switch. Actual switching of the operation mode is preferably performed (after switching of the manual switch) upon power reconnection, resetting, or USB cable reinsertion after removal.

In this embodiment having the manual switch, when the user operates, for example, a start button (not shown) provided on the scanner 106, its operation preferably changes in accordance with the set state of the manual switch.

Assume that the user operates the manual switch to select the operation mode in which image data transfer is performed while making a personal computer 100 recognize the scanner 106 as an external storage device, and then operates the start button (not shown) of the scanner that remains connected to the personal computer 100. At this time, the scanner 106 temporarily causes pseudo transition to a USB disconnection state and then transition to a USB reconnection state.

Such pseudo-disconnection/reconnection of the USB interface without touching the USB connector enables to reboot software for controlling the image processing device. For example, after image reading or image formation is performed while recognizing the image processing device as an external storage device, execution of a capture application 210 is temporarily ended in the information processing device (personal computer 100). At this time, the capture application 210 loaded from the image processing device (scanner 106) to the memory of the information processing device is erased from there. It is cumbersome to insert/remove the USB connector to activate the capture application 210 again. In this embodiment, only the operation of the start button (not shown, arranged on the image processing device) suffices. It is possible to thus activate the capture application 210 or display an activation confirmation dialogue upon inserting/removing the USB connector.

The above-described pseudo-insertion/removal of the USB connector is effectively performed by a single operation also in situation when the user executed a predetermined operation of detaching an external storage device to make it safely detachable. This allows the information processing device to recognize the external storage device again. If setting is done to automatically activate an auto-run program of some kind in accordance with USB connection, the auto-run program can be activated by operating the start button.

On the other hand, assume that the user operates the manual switch to select the operation mode in which the information processing device recognizes the image processing device as an image reading device so that it is controlled from the information processing device using a scanner driver. When the user then operates the start button (not shown), information indicating that the start button has been operated is sent to the information processing device.

For scanning a document using an image reading device, it is common practice to create a job in advance in which one or a plurality of operations or parameters, for example, the scan conditions of a series of scan operations and the contents of image processing and the like to be executed for image data read by the scan operations are registered.

The information processing device can execute the series of scan operations registered as a job upon receiving, from the image reading device, the information indicating that the start button has been operated. If the job function is not implemented or a registered job isn't exists, the information processing device may execute the scan operations in accordance with current settings or default settings upon receiving, from the image reading device, the information indicating that the start button has been operated. The registered job information is preferably stored in, for example, the HDD of the information processing device. It may be stored in the nonvolatile memory of the image reading device.

The above-described arrangement allows an operation change according to the set state of the manual switch by a simple operation of, for example, pressing an operation button on the image processing device, thereby simplifying the operation of the image processing device. The operation mode actually changes after the operation of the manual switch upon power reconnection after shutdown, actual USB connector insertion/removal, or the operation of the start button (not shown). The present invention incorporates one or all of these cases.

An arbitrary constituent element of each of the above-described embodiments may be added to another embodiment. The present invention also incorporates this case. Some or all of the arrangements of the present invention may be implemented by software to be executed by one or a plurality of CPUs.

Other Embodiments

Note that the number of times of installations may be managed while enabling to install software from a peripheral device in a computer. A storage unit provided in the peripheral device stores a control software module to be used by an information processing device to control a function as an external peripheral device, and also a function as an external storage device. A transfer unit transfers the control software module stored in the storage unit to install it in the information processing device when neither a control software module of the same version as the control software module stored in the storage unit nor a control software module of a newer version is installed in the information processing device. A management unit manages the number of times of installations of the control software module in an information processing device.

The ROM of a scanner device 106 stores a determination application 224 and an auto-run file (automatic execution information file) 207 in advance. The determination application is executed by a CPU 121 of a personal computer 100 to determine whether a USB scanner driver 102 is installed in the personal computer 100. The auto-run file includes a description to cause the CPU 121 to automatically execute the determination application when the scanner device 106 is connected to the personal computer 100.

That is, the CPU 121 activates the determination application 224 in accordance with the description of the auto-run file. The auto-run file is stored in a storage area of the storage unit, which is recognized as a CD drive. That is, the determination application is an example of a computer program which is described to be automatically activated by autorun.inf (automatic execution information file) stored in the storage area of the storage unit, which is recognized as a CD drive. The determination application determines whether a control software module necessary for image reading is installed, and if not, installs the above-described various kinds of software.

The CPU 121 determines whether the USB scanner driver is installed. Whether it is installed can be determined by, for example, referring to a registry. If the USB scanner driver is not installed, the CPU 121 reads out the capture application and the USB scanner driver from the scanner device 106, and installs them in the personal computer 100 in accordance with an installer.

The capture application and the USB scanner driver are read out from a ROM 127 by a CPU 110, USB controller 128, and USB interface 107, and transferred to the personal computer 100. That is, the CPU 110, USB controller 128, and USB interface 107 are examples of the transfer unit which transfers the control software module stored in the storage unit to install it in the information processing device when neither a control software module of the same version as the control software module stored in the storage unit nor a control software module of a newer version is installed in the information processing device.

The CPU 121 increments the count value of an installation counter by one. Note that if the installation counter counts the remaining count, the CPU 121 decrements it by one. The installation counter is, for example, a file stored in a nonvolatile storage area (e.g., SRAM or EEPROM) which is provided in the scanner device 106 and is accessible from the CPU 121. The CPU 121 is an example of a count write unit which counts the number of times of installations of the control software module in an information processing device and writes the installation count in the nonvolatile storage area.

A driver of a latest version often has improved functions. Hence, a driver of a latest version is preferably installed. To do this, the CPU 121 compares the version of the USB scanner driver installed in the personal computer 100 with that of the USB scanner driver in the scanner device 106, and determines whether the former is older than the latter. If so, the CPU 121 installs, in the personal computer 100, the USB scanner driver from the scanner device 106.

It would be convenient if it is possible to update the software stored in the peripheral device while enabling to install the software from the peripheral device to the computer. To achieve this, the peripheral device has a function as an external storage device of the information processing device and a function as an external peripheral device of the information processing device. The peripheral device includes a storage unit which stores a control software module to be used by the information processing device to control the function as an external peripheral device, and provides a storage area to the information processing device as an external storage device, and a write unit which, when the information processing device stores a control software module of a version newer than the control software module stored in the storage unit, receives the control software module of a newer version transmitted from the information processing device, and writes it in the storage unit.

The determination application 224 is an example of a comparison unit which compares the version of the control software module stored in the storage unit with that of the control software module stored in the information processing device. Note that the determination application 224 is an example of a computer program which controls installation of the control software module. The determination application 224 or an installer 225 is a computer program which is read out from the storage unit by a personal computer (information processing device) that recognizes the peripheral device as an external storage device, loaded to a RAM 124, and executed.

In accordance with the determination application 224, the CPU 121 compares the version of the USB scanner driver 102 stored in the personal computer with that of a USB scanner driver 226 stored in the scanner device 106, and determines whether the USB scanner driver 102 is newer. If the USB scanner driver 102 installed in the personal computer is newer than the USB scanner driver 226 stored in the scanner device 106, the CPU 121 reads out the USB scanner driver 102 from a hard disk drive 122 of the personal computer 100, and transfers it to overwrite the ROM 127 of the scanner device 106 in accordance with the determination application 224. That is, the ROM 127 is designed to be rewritable using, for example, a flash memory. The CPU 110 of the scanner device 106 writes, in the ROM 127, the USB scanner driver 102 received via the USB interface 107. That is, the CPU 110 is an example of a write unit which, when the information processing device stores a control software module of a version newer than the control software module stored in the storage unit, receives the control software module of the newer version transmitted from the information processing device and writes it in the storage unit. When a plurality of control software modules as automatic update targets exist, only a control software module determined to have a version newer than that stored in the ROM 127 is transmitted from the personal computer 100 to the scanner device 106 and overwritten in the ROM 127. More specifically, only the capture application may be updated, or only the driver may be updated. Note that if software update is impossible in the CD drive interface enable state, the CPUs 121 and 110 switch from the CD drive interface to a mass storage interface capable of writing a USB memory or the like. To allow software update, the information processing device may be designed to recognize that a readable/writable disk such as a CD-R or CD-RW is inserted in a readable/writable disk device such as a CD-R or CD-RW drive, instead of recognizing the scanner device as a read-only CD drive.

If the scanner device has no USB CD drive interface, an area recognized as an area readable/writable via a USB disk drive interface may store the automatic execution information file or the determination application. This makes it possible to automatically activate the determination application in accordance with the contents described in the automatic execution information file.

Assume that the version of the USB scanner driver 102 installed in the personal computer 100 is 1.0.5, and the version of the USB scanner driver 226 stored in the scanner device 106 is 1.0.4. In this case, the CPU 121 overwrites the USB scanner driver 102 on the older USB scanner driver 226 stored in the scanner device 106.

Additionally, if software of a newer version exists on the personal computer side, the CPU 121 writes it in the peripheral device. It is therefore possible to keep storing, in the peripheral device, software of the latest version to be installed.

In the above embodiment, installation and update of the USB scanner driver have been described. The present invention is also applicable to another software such as a capture application.

The individual setting data of the image reading device may be carried while implementing image reading without installing its device driver in the computer. To achieve this, the image reading device includes a software storage unit which stores software to be executed by the information processing device to use the image reading device, and a file storage unit which stores a parameter to be applied to image reading for each information processing device connected to the image reading device or each user who uses the information processing device. The software causes the information processing device to function as a command transmission unit which reads out a parameter corresponding to the information processing device from the file storage unit and transmits a command corresponding to the parameter to the image reading device.

The image reading device of the present invention includes a software storage unit which stores software to be executed by the information processing device to use the image reading device, and a file storage unit which stores a parameter to be applied to image reading for each information processing device connected to the image reading device or each user who uses the information processing device. The software causes the information processing device to function as a command transmission unit which reads out a parameter corresponding to the information processing device from the file storage unit and transmits a command corresponding to the parameter to the image reading device.

Since individual setting data for each user who uses the information processing device or each computer connected to the image reading device can be carried, setting load on the user decreases. As a characteristic feature of this embodiment, the scanner device 106 stores at least one of a setting parameter for each computer and a setting parameter for each user.

In this embodiment, the ROM 127 is a nonvolatile memory in which information can be written by the computer 100. The ROM 127 stores at least the capture application 210 and a setting file 212. That is, the ROM 127 is an example of a file storage unit which stores a parameter to be applied to image reading for at least one of each information processing device connected to the image reading device and each user who uses the information processing device.

The user interface shown in FIG. 5 to confirm and change scan settings displays currently selected contents of various kinds of setting items. Especially, the setting item contents selected immediately after activation of the capture application are selected based on contents the CPU 121 has read out from the setting file. These reading setting contents are displayed on the user interface by causing the CPU 121 to recognize the identification information of the computer or that of the user and extract, from the setting file 212, reading setting contents corresponding to at least one of them.

[Default Setting] represents an initial setting. The initial setting is used when the computer or user cannot be specified. Hence, NULL that indicates independence of a computer is set in Computer Name. Mode represents a monochrome reading mode or a color reading mode; Paper Size, a reading size; Resolution, a reading resolution; Read Side, single-sided reading or double-sided reading; File Name, a file name to be added to a read image; and Display Image, whether to display a read image.

If the settings have changed, the setting changes are reflected on the setting file stored in the scanner device 106. For this reason, even when the computer connected to the scanner device 106 has changed, the user can read out and use new setting contents that will be suitable for the computer.

As described above, the setting file may store settings for each computer connected to the scanner device. However, the settings may be switched between users. Storing settings for each user in the setting file will be explained.

If the name of the user who is currently using the computer 100 is already registered, and the parameter has changed, the CPU 121 rewrites the setting set in the setting file 212. On the other hand, if the user name is not registered in the setting file 212, the CPU 121 adds a setting set corresponding to the user name to the setting file 212. If the settings have changed, the setting changes are reflected on the setting file stored in the scanner device 106. For this reason, even when the computer connected to the scanner device 106 has changed, the user can read out and use new setting contents that will be suitable for the application purpose of the user.

The scope of the following claims is to be accorded the broadest interpretation so as to encompass all such modifications and equivalent structures and functions. Any elements in the embodiments described above may be added to other embodiment, and this invention contains those varied embodiments. In the peripheral device, including the image reading device, of embodiments described above, the manner of loading and activation, on the information processing device, of the program stored in the peripheral device can be varied to the manner described below.

(1): Upon connection of the peripheral device to the information processing device, the automatic execution information file (e.g. Autorun.inf) and the driver program (e.g. CaptureApplication.exe) are loaded on the information processing device, and the peripheral device starts operation automatically.

(2): Upon connection of the peripheral device to the information processing device, the automatic execution information file and the driver program are loaded on the information processing device, and by user operation, on the operation unit of the information processing device or the peripheral device, the peripheral device starts operation.

(3): Upon connection of the peripheral device to the information processing device, the automatic execution information file is loaded on the information processing device, and by user operation, on the operation unit of the information processing device or the peripheral device, the driver program is loaded on the information processing device, and the peripheral device starts operation.

(4): Upon connection of the peripheral device to the information processing device, the automatic execution information file is loaded on the information processing device, and by user operation, on the operation unit of the information processing device or the peripheral device, the driver program is loaded on the information processing device, and by additional user operation the peripheral device starts operation.

(5): Upon connection of the peripheral device to the information processing device, and by the user operation, on the operation unit of the information processing device or the peripheral device, the automatic execution information file and the driver program are loaded on the information processing device, and the peripheral device starts operation.

(6): Upon connection of the peripheral device to the information processing device, and by the user operation, on the operation unit of the information processing device or the peripheral device, the automatic execution information file and the driver program are loaded on the information processing device, and by additional user operation the peripheral device starts operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-169262, filed Jun. 27, 2008, Japanese Patent Application No. 2008-169263, filed Jun. 27, 2008, Japanese Patent Application No. 2008-259957, filed Oct. 6, 2008, and Japanese Patent Application No. 2009-143655, filed Jun. 16, 2009, which are hereby incorporated by reference herein in their entirety.

The invention claimed is:

1. A peripheral device configured to perform predetermined processing based on information coming from an information processing device, the peripheral device comprising:
 a storage unit configured to store a control program programmed to control the predetermined processing and a control filed used for controlling the peripheral device; and
 a control unit configured to control operation of the peripheral device based on an instruction information written into the control file stored in the storage unit upon execution of the control program on the information processing device, wherein the storage unit includes:
a first memory area configured to store the control program, and a second memory area configured to store the control file and is recognizable from the information processing device, and wherein the control unit is further configured to duplicate the control program from the first memory area to the second memory area and control the operation of the peripheral device based on the instruction information written into the control file from the information processing device upon execution of the control program on the information processing device.

2. The peripheral device according to claim 1, wherein the information processing device recognizes the peripheral device as a mass storage device when the information processing device is connected to the peripheral device, and the information processing device accesses the mass storage device without an administrative right.

3. The peripheral device according to claim 1, wherein the second memory area is assigned a drive letter as a single disk drive and is recognized by the information processing device.

4. The peripheral device according to claim 1, wherein the control unit is further configured to receive a new control program transmitted from the information processing device and writes the new control program into the storage unit when the new control program newer than the control program stored in the storage unit is found in the information processing device.

5. The peripheral device according to claim 1, further comprising:
an image reading unit configured to read an image as the predetermined processing, and
a buffer area created in the storage unit and configured to buffer image data obtained by the image reading unit,
wherein the information processing device is further configured to receive the image data via the control file after the image data is written in the control file from the buffer area.

6. The peripheral device according to claim 1, wherein the information processing device is further configure to load a DLL module and the control program from the second memory area to a memory of the information processing device.

7. The peripheral device according to claim 1, wherein the information processing device is further configured to display a user interface on a display connected to the information processing device by executing the control program and write the instruction information into the control file by accepting a user instruction as a control condition via the user interface.

8. An image reading device configured to read an image based on information coming from an information processing device, the image reading device comprising:
a storage unit configured to store a control program programmed to control image reading and a control file used for controlling the image reading device; and
a control unit configured to control operation of the image reading device based on instruction information written into the control file stored in the storage unit upon execution of the control program on the information processing device, wherein the storage unit includes:
a first memory area configured to store the control program, and a second memory area configured to store the control file and is recognizable from the information processing device, and
wherein the control unit is further configured to duplicate the control program from the first memory area to the second memory area and control the operation of the image reading device based on the instruction information written into the control file from the information processing device upon execution of the control program on the information processing device.

9. The image reading device according to claim 8, wherein the control unit is further configured to control an image reading unit configured to read an image based on the instruction information when the information processing device writes the instruction information into the control file.

10. The image reading device according to claim 8, wherein the control unit is further configured to repeatedly stores into the storage unit partial image data based on the instruction information repeatedly generated by execution of the control program on the information processing device.

11. An image reading system comprising:
an information processing device, and
an image reading device connected to the information processing device, wherein the image reading device includes:
a storage unit configured to store a control program programmed to control image reading and a control file used for controlling the image reading device; and
a control unit configured to control operation of the image reading device based on instruction information written into the control file stored in the storage unit upon execution of the control program on the information processing device,
wherein the storage unit includes:
a first memory area configured to store the control program, and a second memory area configured to store the control file and is recognizable from the information processing device,
wherein the control unit is further configured to duplicate the control program from the first memory area to the second memory area,
wherein the information processing device is further configured to execute the control program from the second memory area and writes the instruction information into the control file, and
wherein the control unit is further configured to control the operation of the image reading device based on the instruction information written into the control file from the information processing device.

12. The image reading system according to claim 11, wherein the control unit is further configured to repeatedly stores into the storage unit partial image data based on the instruction information repeatedly generated by execution of the control program on the information, and
wherein the information processing device is further configured to read out the partial image data from the storage unit and merge the partial image data to complete image data.

13. The image reading system according to claim 11, wherein the image reading device further comprises a start button configured to start image reading, and
the control unit is further configured to detect a press of the start button, and write information indicating that the start button is pressed when the control unit detects that the start button is pressed, the information processing device is further configured to detect via the control file that the start button is pressed and write instruction information into the control file to cause the image reading device to start image reading upon detecting that the start button is pressed.

14. The image reading system according to claim 11, wherein the information processing device is further configured to recognize whether or not the image data is written into the control file, based on update of a table located in the second memory area of the storage unit of the image reading unit.

15. The image reading system according to claim 11, wherein the information processing device is further configured to monitor whether or not image data is written into the control file in the second memory area of the storage unit of the image reading unit and read out the image data from the control file upon detecting that image data is written into the control file.

* * * * *